United States Patent
Etzkorn et al.

(10) Patent No.: US 10,232,531 B1
(45) Date of Patent: Mar. 19, 2019

(54) METHODS AND APPARATUS FOR FORMING A POLYMER LAYER AROUND A STRUCTURE USING A PLURALITY OF PROTRUSIONS

(71) Applicant: Verily Life Sciences LLC, Mountain View, CA (US)

(72) Inventors: James Etzkorn, Mountain View, CA (US); Daniel Patrick Barrows, Sunnyvale, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 919 days.

(21) Appl. No.: 14/326,429

(22) Filed: Jul. 8, 2014

(51) Int. Cl.
*B29C 43/18* (2006.01)

(52) U.S. Cl.
CPC ........ *B29C 43/18* (2013.01); *B29C 2043/181* (2013.01)

(58) Field of Classification Search
CPC .......................... B29C 43/18; B29C 2043/181
See application file for complete search history.

(56) References Cited

U.S. PATENT DOCUMENTS

| | | | |
|---|---|---|---|
| 3,991,146 A * | 11/1976 | Barrie | B29C 33/123 264/275 |
| 4,068,933 A | 1/1978 | Seiderman | |
| 4,401,371 A | 8/1983 | Neefe | |
| 4,571,039 A | 2/1986 | Poler | |
| 4,872,825 A * | 10/1989 | Ross | B29C 43/18 257/E21.499 |
| 4,909,818 A | 3/1990 | Jones | |
| 5,044,742 A | 9/1991 | Cohen | |

(Continued)

FOREIGN PATENT DOCUMENTS

CN 201017117 2/2008
KR 1020120010551 2/2012
(Continued)

OTHER PUBLICATIONS

Yao, H., et al. "A soft hydrogel contact lens with an encapsulated sensor for tear glucose monitoring." Micro Electro Mechanical Systems (MEMS), 2012 IEEE 25th International Conference on. IEEE, 2012. <http://ieeexplore.ieee.org/abstract/document/6170299/>.*

(Continued)

*Primary Examiner* — Edmund H Lee
*Assistant Examiner* — Nicholas R Krasnow
(74) *Attorney, Agent, or Firm* — McDonnell Boehnen Hulbert & Berghoff LLP

(57) ABSTRACT

A method may involve positioning a structure on a plurality of protrusions that extend from a surface of a molding piece, wherein the structure comprises a sensor or an electronic component; forming, using the molding piece, a body-mountable device by forming a polymer layer around the structure positioned on the plurality of protrusions, such that the structure is at least partially enclosed by the polymer layer, wherein the polymer layer defines a first side of the body-mountable device and a second side of the body-mountable device opposite the first side, and wherein the surface of the molding piece supports the polymer layer as the polymer layer is being formed; and removing the body-mountable device from the molding piece.

13 Claims, 30 Drawing Sheets

(56) References Cited

U.S. PATENT DOCUMENTS

| | | | |
|---|---|---|---|
| 5,626,865 A | 5/1997 | Harris et al. | |
| 5,682,673 A * | 11/1997 | Fehr | H01L 21/565 |
| | | | 174/529 |
| 5,766,985 A * | 6/1998 | Mangiagli | B29C 45/14073 |
| | | | 257/E21.504 |
| 5,882,567 A * | 3/1999 | Cavallaro | B29C 43/146 |
| | | | 264/250 |
| 6,036,314 A | 3/2000 | Wolfson | |
| 7,003,336 B2 | 2/2006 | Holker et al. | |
| 7,591,556 B2 | 9/2009 | Rosenthal | |
| 7,878,650 B2 | 2/2011 | Fritsch et al. | |
| 8,038,921 B2 * | 10/2011 | Itabashi | B29C 33/123 |
| | | | 264/278 |
| 8,385,998 B2 | 2/2013 | Zhang et al. | |
| 8,506,740 B2 | 8/2013 | Say | |
| 8,721,074 B2 | 5/2014 | Pugh et al. | |
| 8,985,763 B1 * | 3/2015 | Etzkorn | G02C 11/00 |
| | | | 351/159.02 |
| 2002/0017732 A1 * | 2/2002 | Koyama | B29C 45/14073 |
| | | | 264/39 |
| 2002/0075447 A1 | 6/2002 | Andino et al. | |
| 2002/0185651 A1 * | 12/2002 | Sommers | H01L 33/54 |
| | | | 257/94 |
| 2003/0186482 A1 * | 10/2003 | Schuurmans | G01L 19/141 |
| | | | 438/106 |
| 2004/0100704 A1 | 5/2004 | Shadduck | |
| 2004/0181172 A1 | 9/2004 | Carney et al. | |
| 2004/0209973 A1 | 10/2004 | Steffen et al. | |
| 2004/0222555 A1 * | 11/2004 | Puniello | B29C 45/14073 |
| | | | 264/255 |
| 2006/0186564 A1 | 8/2006 | Adams et al. | |
| 2006/0265058 A1 | 11/2006 | Silvestrini et al. | |
| 2006/0290882 A1 | 12/2006 | Meyers et al. | |
| 2007/0016074 A1 * | 1/2007 | Abreu | A61B 3/1241 |
| | | | 600/475 |
| 2007/0138697 A1 * | 6/2007 | Takeda | B29C 45/14221 |
| | | | 264/278 |
| 2007/0153231 A1 | 7/2007 | Iuliano | |
| 2010/0103369 A1 | 4/2010 | Pugh et al. | |
| 2011/0155587 A1 | 6/2011 | Shacham-Diamand et al. | |
| 2012/0236524 A1 | 9/2012 | Pugh et al. | |
| 2012/0245444 A1 | 9/2012 | Otis et al. | |
| 2013/0135578 A1 | 5/2013 | Pugh et al. | |
| 2013/0161846 A1 | 6/2013 | Goodenough et al. | |
| 2013/0243655 A1 | 9/2013 | Li et al. | |
| 2013/0292879 A1 | 11/2013 | Disawal et al. | |
| 2013/0308092 A1 | 11/2013 | Groisman | |
| 2014/0002789 A1 | 1/2014 | Pugh et al. | |
| 2014/0088381 A1 | 3/2014 | Etzkorn et al. | |
| 2014/0107444 A1 | 4/2014 | Liu | |
| 2014/0107445 A1 | 4/2014 | Liu | |
| 2014/0192315 A1 | 7/2014 | Liu et al. | |
| 2014/0194706 A1 | 7/2014 | Liu et al. | |
| 2014/0194713 A1 | 7/2014 | Liu | |
| 2014/0200424 A1 | 7/2014 | Etzkorn et al. | |
| 2014/0200425 A1 | 7/2014 | Etzkorn et al. | |
| 2014/0213867 A1 | 7/2014 | Pletcher et al. | |
| 2014/0354946 A1 * | 12/2014 | Pugh | G02C 7/022 |
| | | | 351/159.73 |
| 2016/0066825 A1 | 3/2016 | Barrows et al. | |

FOREIGN PATENT DOCUMENTS

| | | |
|---|---|---|
| WO | WO 2004064629 | 8/2004 |
| WO | WO2014012016 | 1/2014 |

OTHER PUBLICATIONS

"Ardebili"—Ardebili, Haleh, and Michael Pecht. Encapsulation technologies for electronic applications. William Andrew, 2009. Chapter 3. (Year: 2009).*

"Yao-2"—Yao, Huanfen. "Biosensors Embedded in Contact Lenses for Human Health Monitoring." PhD diss., 2013. (Year: 2013).*

* cited by examiner

METHODS AND APPARATUS FOR FORMING A POLYMER LAYER AROUND A STRUCTURE USING A PLURALITY OF PROTRUSIONS

BACKGROUND

Unless otherwise indicated herein, the materials described in this section are not prior art to the claims in this application and are not admitted to be prior art by inclusion in this section.

A body-mountable device may be configured to monitor health-related information based on at least one analyte detected in a fluid of a user wearing the body-mountable device. For example, the body-mountable device may comprise an eye-mountable device that may be in the form of a contact lens that includes a sensor configured to detect the at least one analyte (e.g., glucose) in a tear film of a user wearing the eye-mountable device. The body-mountable device may also be configured to monitor various other types of health-related information.

SUMMARY

In one aspect, the present disclosure provides a method. The method involves positioning a structure on a plurality of protrusions that extend from a surface of a molding piece, wherein the structure comprises a sensor or an electronic component; forming, using the molding piece, a body-mountable device by forming a polymer layer around the structure positioned on the plurality of protrusions, such that the structure is at least partially enclosed by the polymer layer, wherein the polymer layer defines a first side of the body-mountable device and a second side of the body-mountable device opposite the first side, and wherein the surface of the molding piece supports the polymer layer as the polymer layer is being formed; and removing the body-mountable device from the molding piece.

In another aspect, the present disclosure provides an apparatus for forming a body-mountable device. The body-mountable device includes a structure including a sensor or an electronic component, and a polymer layer around the structure, such that the structure is at least partially enclosed by the polymer layer, wherein the polymer layer defines a first side of the body-mountable device and a second side of the body-mountable opposite the first side. The apparatus includes: a molding piece, wherein the molding piece comprises a surface configured to support the polymer layer as the polymer layer is being formed and a plurality of protrusions that extend from the surface that is configured to receive the structure; and a press, wherein in the forming position the molding piece and the press are configured to apply pressure to the polymer layer as the polymer layer is being formed.

In another aspect, the present disclosure provides a system. The system includes: means for positioning a structure on a plurality of protrusions that extend from a surface of a molding piece, wherein the structure comprises a sensor or an electronic component; means for forming, using the molding piece, a body-mountable device by forming a polymer layer around the structure positioned on the plurality of protrusions, such that the structure is at least partially enclosed by the polymer layer, wherein the polymer layer defines a first side of the body-mountable device and a second side of the body-mountable device opposite the first side, and wherein the surface of the molding piece supports the polymer layer as the polymer layer is being formed; and means for removing the body-mountable device from the molding piece.

These as well as other aspects, advantages, and alternatives, will become apparent to those of ordinary skill in the art by reading the following detailed description, with reference where appropriate to the accompanying drawings.

DETAILED DESCRIPTION

The following detailed description describes various features and functions of the disclosed methods, apparatus, and systems with reference to the accompanying figures. In the figures, similar symbols typically identify similar components, unless context dictates otherwise. The illustrative method, apparatus, and system embodiments described herein are not meant to be limiting. It will be readily understood that certain aspects of the disclosed methods, apparatus, and systems can be arranged and combined in a wide variety of different configurations, all of which are contemplated herein.

I. Introduction

A body-mountable device may be configured to monitor health-related information based on at least one analyte detected in a fluid of a user wearing the body-mountable device. Such a body-mountable device may include a structure that includes a sensor or an electronic component and a polymer layer. The polymer layer may define a first side of the body-mountable device and a second side of the body-mountable device opposite the first side.

Such a body-mountable device may be formed (e.g., fabricated) using a molding piece that includes a plurality of protrusions that extend from a surface of the molding piece. For instance, a method may involve positioning the structure on the plurality of protrusions and forming the polymer layer around the structure positioned on the plurality of protrusions, such that the structure is at least partially enclosed by the polymer layer.

Beneficially, embodiments described herein may help to improve the manufacturability of body-mountable devices. For instance, the disclosed embodiments may reduce resources (e.g., labor) needed to fabricate a body-mountable device. Accordingly, the disclosed embodiments may be applied to high volume manufacturing of body-mountable devices.

As used throughout this disclosure, the anterior side of the body-mountable device refers to an outward-facing side of the body-mountable device, whereas the posterior side of the body-mountable device refers to an inward-facing side of the body-mountable device. In particular, when the body-mountable device comprises an eye-mountable device and the eye-mountable device is mounted on an eye of the user, the anterior side corresponds to a side of the eye-mountable device that is facing outward and thus not touching the eye of the user. Further, when the eye-mountable device is mounted on an eye of the user, the posterior side corresponds to a side of the eye-mountable device that is facing inward and thus touching the eye of the user.

II. Example Methods

Figure 1:
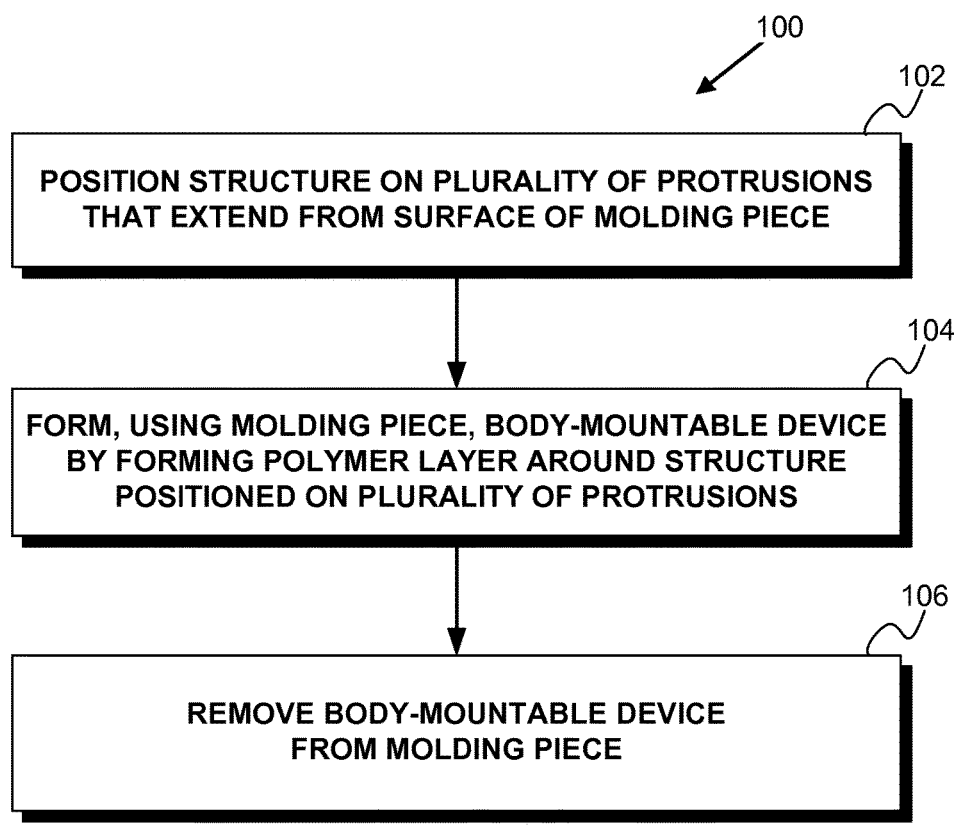
FIG. 1 is a flow chart illustrating a method, according to an example embodiment.

Example methods for forming a body-mountable device are disclosed. FIG. 1 is a flow chart illustrating a method 100 according to an example embodiment. More specifically, as shown by block 102, the method 100 may involve positioning a structure on a plurality of protrusions that extend from a surface of a molding piece. In example embodiments, the structure comprises a sensor or an electronic component. Further, as shown by block 104, the method 100 may further involve forming, using the molding piece, a body-mountable device by forming a polymer layer around the structure positioned on the plurality of protrusions. As a result of forming the polymer layer around the structure, the structure is at least partially enclosed by the polymer layer. The polymer layer defines a first side of the body-mountable device and a second side of the body-mountable device opposite the first side. The surface of the molding piece supports the polymer layer as the polymer layer is being formed. Further still, as shown by block 106, the method 100 may involve removing the body-mountable device from the molding piece.

Figure 2:
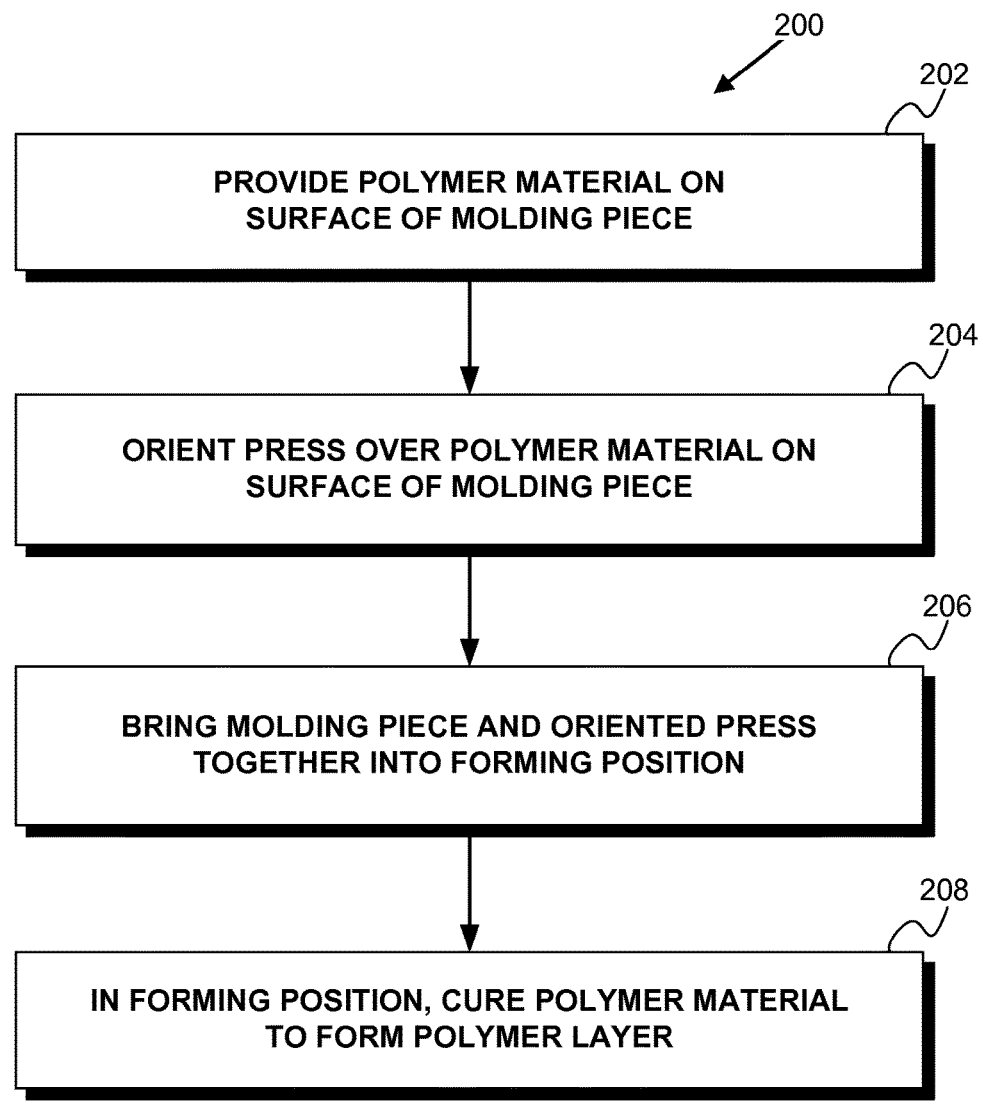
FIG. 2 is a flow chart illustrating a method, according to an example embodiment.

FIG. 2 is a flow chart illustrating another method 200, according to an example embodiment. The method 200 may be performed in connection with block 104 of the method 100. More specifically, as shown by block 202, the method 200 may involve providing a polymer material on the surface of the molding piece. Further, as shown by block 204, the method 200 may involve orienting a press over the polymer material on the surface of the molding piece. Further still, as shown by block 206, the method 200 may involve bringing the molding piece and the oriented press together into a forming position. In the forming position, the molding piece and press apply pressure to the polymer material. And, as shown by block 208, the method 200 may involve in the forming position, curing the polymer material to form the polymer layer.

Figure 3:
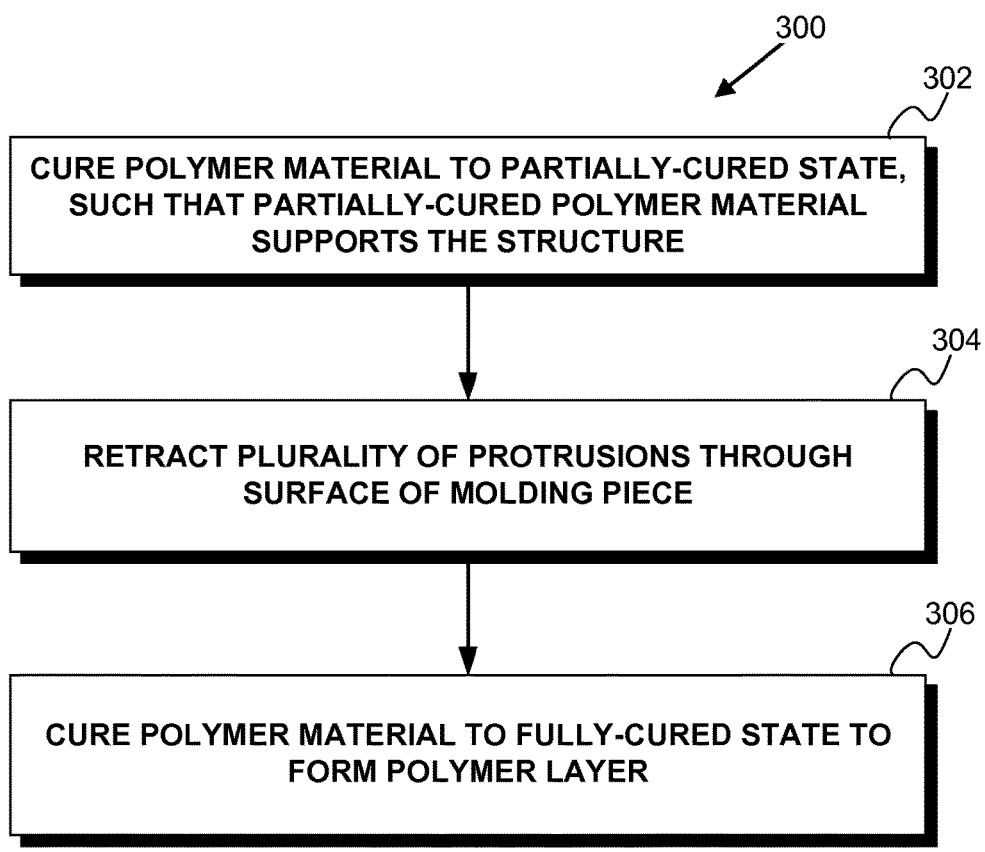
FIG. 3 is a flow chart illustrating a method, according to an example embodiment.

FIG. 3 is a flow chart illustrating another method 300, according to an example embodiment. The method 300 may be performed in connection with block 208 of the method 200. More specifically, as shown by block 302, the method 300 may involve curing the polymer material to a partially-cured state, such that the partially-cured polymer material supports the structure as the polymer layer is being formed. Further, as shown by block 304, the method 300 may involve retracting the plurality of protrusions through the surface of the molding piece. Further still, as shown by block 306, the method 300 may involve curing the polymer material to a fully-cured state to form the polymer layer.

For purposes of illustration, the methods 100, 200, and 300 are described as being carried out by a fabrication device that utilizes cast or compression molding. It should be understood, however, the methods 100, 200, and 300 may be carried out by a fabrication device that utilizes other methods and/or processes for forming body-mountable devices.

In example embodiments, the methods 100, 200, and 300 may be used to form eye-mountable devices, as described below. It should be understood, however, that the methods 100, 200, and/or 300 may be used to form other types of body-mountable devices, such as tooth-mountable devices or skin-mountable devices.

Methods 100, 200, and 300 will now be described in greater detail below with reference to FIGS. 4a-4i. It is noted that relative dimensions in FIGS. 4a-4i are not necessarily to scale, but have been rendered for purposes of explanation only in describing example methods. As shown in FIGS. 4a-4i, a fabrication device 400 may be used to form an eye-mountable device.

A. Positioning a Structure on a Plurality of Protrusions

Figure 4A:
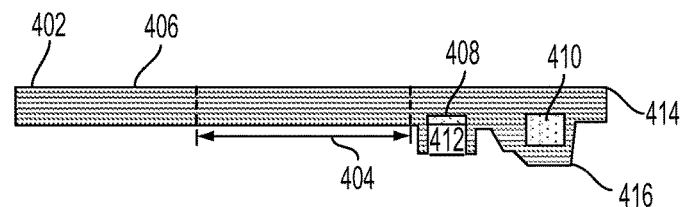
FIG. 4a is an illustration of positioning a structure on a plurality of protrusions, according to an example embodiment.
Figure 4B:
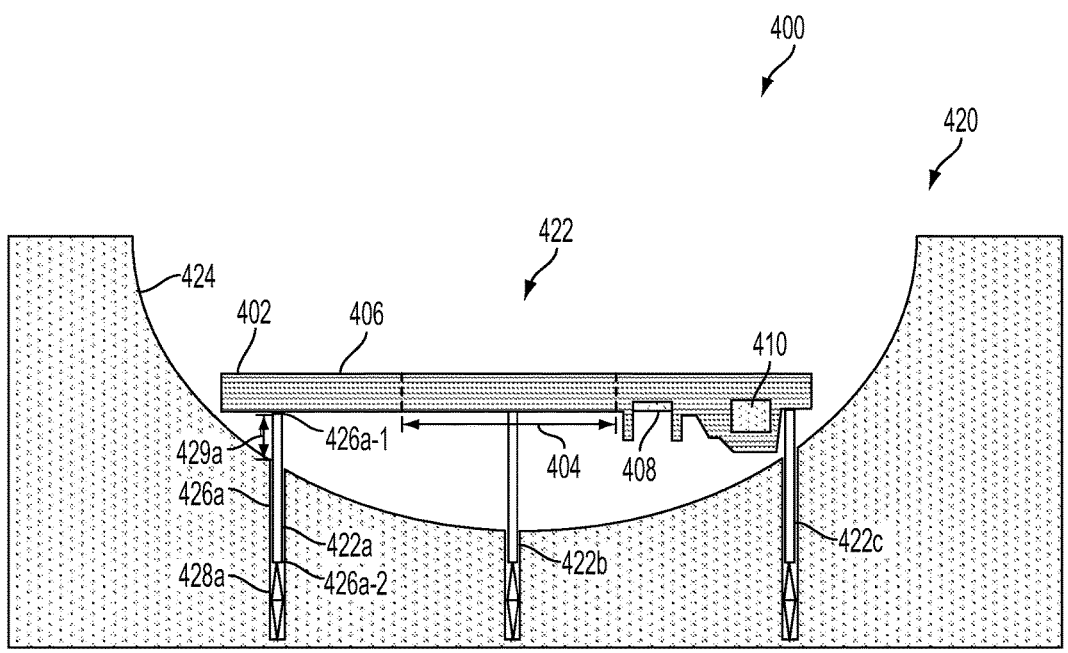
FIG. 4b is an illustration of a structure positioned on a plurality of protrusions, according to an example embodiment.

As mentioned above, at block 102, a structure may be positioned on a plurality of protrusions that extend from a surface of a molding piece. FIGS. 4a and 4b illustrate an example in which a structure 402 is positioned on a plurality of protrusions 422.

The structure 402 may be a ring-shaped substrate that has an outer diameter and a hole 404 that defines an inner diameter. The structure 402 may include a polymer 406, a sensor 408, and electronics 410. In an example, the polymer 406 may include a variety of polymeric materials, such as paralyene. Other components could be present in addition to and/or instead of the one or more components of the structure 402 depicted in FIG. 4a, as this arrangement is presented by way of example. The structure 402 may occupy a peripheral portion of an eye-mountable device, such as a fabricated eye-mountable device 500 illustrated in FIG. 5, so as to limit interference with a user's vision when the eye-mountable device is mounted on an eye of the user.

In the illustrated example, the electronics 410 are embedded in the polymer 406, and the sensor 408 is surrounded by the polymer 406, except for the sensor 408 being exposed by an opening 412. However, in other examples, the sensor 408 and electronics 410 may be mounted on a surface of the polymer 406, such as a first surface 414 of the polymer 406 and/or a second surface 416 of the polymer 334 that is opposite the first surface 414. With this arrangement, the structure 402 might not include the opening 412. In some examples, the opening 412 can have a dimension of between 500 to 700 micrometers. Other dimensions are possible as well. And, in some examples, the opening 412 can have a square shape with rounded corners. Other shapes are possible as well, such as rectangular, circular, etc.

The structure 402 can have various sizes. For instance, the size of the structure 402 may depend on an analyte (or analytes) an eye-mountable device is configured to detect. In an example, the structure 402 is a substrate shaped as a ring with an outer diameter of approximately a 1 centimeter, a radial thickness of approximately 1 millimeter, and a maximum height of approximately 50 between 150 micrometers. Other sizes of the structure 402 are possible as well.

In an example, the structure 402 has a height dimension of at least 50 micrometers. In other words, at some point of the structure 402, the height of the structure 402 may be at least 50 micrometers. In such an example, this height dimension may correspond to a maximum height of the structure 402. In accordance with this disclosure, the maximum height of the structure 402 corresponds to the height of the structure 402 at its highest point. For instance, in the example where the structure 402 includes the sensor 408 and the electronics 410, the height of the structure 402 may vary (and thus the structure 402 may have various height dimensions). For example, the height of the structure 402 may be higher at a point where the electronics 410 is mounted on the structure 402, whereas the height may be lower at a point where the electronics 402 is not mounted on the structure 402. In such an example, the maximum height may correspond to the point where the electronics 402 is located on the structure 402.

The sensor 408 can be configured in a variety of ways. As one example, the sensor 408 may comprise a pair of electrodes, such as a working electrode and a reference electrode, configured to detect one or more analytes. Other configurations of the sensor 408 are possible as well. And the sensor 408 can have a variety of thicknesses. As one example, the sensor 408 can have a thickness of 260 nanometers. Other thicknesses of the sensor 408 are possible as well.

In addition, the electronics 410 can be configured in a variety of ways. As one example, the electronics 410 can comprise a chip including one or more logic elements configured to operate the sensor 408. Other configurations of the electronics 410 are possible as well.

Moreover, in some examples, the structure 402 can include a plurality of loops spaced apart from each other, such as three loops, five loops, nine loops, etc. The loops could include conductive portions encapsulated in a polymer material, for example, to provide an antenna in the structure 402. With such an arrangement, when the structure 402 is embedded in a polymer layer, the polymer layer may extend between adjacent conductive loops in the plurality of loops.

Although the structure 402 has been described above as including a sensor 408, in other examples a structure might not include a sensor. Instead, in such examples, the structure 402 may include an electronic component, such as a battery configured to power the electronics 410 or a light emitting diode ("LED").

The fabrication device 400 includes a molding piece 420. The molding piece 420 includes the plurality of protrusions 422 and a surface 424. The plurality of protrusions 422 extend from the surface 424. In some examples, the molding piece 420 may include a rigid material, such as a plastic or a metal.

In the illustrated example, the plurality of protrusions 422 may include three protrusions, a first protrusion 422a, a second protrusion 422b, and a third protrusion 422c. However, in other examples, the plurality of protrusions 422 may include more than three protrusions. As shown in FIG. 4b, the first protrusion 422*a* may include a rod 426*a* and a spring 428*a*. The rod 426*a* may have a first end 426*a*-1 and a second end 426*a*-2, and the spring 428*a* may be connected to the second end 426*a*-2 of the rod 426*a*.

The rod 426*a* may take various different forms in various different embodiments. For instance, the rod 426*a* of the first protrusion 422*a* may include one or more of a metal, a non-stick material, or a plastic. As examples, the metal may include stainless steel or some other alloy or metal; the non-stick material may include TEFLON®; and the plastic may include polyetherimide (e.g., ULTEM® sold by SABIC Innovative Plastics). Moreover, in some examples, the rod 426*a* may have a length 429*a* that extends from the surface 424 of the molding piece 420 between 300 micrometers and 1 millimeter. Such a length may be referred to as working length. Further, in such embodiments, the rod 426*a* may have a total length of several centimeters. In addition, in some examples, the rod 426*a* may have a diameter between 50 micrometers to 2 millimeters.

Further, the spring 428*a* may take various different forms in various different embodiments. For instance, the spring 428*a* may include various different materials, such as a metal (e.g., stainless steel) and a polymer (e.g., elastomer). Moreover, in some embodiments, the spring 428*a* may be a compression spring.

In an example, the second protrusion 422*b* and the third protrusion 422*c* may take the form of or be similar in form to the first protrusion 422*a*. With this arrangement, the second protrusion 422*b* and third protrusion 422*c* may include a respective rod and a respective spring that may take the same or similar form and have the same or similar connections as the rod 426*a* and the spring 428*a*.

Moreover, in some examples, each protrusion of the plurality of protrusions 422 may include the same or similar material, diameter, length, etc. However, in other examples, at least one protrusion of the plurality of protrusions 422 may include a different material, diameter, length, etc.

In an example, positioning the structure 402 on the plurality of protrusions 422 may center the structure 402 in the molding piece 420. Moreover, in some examples, the structure 402 may include a plurality of alignment features (not shown) in the second side 416 of the structure 402 and positioning the structure 402 on the plurality of protrusions 422 may involve aligning the plurality of alignment features with the plurality of protrusions 422.

For instance, the plurality of alignment features may include a first alignment feature (not shown) and aligning the plurality of alignment features with the plurality of protrusions 422 may involve aligning the first alignment feature with the first end 426*a*-1 of the rod 426*a* of the first protrusion 426*a*. In some examples, the first alignment feature may include a hole with certain dimensions (e.g., diameter or height) and the first end 426*a*-1 of the rod 426*a* may be configured to align with the hole or indentation. In such an example, the first end 426*a*-1 of the rod 426*a* may include a variety of shapes, such as a square, a square with rounded corners, a rectangular, a rectangle with rounded corners, and/or triangular. Moreover, in some examples, each alignment feature of the plurality of alignment features may take the form of or be similar in form to the first alignment feature. However, in other examples, at least one alignment feature may include different dimensions than the first alignment feature. Similarly, each first end of respective rods of the plurality of protrusions 422 may take the form of or be similar in form to the first end 426*a*-1 of the rod 426*a*. However, in other examples, at least one rod may have a different shape than the first end 426*a*-1 of the rod 426*a*.

Alternatively, the fabrication device 400 can include a positioning apparatus (not shown), such as a robotic system, configured to position the structure 402 on the plurality of protrusions 422 in a predetermined orientation. For instance, the positioning apparatus may (i) pick up the structure 402 (e.g., via suction), (ii) position the structure 402 above the plurality of protrusions 422, and then (iii) lower the structure 402 toward the plurality of protrusions 422. When the structure 402 is positioned on the plurality of protrusions 422 in a predetermined orientation, the positioning apparatus may then release the structure 402 (e.g., by releasing the suction). With this approach, the structure 402 might not include the plurality of alignment features.

The positioning apparatus may further include a vision system configured to assist with positioning the structure 402 on the plurality of protrusions 422. Such a vision system may facilitate guiding the structure 402 to a precise location on the plurality of protrusions 422. In an example, the vision system can be appropriate for situations in which one or more production specifications for an eye-mountable device have requirements with low tolerances related to the positioning of a sensor, such as the sensor 408, within the eye-mountable device.

FIG. 4*b* illustrates the structure 404 positioned on the plurality of protrusions 422. With this arrangement, the sensor 408 may be placed at a precise location in an XYZ plane defined by the plurality of protrusions 422. As one example, the sensor 408 may rest at a 6 o'clock position with respect to the molding piece 420 on the plurality of protrusions 422. As another example, the sensor 408 may rest at a 12 o'clock position with respect to the molding piece 420 on the plurality of protrusions 422.

In the illustrated example, the structure 402 is positioned on the plurality of protrusions 422, such that a portion of the second surface 416 of the structure 402 contacts the plurality of protrusions 422. However, in other examples, the structure 402 may be positioned on the plurality of protrusions 422, such that a portion of the first surface 414 of the structure 402 contacts the plurality of protrusions 422. With this arrangement, the plurality of alignment features may be in the first side 414 of the structure 402.

B. Forming, Using the Molding Piece, a Body-Mountable Device by Forming a Polymer Layer Around the Structure Positioned on the Plurality of Protrusions As mentioned above, at block 104, the fabrication device may form a body-mountable device by forming a polymer layer around the structure positioned on the plurality of protrusions, such that the structure is at least partially enclosed by the polymer layer. FIGS. 4*c*-4*h* illustrate an example in which a polymer layer 432 is formed. For instance, as shown in FIGS. 4*c*-4*h*, the surface 424 of the molding piece 420 supports the polymer layer as the polymer layer is being formed.

1. Providing a Polymer Material on the Surface of the Molding Piece

Figure 4C:
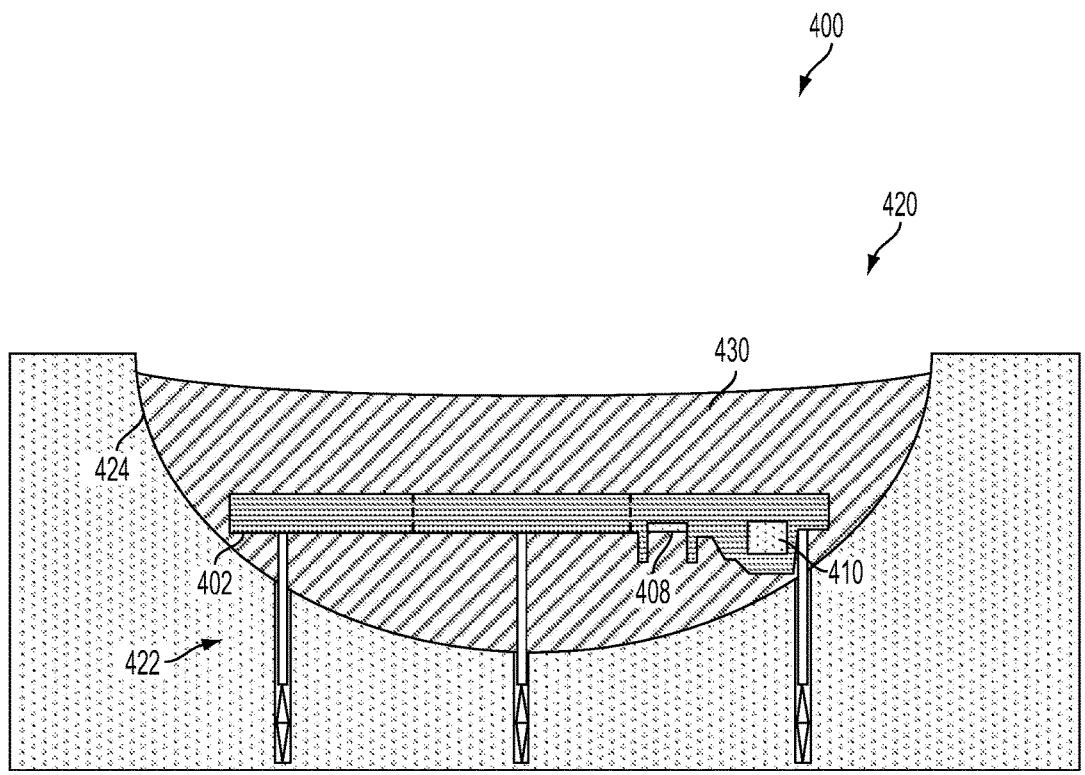
FIG. 4c is an illustration of providing a polymer material on a surface of a molding piece, according to an example embodiment.

As mentioned above, at block 202, a polymer material may be provided on the surface of the molding piece. FIG. 4*c* illustrates an example in which a polymer material is provided on the surface of the molding piece. In particular, FIG. 4*c* illustrates the fabrication device 400 providing a polymer material 430 on the surface 424 of the molding piece 420.

In an example, the polymer material 430 can be any material that can form an eye-compatible polymer layer. For example, the polymer material 430 may be a formulation containing polymerizable monomers, such as hydrogels, silicone hydrogels, silicone elastomers, and rigid gas permeable materials. Further, the polymer material 430 may form a transparent or substantially transparent polymer layer. As such, the use of the polymer material 430 may result in an eye-mountable device through which the wearer can see when mounted on the wearer's eye. In an example, the polymer material 430 can be a hydrogel material, such as silicone hydrogel. As known in the art, hydrogel materials are commonly used in contact-lens technology and are well-suited for eye-mountable devices. Other materials are possible as well.

Figure 4D:
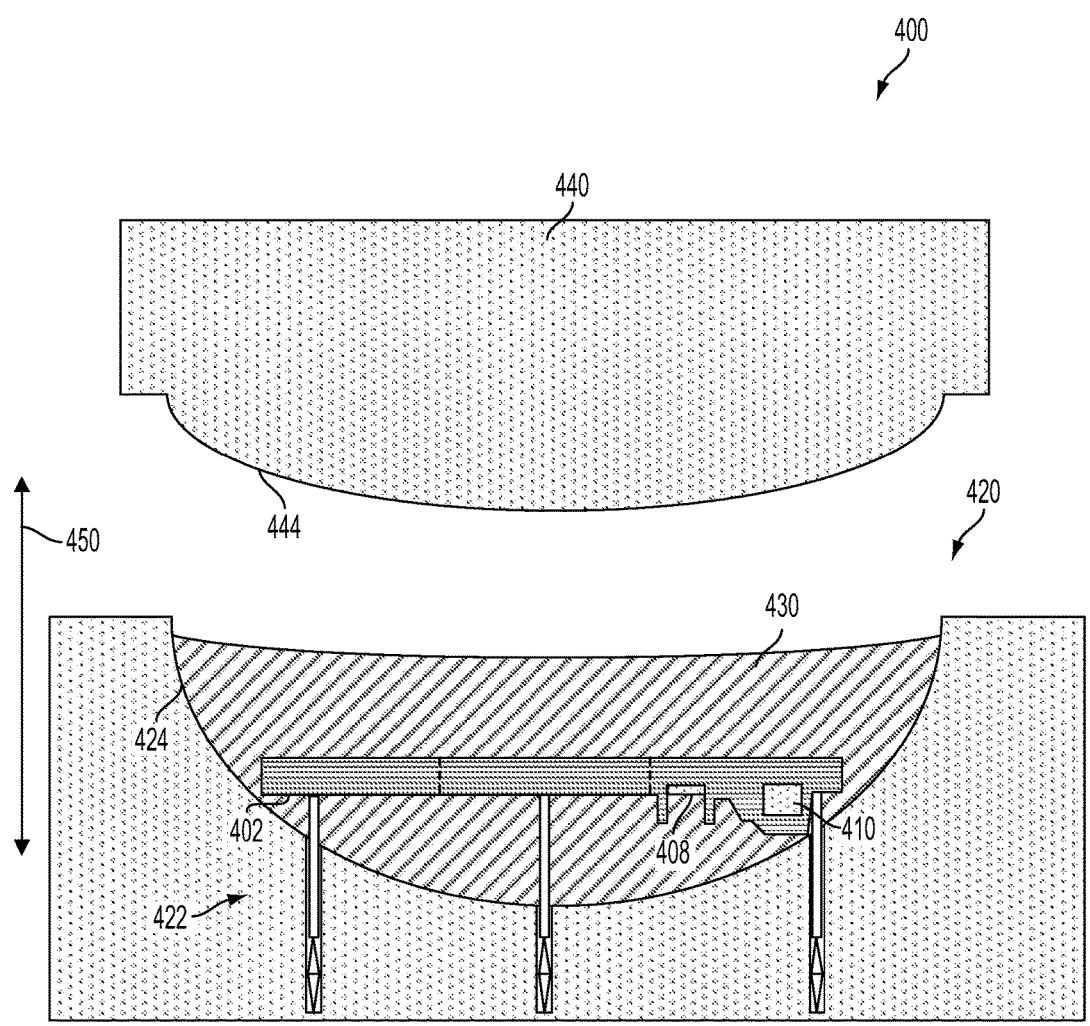
FIG. 4d is an illustration of orienting a press over the polymer material on the surface of the molding piece, according to an example embodiment.

In an example, the polymer material 430 may be provided on the surface 424 of the molding piece 420 by filling the molding piece 420 with the polymer material 430. For instance, in some examples, the molding piece 420 may define a cavity and providing the polymer material 430 on the surface 424 of the molding piece 420 may involve filling the cavity with the polymer material 430. Moreover, as shown in FIG. 4c, providing the polymer material 430 on the surface 424 of the molding piece 420 may involve providing the polymer material 430 on the surface 424 of the molding piece 420, such that the polymer material 430 completely covers the structure 402. Thus, the structure 402 may be submerged within or completely surrounded by the polymer material 430, as shown in FIG. 4d. In other examples, structure 402 might not be completely submerged within polymer 430. That is, a portion of structure 402 may extend above the surface of polymer material 430.

The amount of polymer material 430 provided on the surface 424 of the molding piece 420 may vary based on a number of parameters, such as a desired dimension (e.g., thickness) of the polymer layer 432 or one or more dimensions of the molding piece 420.

2. Orienting a Press Over the Polymer Material on the Surface of the Molding Piece As mentioned above, at block 204, a press may be oriented over the polymer material on the surface of the molding piece. FIG. 4d illustrates an example in which the press is oriented over the polymer material on the surface of the molding piece. In particular, FIG. 4d illustrates the fabrication device 400 orienting a press 440 over the polymer material 430 on the surface 424 of the molding piece 420. The press 440 may include a surface 444.

The press 440 may take various different forms in various different embodiments. For instance, in some examples, the press 440 may take the form of or be similar in form to the molding piece 420. Moreover, in some examples, the press 440 may include a complaint material, such as silicone rubber.

The press 440 may be oriented over the polymer material 430 on the surface 424 of the molding piece 420 in a variety of ways. As one example, the positioning apparatus described with reference to block 102 may be further configured to orient the press 440 over the polymer material 430 on the surface 424 of the molding piece 420. For instance, the positioning system may orient the press 420 over the polymer material 430 on the surface 424 of the molding piece 420.

In addition, the vision system of the positioning system may be further configured to assist with orienting the press 440 over the polymer material 430 on the surface 424 of the molding piece 420. With this arrangement, the vision system may facilitate guiding the press 440 to a precise location over the polymer material 430 on the surface 424 of molding piece 420.

In some examples, the press 440 and the molding piece 420 may be transparent, such that the sensor 408 may be visible during orienting the press 440 over the polymer material 430 on the surface 424 of the molding piece 420.

As another example, the fabrication device 400 may further include one or more alignment pins (not shown), such as a plurality of dowel pins, for orienting the press 440 over the polymer material 430 on the surface 424 of the molding piece 420. Other ways of orienting the press 440 over the polymer material 430 on the surface 424 of the molding piece 420 are possible as well.

Further, the press 440 may be oriented over the polymer material 430 on the surface 432 of the molding piece 420 when the surface 444 of the press 440 is located a distance 450 above the surface 424 of the molding piece 420. In an example, the distance 450 may be 5 millimeters. Other values of the distance 450 are possible as well.

The distance 450 may be specified in various ways. For example, the distance 450 may be specified as a distance between a highest point of the surface 444 of the press 440 and a highest point of the surface 424 of the molding piece 420. As another example, the distance 450 may be specified as a distance between a closest point of the surface 444 of the press 440 and a closet point of the surface 424 of the molding piece 420. As still another example, the distance 450 may be specified as a distance between a vertical center point of the surface 444 of the press 440 and a vertical center point of the surface 424 of the molding piece 420. Other examples of specifying the distance 450 are possible.

Figure 4E:
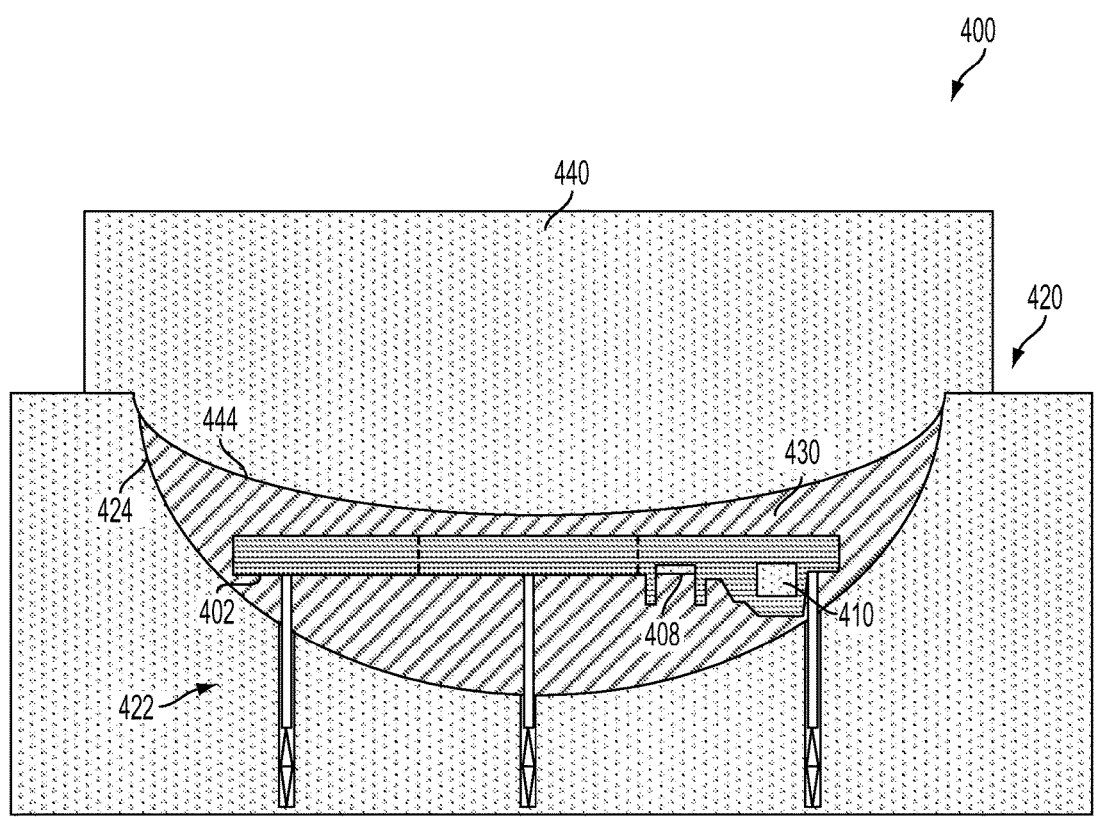
FIG. 4e is an illustration of bringing the molding piece and the oriented press together into a forming position, according to an example embodiment.

3. Bringing the Molding Piece and the Oriented Press Together into a Forming Position As mentioned above, at block 206, the molding piece and the oriented press may be brought together into the forming position. FIG. 4e illustrates an example in which the molding piece and the oriented press are brought together into the forming position. In particular, FIG. 4e illustrates the fabrication device 400 bringing the molding piece 420 and the press 440 (oriented as shown in FIG. 4d) together into the forming position.

As shown in FIG. 4e, in the forming position, the surface 444 of the press contacts the polymer material 430. Moreover, in the forming position, the molding piece 420 and the press 440 may apply pressure to the polymer material 430. In some examples, the molding piece 420 and/or the press 440 may be configured to apply uniform pressure to the polymer material 430. Moreover, in some examples, in the forming position, the pressure applied by the press 440 may deform at least a portion of the polymer material 430.

Figure 4F:
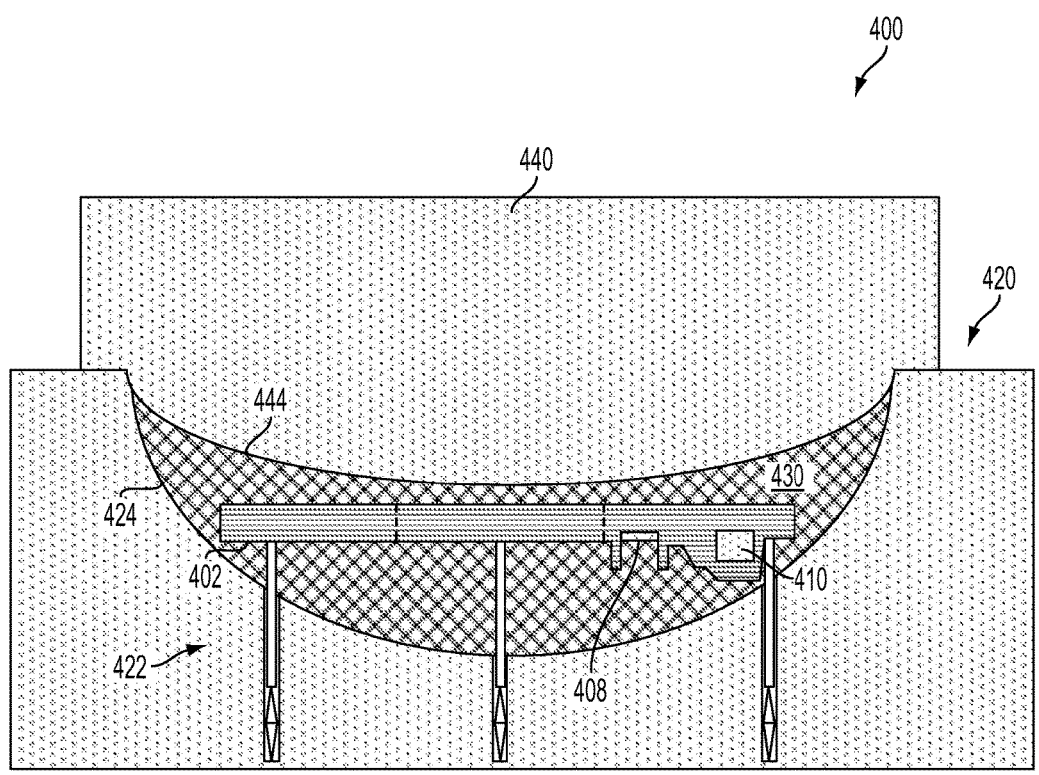
FIG. 4f is an illustration of partially-curing the polymer material, according to an example embodiment.
Figure 4G:
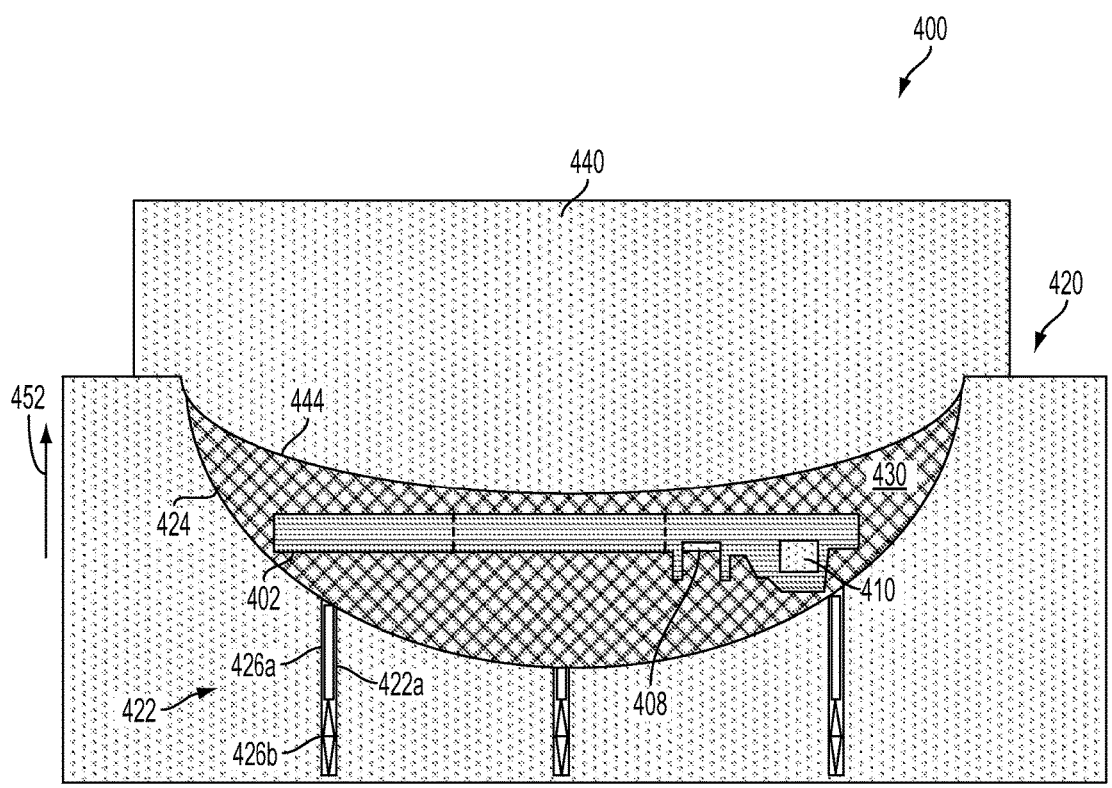
FIG. 4g is an illustration of retracting the plurality of protrusions, according to an example embodiment
Figure 4H:
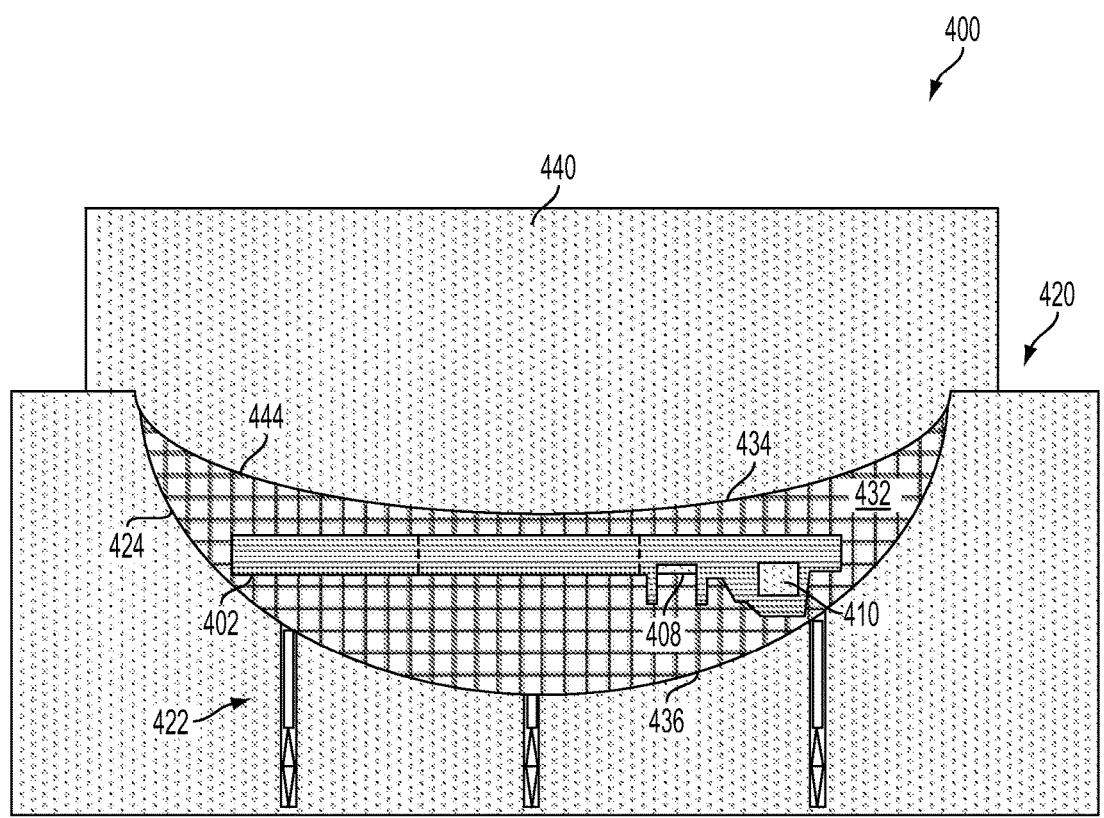
FIG. 4h is an illustration of fully-curing the polymer material to form a polymer layer, according to an example embodiment.

4. In the Forming Position, Curing the Polymer Material to Form the Polymer Layer As mentioned above, at block 208, in the forming position, the polymer material may be cured to form the polymer layer 432. FIGS. 4f-4h illustrate an example in which in the forming position, the polymer material is cured to form the polymer layer. In particular, FIGS. 4f-4h illustrate in the forming position, the fabrication device 400 curing the polymer material 430 to form the polymer layer 432.

i. Curing the Polymer Material to a Partially-Cured State

As mentioned above, at block 302, the polymer material may be cured to a partially-cured state. FIG. 4f illustrates an example in which the polymer material is cured to a partially-cured state, such that the partially-cured polymer material supports the structure. In particular, FIG. 4f illustrates the fabrication device 400 curing the polymer material 430 to a partially-cured state, such that the partially-cured polymer material 430 supports the structure 402.

In an example, the polymer material 430 can be a light-curable polymer material, and the fabrication device 400 may be configured to cure the light-curable polymer material to a partially-cured state using light, such as ultraviolet light or visible light. In some examples, the polymer material 430 cured to a partially-cured state may be sufficiently cross-linked and/or solidified so as to support the structure 402 during formation of the polymer layer 432. Accordingly, with this arrangement, the structure 402 may remain securely fixed in a given location within the polymer material 430 during subsequent formation steps. In some examples, the polymer material 430 cured to a partially-cured state may have a tackiness that facilitates supporting the structure 402. Moreover, in some examples, the partially-cured state of the polymer material 430 may be approximately 50-75% of a fully-cured state of the polymer material 430. Other partially-cured states are possible as well.

Further, the fabrication device 400 may be configured to cure different polymer materials to a partially-cured state differently than other polymer materials (e.g., a first polymer material may be cured more than a second polymer material). Further still, in addition to light curing, other methods of curing are possible as well, such as chemical additives and/or heat. For instance, when the polymer material is cured with light, the polymer material 430 may be cured to a partially-cured state for a certain time period, such as 50-75% of the time to cure the polymer material 430 to a fully-cured state. As another example, when the polymer material is cured with heat, the polymer material 430 may be cured to partially-cured state at a certain temperature for a certain time period, such as 50-75% of the temperature to cure the polymer material 430 to a fully-cured state and/or 50-75% of the time to cure the polymer material 430 to a fully-cured state.

ii. Retracting the Plurality of Protrusions Through the Surface of the Molding Piece As mentioned above, at block 304, the plurality of protrusions may be retracted. FIG. 4g illustrates an example in the plurality of protrusions are refracted through the surface of the molding piece. In particular, FIG. 4g illustrates the fabrication device 400 retracting the plurality of protrusions 422 through the surface 424 of the molding piece.

The plurality of protrusions 422 may retract in a variety of ways. For instance, retracting the first protrusion 422a through the surface 424 of the molding piece may involve the spring 428a deforming, such that the rod 426a refracts through the surface 424 of the molding piece 420. With this arrangement, each spring of a respective protrusion of the plurality of protrusions 422 may deform, such that the respective protrusion retracts through the surface 424 of the molding piece 420.

In another example, each protrusion of the plurality of protrusions 422 may be connected to a plate (not shown), and refracting the plurality of protrusions 422 through the surface 424 of the molding piece 420 may involve translating the plate in a direction substantially parallel to an axis 452 of the molding piece 420, such that the plurality of protrusions 422 retract through the surface 424 of the molding piece 420. The term "substantially parallel," as used in this disclosure, refers to exactly parallel or one or more deviations from exactly parallel that do not significantly impact forming a polymer layer around a structure as described herein.

In an example, the retraction of the plurality of the protrusions 422 may be active. For instance, a control system (not shown) may control certain equipment (e.g., an electric motor or a hydraulic pull coupled to the plurality of protrusions 422) to retract the plurality of protrusions 422. Moreover, in some examples, each protrusion may be fully refracted. However, in some examples, at least one protrusion of the plurality of protrusions 422 may be partially retracted, such that a portion of the at least on protrusion of the plurality of protrusions extends from the surface 424 of the molding piece 420.

Moreover, in an example, the fabrication device 400 may retract each protrusion of the plurality of protrusions at substantially the same time. However, in other examples, the fabrication device 400 may retract at least one protrusion of the plurality of protrusions 422 before (or after) another protrusion is retracted. The term "substantially the same," as used in this disclosure, refers to exactly the same or one or more deviations from exactly the same that do not significantly impact forming a polymer layer around a structure as described herein.

As shown in FIG. 4g, when the plurality of protrusions 422 is retracted through the surface 424 of the molding piece 422, the polymer material 430 may flow into some or all of the space vacated by the protrusions.

iii. Curing the Polymer Material to a Fully-Cured State to Form the Polymer Layer As mentioned above, at block 306, the polymer material may be cured to a fully-cured state. FIG. 4h illustrates an example in which the polymer material is cured to a fully-cured state to form the polymer layer. In particular, FIG. 4h illustrates an example in which the fabrication device 400 cures the polymer material 430 to a fully-cured state to form the polymer layer 432.

In an example, the fabrication device 400 may be configured to cure the polymer material 430 to a fully-cured state by light, chemical additives, or heat. Moreover, when the polymer material 430 is cured with light, the polymer material 430 may be cured to a fully-cured state by curing the polymer material 430 for a certain time period. In some examples, the certain time period may be between 5 seconds to 1 minute. Further, when the polymer material 430 is cured with heat, the polymer material may be cured to a fully-cured state by curing the polymer material at a certain temperature for a certain time period. In some examples, the certain temperature may be between 100 degrees Celsius (C) to 150 degrees C. Moreover, in some examples, the certain time period may be between 30 minutes to 1 hour. The certain temperature and/or certain time period may depend on one or more properties of the polymer material 430 or the type of curing used.

The molding piece 420 and the press 440 may be configured to achieve a given desired thickness of a layer formed between them. As one example, the molding piece 420 and the press 440 may be designed so as to define a thickness of the polymer layer 432.

In an example, the polymer layer 432 has a thickness of greater than 200 micrometers. However, in other examples, the polymer layer 432 can have a thickness between 100 and 500 micrometers, such as 180 micrometers. It should be understood that since the polymer layer 432 may mold over the structure 402, the polymer layer 432 may not have a uniform thickness. For instance, the thickness of the polymer layer 432 above the electronics 410 may be less than the thickness of the second polymer layer 432 that is not touching the electronics 410. In an example, the polymer layer 432 may have a first thickness between 100 to 500 micrometers and a second thickness of 10 micrometers. For instance, in such an example, the polymer layer 432 may have the first thickness at a center region of the polymer layer 432 and the second thickness at an outer periphery of the polymer layer 432. Moreover, in an example, the structure 402 can be more rigid than the polymer layer 432.

In an example, the thickness of the polymer layer 432 can be selected based on a particular analyte or analytes that an eye-mountable device is configured to detect. For example, an optimal thickness for a first analyte may be 60 micrometers, while an optimal thickness for a second analyte may be 75 micrometers. Other examples are possible as well.

The polymer layer 432 defines a posterior side (or a first side) 434 of an eye-mountable device and an anterior side (or a second side) 436 of the eye-mountable device. That is, the polymer layer 432 defines an outer edge of the eye-mountable device. When mounted on an eye of a user, the posterior side 434 of the eye-mountable device defined by the polymer layer 432 corresponds to a side of the device touching the eye of the user. The press 440 may be shaped so as to define a shape of the posterior side 434. For example, a curvature of the posterior side 434 may be defined by the surface 444 of the press 440.

Moreover, when mounted on an eye of a user, the anterior side 436 of the eye-mountable device defined by the polymer layer 432 corresponds to the side of the device that is not touching the eye of the user. As shown in FIG. 4h, the anterior side 436 is opposite the posterior side 434. The molding piece 420 may be shaped so as to define a shape of the anterior side 436. For example, a curvature of the anterior side 436 may be defined by the surface 424 of the molding piece 420.

D. Removing the Body-Mountable Device from the Molding Piece

Figure 4I:
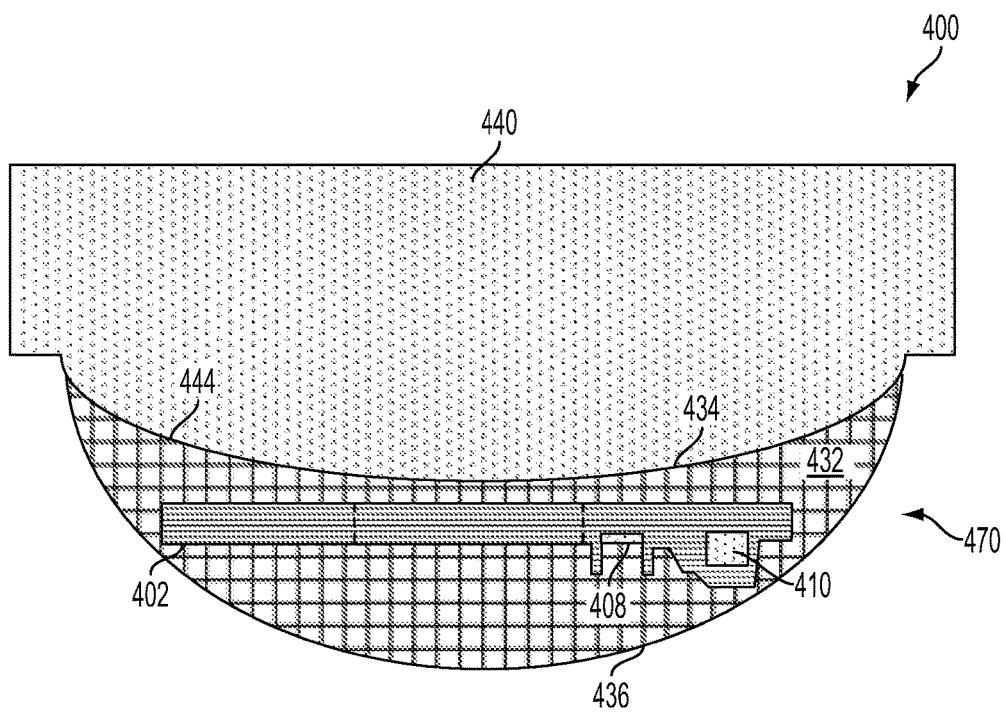
FIG. 4i is an illustration of removing an eye-mountable device from the molding piece, according to an example embodiment.

As mentioned above, at block 106, the body-mountable device may be removed from the molding piece. FIG. 4i illustrates an example in which the eye-mountable device is removed from the molding piece. In particular, FIG. 4i illustrates an example of the fabrication device 400 removing an eye-mountable device 470 from the molding piece 420. The eye-mountable device 470 includes the polymer layer 432, the structure 402, the sensor 408, the electronics 410, the posterior side 434, and the anterior side 436.

In order to remove the eye-mountable device 470 from the molding piece 420, the fabrication device 400 may separate the molding piece 420 from the press 440. When the fabrication device 400 separates the molding piece 420 from the press 440, the eye-mountable device 470 may stick to a side of the press 440. As shown in FIG. 4i, with this arrangement, the press 440 may hold the eye-mountable device 470. In an example, the eye-mountable device 470 and/or the molding piece 420 can be surface treated, such that the eye-mountable device 470 sticks to the side of the press 440. Additionally or alternatively, the press 440 and/or the eye-mountable device 470 can be surface treated, such that the eye-mountable device 470 sticks to the side of the press 440.

After the molding piece 420 is separated from the press 440, the eye-mountable device 470 may be removed from the press 440. In an example, removing the eye-mountable device 470 from the press 440 can include the fabrication device 400 removing the surface treatment of the eye-mountable device 470 and/or the press 440.

E. Applying a Non-Stick Coating to a Protrusion or the Structure

The method 100 may further involve applying a non-stick coating to at least one protrusion of the plurality of protrusions. In an example, applying the non-stick coating to at least one protrusion of the plurality of protrusions may occur before forming the polymer layer.

For instance, the fabrication device 400 may apply a non-stick coating to at least one protrusion of the plurality of protrusions 422. And in some examples, the fabrication device 400 may apply a non-stick coating to at least one protrusion of the plurality of protrusions 422 before formation of the polymer layer 432. With this arrangement, the coated protrusion(s) may not stick to the polymer layer 432 and/or the structure 402 during formation of the polymer layer 432. Moreover, in some examples, the coated protrusions may not bond to the polymer layer 432 and/or the structure 402 during formation of the polymer layer 432.

As examples, the non-stick coating may include one or more of an oil, grease, a surfactant, silane, and a diamond-like carbon. In addition, in some examples, the non-stick coating may have thickness between 2 to 5 micrometers.

In an example, the non-stick coating may be applied before the structure 402 is positioned on the plurality of protrusions 422 or before the polymer material 430 is provided on the surface 424 of the molding piece 420. Moreover, in an example, the non-stick coating may be applied to a first end of a rod of a protrusion (e.g. the first end 426a-1 of the rod 426a of the first protrusion 422a). In other examples, the non-stick coating may be applied to a portion of the rod. And in yet other examples, the non-stick coating may be applied to the first end of the rod and the portion of the rod.

In a further aspect, when at least one protrusion of the plurality of protrusions 422 includes a complaint material, an oil and/or grease may be applied to a portion of the protrusion (e.g., a portion of a rod). With this arrangement, the portion of the protrusion may not stick to the polymer layer 432 and/or the structure 402 during the formation of the polymer layer 432.

Moreover, the method 100 may further involve applying a non-stick coating to least a portion of the structure. In an example, applying the non-stick coating to at least a portion of the structure may occur before positioning the structure on the plurality of protrusions.

For instance, the fabrication device 400 may apply a non-stick coating to at least a portion of the structure 402. And in some examples, the fabrication device 400 may apply a non-stick coating to at least a portion of the structure 402 before the structure 402 is positioned on the plurality of protrusions 422. With this arrangement, at least one protrusion of the plurality of protrusions 422 may not stick to the coated portion of the structure 402 during formation of the polymer layer 432. Moreover, in some examples, at least one protrusion of the plurality of protrusions 422 may not bond to the coated portion of the structure 402 during formation of the polymer layer 432.

In some examples, the non-stick coating applied to a portion of the structure 402 may be the same or similar material as the non-stick coating applied to at least one protrusion of the plurality of protrusions 422. However, in other examples, the non-stick coating applied to a portion of the structure 402 may be a different material than the non-stick coating applied to at least one protrusion of the plurality of protrusions. The non-stick coating applied to a portion of the structure 402 may include any of the materials that the non-stick coating applied to at least one protrusion of the plurality of protrusions may include. Moreover, in an example, the fabrication device 400 may apply a non-stick coating to a portion the structure 404 in the same or similar way as the at least one protrusion of the plurality of protrusions 422.

F. Forming a Channel to the Sensor

When the structure includes a sensor, the method 100 may further involve forming a channel to the sensor through the polymer layer. With this arrangement, the sensor may be configured to receive one or more analytes via the channel.

The channel could be formed in a variety of ways. As one example, the channel may be molded. For instance, in the method 100, the molding piece may further include a second protrusion that extends from the surface of the molding piece to the sensor through the polymer layer as the polymer layer is being formed, and the body-mountable device removed from the molding piece has a channel to the sensor formed by the second protrusion.

The second protrusion may be similar in form to at least one protrusion of the plurality of protrusions 422. For instance, the second protrusion may include a rod and a spring, and the second protrusion may include any of the materials that the plurality of protrusions 422 may include. Moreover, in some examples, the second protrusion may have a length that extends from the surface 424 of the molding piece 420 between 5 to 15 millimeters. Further, in some examples, the second protrusion may have a diameter between 500 micrometers to 1.5 millimeters, such as 1 millimeter.

Moreover, when the molding piece includes the second protrusion, the method 100 may further involve applying a non-stick coating to the second protrusion. With this arrangement, the coated second protrusion may not stick to the polymer layer 432 and/or the sensor 408 during formation of the polymer layer 432. Moreover, in some examples, the coated second protrusion may not bond to the polymer layer 432 and/or the sensor 408 during formation of the polymer layer 432.

In some examples, the non-stick coating applied to the second protrusion may be the same or similar material as the non-stick coating applied to at least one protrusion of the plurality of protrusions 422 and/or a portion of the structure 402. However, in other examples, the non-stick coating applied to the second protrusion may be a different material than the non-stick coating applied to at least one protrusion of the plurality of protrusions 422 and/or a portion of the structure 402. The non-stick coating applied to the second protrusion may include any of the materials that the non-stick coating applied to at least one protrusion of the plurality of protrusions 422 and/or a portion of the structure 402 may include. Moreover, in an example, the fabrication device 400 may apply a non-stick coating to the second protrusion in the same or similar way as the at least one protrusion of the plurality of protrusions 422 and/or a portion of the structure 402.

As another example, a protective layer formed over the sensor may be removed to form the channel. For instance, the method 100 may further involve forming a protective layer over the sensor, such that the sensor is enclosed by the protective layer, and removing the protective layer to form a channel to the sensor through the polymer layer, wherein forming the polymer layer around the structure comprises forming the polymer layer around the structure, such that the structure is enclosed by the polymer layer and the protective layer.

As examples, the protective layer may include a polymer, such as polyethylene glycol, or a photoresist. Moreover, in some examples, the protective layer may take the shape of the opening 412 of the structure 402. Further, the protective layer may be removed via a process that includes etching the protective layer, dissolving the protective layer in a fluid, and/or soaking the protective layer in a fluid.

As still another example, the channel may be formed by removing material from the polymer layer. For instance, the method 100 may further involve removing material from the polymer layer to form a channel to the sensor. The material for the polymer layer may be removed in a variety of ways.

For instance, the material from the polymer layer may be removed to form the channel via a process that includes drilling, ablation, etching, etc.

In some examples, the channel to the sensor may be formed during the formation of the polymer layer. Moreover, in some examples, the channel to the sensor may be formed after the eye-mountable device is removed from the molding piece and/or the press.

G. Conforming the Structure to a Curvature of the Polymer Layer

The method 100 may further involve conforming the structure to a curvature of the polymer layer. In an example, conforming the structure to a curvature of the polymer layer may occur before the polymer layer is formed. For instance, the fabrication device 400 may conform the structure 402 to a curvature of the polymer layer 432. And in some examples, the fabrication device 400 may conform the structure 402 to a curvature of the polymer layer 432 before the polymer layer 432 is formed.

The structure 402 may be conformed to a curvature of the polymer layer 432 in a variety of ways. For instance, the positioning system may conform the structure 402 to a curvature of the polymer layer 432 by bending the structure 402 to the curvature. In an example, the positioning system may bend the structure by applying a force and/or a torque to at least a portion of the structure 402. Moreover, in an example, the structure 402 may be conformed to a curvature of a side of the polymer layer 432, such as the posterior side 434 or the anterior side 436.

In an example, the structure 402 may be conformed to a curvature of the polymer layer 432 before the structure 402 is positioned on the plurality of protrusions 422. With this arrangement, positioning of the structure 402 on the plurality of protrusions 422 may be improved, deformation of the polymer layer 432 may be reduced, and/or operability of an eye-mountable device may be improved.

Figure 5:
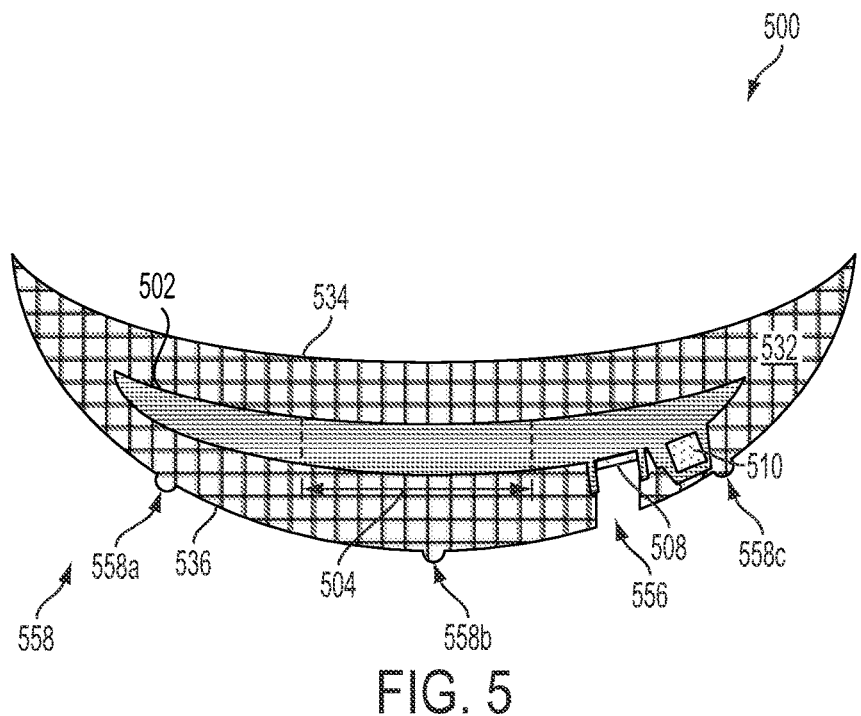
FIG. 5 is an illustration an eye-mountable device formed according to an example embodiment.

FIG. 5 illustrates an eye-mountable device 500 formed according to an example embodiment. In particular, FIG. 5 illustrates a structure 502 that is conformed to a curvature of a polymer layer 532, and an anterior side 536 that includes a channel 556 to a sensor 508.

In the eye-mountable device 500, the structure 502 is embedded in the polymer layer 532. The structure 502 has an outer diameter and a hole 504 that defines an inner diameter and the sensor 508 configured to detect an analyte and electronics 510. The eye-mountable device 500 includes a posterior side 534 and the anterior side 536. The structure 502 may take the form of or be similar in form to the structure 402, the sensor 508 may take the form of or be similar in form to the sensor 408, the electronics 510 may take the form of or be similar in form to the electronics 410, and the polymer layer 532 may take the form of or be similar in form to the polymer layer 432.

In an example, the inner diameter defined by the hole 504 can be asymmetric and define a rotational orientation of the structure 502 relative to the channel 556, such that the sensor 508 is configured to receive the analyte via the channel 556. With this arrangement, the structure 508 is fully enclosed by the polymer layer 532, except for the sensor 508 being exposed by the channel 556.

In some examples, one or more dimensions of the channel 556 may be based on one or more dimensions of the sensor 508 and/or the electronics 510. As one example, a width of the channel 556 can be based on a width of the sensor 508. As another example, a height of the channel 556 can be based on a height of the electronics 510.

As described with reference to FIG. 4g, when the plurality of protrusions 422 are retracted through the surface 424 of the molding piece 420, the polymer material 430 may flow into some or all of the space vacated by the protrusions. For instance, in some examples, an eye-mountable device removed from the molding piece 420 may have a plurality of indentations in the polymer layer 432 formed by the retraction of the plurality of protrusions 422. With this arrangement, a shape of a respective indentation of the plurality of indentations may be based on a shape of a corresponding protrusion of the plurality protrusions 422.

FIG. 5 illustrates the eye-mountable device 500 may include a plurality of indentations 558 in the anterior side 536 of the eye-mountable device 500.

Moreover, in some examples, the plurality of indentations 558 may be formed by the retraction of the plurality of protrusions 422. Accordingly, in the illustrated example, the plurality of indentations 558 includes three indentations: a first indentation 558a, a second indentation 558b, and a third indentation 558c. However, in other examples, the plurality of indentations 558 may include more than three indentations.

In an example, the indentations of the plurality of indentations 558 may be sufficiently small so as not to adversely affect comfort of wearing the eye-mountable device 500.

H. In Forming Position, Curing the Polymer Material when the Plurality of Protrusions Extend from the Surface of the Molding Piece Although an example in which the plurality of protrusions are retracted during the formation of the polymer layer has been described above, in other examples the plurality of protrusions may not be retracted during formation of the polymer layer. Instead, in some examples, the fabrication device may cure the polymer material to a fully-cured state when the plurality of protrusions extend from the surface of the molding piece. Moreover, in such examples, the body-mountable device removed from the molding piece may have a plurality of channels to the structure in the polymer layer formed by the plurality of protrusions.

Figure 6A:
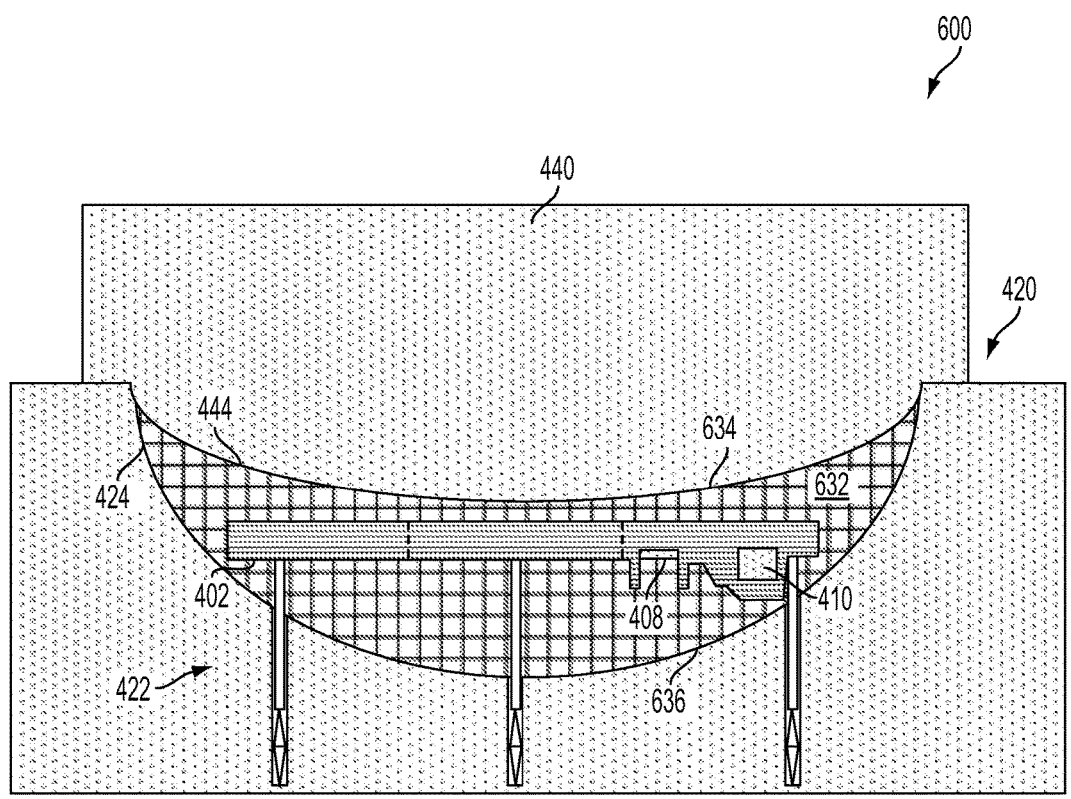
FIG. 6a is an illustration of curing a polymer material to a fully-cured state to form a polymer layer, according to an example embodiment.

FIG. 6a illustrates an example in which the polymer material is cured to a fully-cured state to form a polymer layer when the plurality of protrusions extend from the surface of the molding piece. In particular, FIG. 6a illustrates a fabrication device 600 curing the polymer material 430 to a fully-cured state to form a polymer layer 632 when the plurality of protrusions 422 extend from the surface 424 of the molding piece 420. With this arrangement, the plurality of protrusions 422 may at least partially support the structure 402 as the polymer layer 632 is being formed. The polymer layer 632 may define a posterior side 634 and an anterior side 636 of an eye-mountable device. The polymer layer 632 may be similar in form to the polymer layer 432, the posterior side 634 may be similar in form to the posterior side 434, and the anterior side 636 may be similar in form to the anterior side 436.

In an example, the fabrication device 600 may cure the polymer material 430 to a fully-cured state when the plurality of protrusions 422 extend from the surface 424 of the molding piece 420 in the same or similar way the fabrication device 400 cures the polymer material 430 to a fully-cured state as described with reference to FIG. 4h.

Figure 6B:
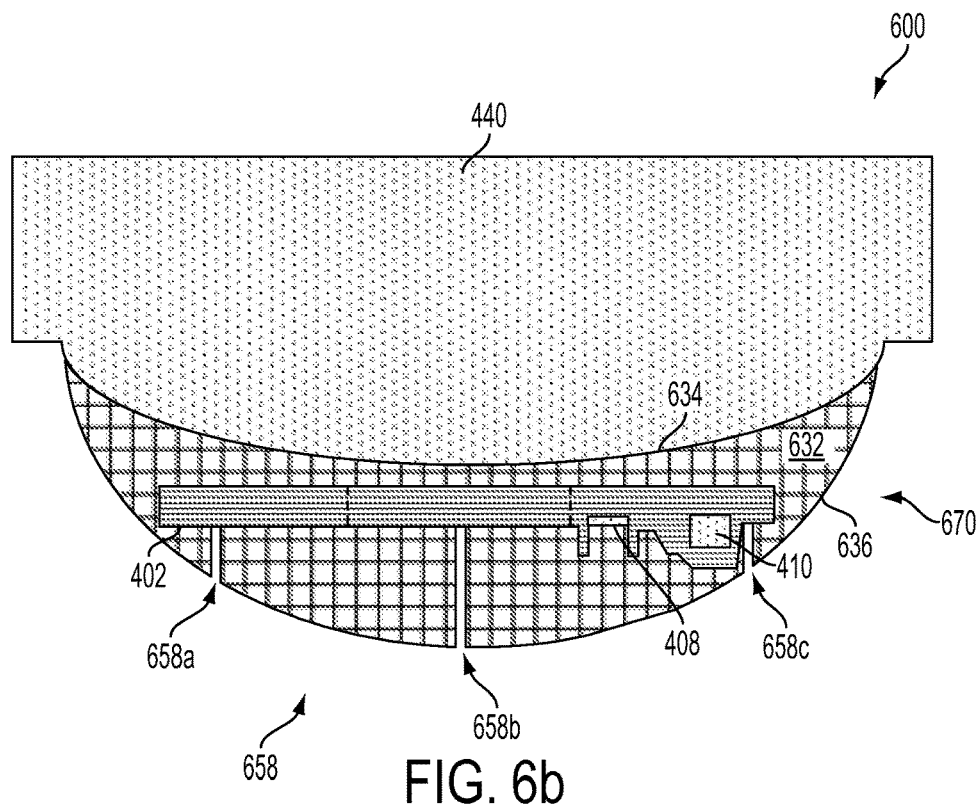
FIG. 6b is an illustration of removing an eye-mountable device from the molding piece, according to an example embodiment.

FIG. 6b illustrates an example in which the eye-mountable device is removed from the molding piece. In particular, FIG. 6b illustrates the fabrication device 600 removing the eye-mountable device 670 from the molding piece 420. The eye-mountable device 670 includes the polymer layer 632, the structure 402, the sensor 408, the electronics 410, the posterior side 634, and the anterior side 636. As shown in FIG. 6, the anterior side 636 includes and a plurality of channels 658 to the structure 402.

In an example, the plurality of channels 658 may be formed by the plurality of protrusions 422. In addition, in such an example, the number of channels in the plurality of channels 658 may correspond with the number of protrusions of the plurality of protrusions 422. In the illustrated example, the plurality of channels 658 may include three channels, a first channel 658a, a second channel 658b, and a third channel 658c. However, in other examples, the plurality of channels 658 may include more than three channels.

Moreover, in an example, the fabrication device 600 may remove the eye-mountable device 670 from the molding piece 420 in the same or similar way as the fabrication device 400 removes the eye-mountable device 470 as described with reference to FIG. 4i.

When the polymer layer includes a plurality of channels to the structure, the method 100 may further involve providing a polymer material over a respective portion of each channel of the plurality of channels. For instance, in some examples, the polymer material may be provided over a respective opening of each channel of the plurality of channels. With this arrangement, moisture ingress to the electronics may be reduced.

In some examples, the polymer material may be provided over the respective portions of each channel of the plurality of channels after the eye-mountable device is removed from the molding piece and/or the press.

Figure 7:
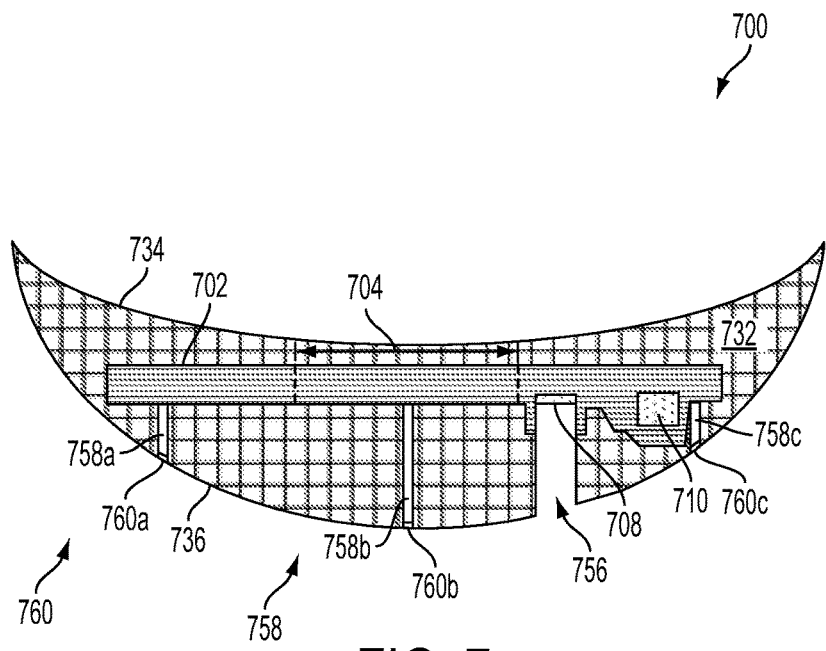
FIG. 7 is an illustration of an eye-mountable device formed according to an example embodiment.

FIG. 7 illustrates an eye-mountable device 700 formed according to an example embodiment. In particular, FIG. 7 illustrates a plurality of polymer caps 760 formed over a plurality of channels 758 to a structure 702 that includes a sensor 708 and electronics 710. With this arrangement, the plurality of polymer caps 760 may reduce moisture ingress to the electronics 710.

In the eye-mountable device 700, the structure 702 is embedded in a polymer layer 732. The structure 702 has an outer diameter and a hole 704 that defines an inner diameter, the sensor 708 configured to detect an analyte, and electronics 710. The eye-mountable device 700 includes a posterior side 734 and the anterior side 736. The anterior side 736 includes the plurality of channels 758 and a channel 756 to the sensor 708. The plurality of channels 758 includes three channels: a first channel 758a, a second channel 758b, and a third channel 758c.

The structure 702 may take the form of or be similar in form to the structure 402 and/or the structure 502, the sensor 708 may take the form of or be similar in form to the sensor 408 and/or the sensor 508, the electronics 710 may take the form of or be similar in form to the electronics 410 and/or the electronics 510, the polymer layer 732 may take the form of or be similar in form to the polymer layer 632, the channel 756 may take the form of or be similar in form to the channel 556, and the posterior side 734 may take the form of or be similar in form to the posterior side 634. As shown in FIG. 7, each polymer cap of the plurality of polymer caps 760 may be formed over a respective opening of each channel of the plurality of channels 758 in the anterior side 736.

In some examples, the plurality of polymer caps 760 may be the same or similar material as the polymer layer 732. However, in other examples, the plurality of polymer caps 760 may be a different material than the polymer layer 732. The plurality of polymer caps 760 may be any material that the polymer layer 732 may include. Moreover, in some examples, each polymer cap of the plurality of polymer caps 760 may be the same material. However, in other examples, at least one polymer cap of the plurality of polymer caps 760 may be a different material.

In an example, the number of polymer caps in the plurality of polymer caps 760 may correspond with the number of channels in the plurality of channels 758. In the illustrated example, the plurality of polymer caps 760 may include three polymer caps, a first polymer cap 760a formed over the first channel 758a, a second polymer cap 760b formed over the second channel 758b, and a third polymer cap 760c formed over the third channel 758c. However, in other examples, the plurality of polymer caps 760 may include more than three polymer caps.

Although an example in which the polymer material is cured to a fully-cured state to form the polymer layer when the plurality of protrusions extend from the surface of the molding piece has been described above, in other examples the polymer material may be cured to a fully-cured state to form the polymer layer when at least one protrusion of the plurality of protrusions extends from the surface of the molding piece. With this arrangement, at least one channel to the structure may be formed by the at least one protrusion that extends from the surface of the molding piece.

I. Conforming a Structure to a Curvature of the Polymer Layer During Formation of the Polymer Layer Although an example in which the structure is conformed to a curvature of the polymer layer before the polymer is formed has been described above, in other examples the structure may not be conformed to a curvature of the polymer layer before the polymer layer is formed. Instead, in some examples, the structure may be conformed to a curvature of the polymer layer during formation of the polymer layer.

Figure 8:
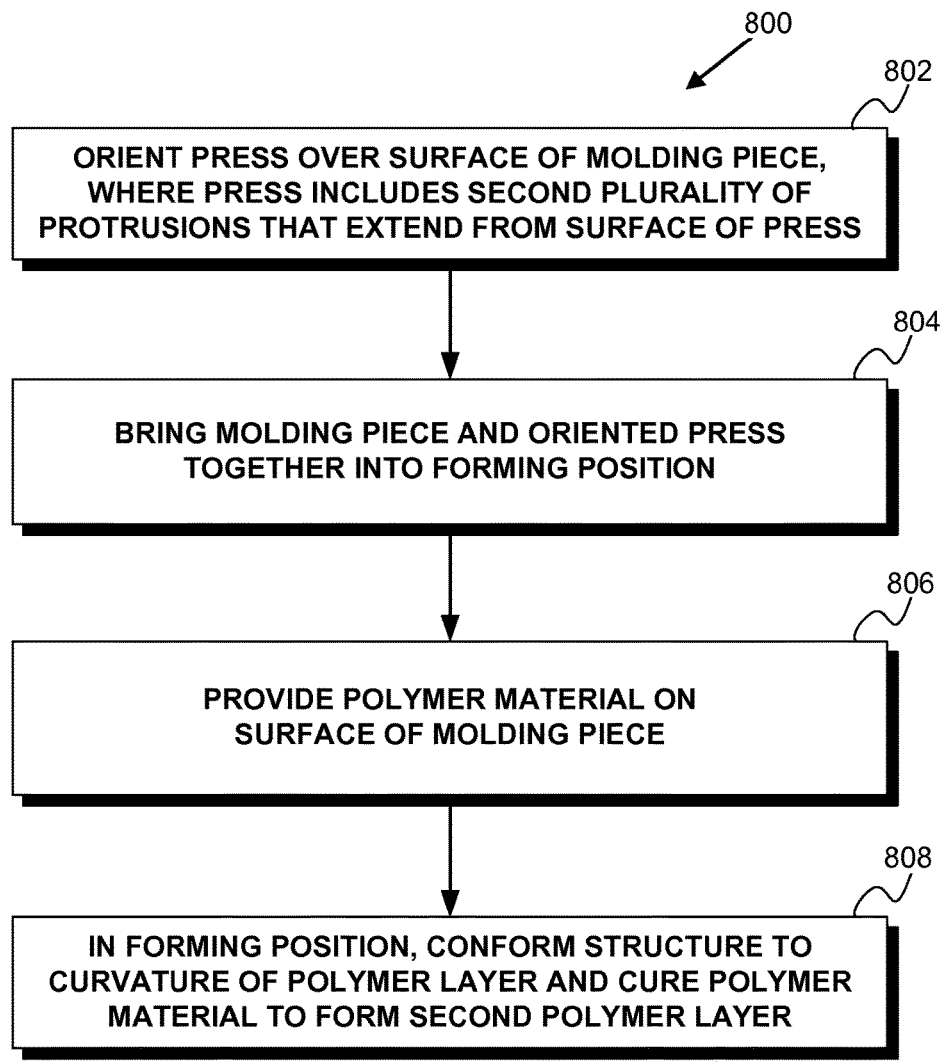
FIG. 8 is a flow chart illustrating a method, according to an example embodiment.

FIG. 8 is a flow chart illustrating another method 800, according to an example embodiment. The method 800 may be performed in connection with block 104 of the method 100. More specifically, as shown by block 802, the method 800 may involve orienting a press over the surface of the molding piece, wherein the press comprises a second plurality of protrusions that extend from a surface of the press. Further, as shown by block 804, the method 800 may involve bringing the molding piece and the oriented press together into a forming position. In the forming position, the plurality of protrusions extending from the molding piece and the second plurality of protrusions extending from the press contact the structure. Further still, as shown by block 806, the method 800 may involve providing a polymer material on the surface of the molding piece. And, as shown by block 808, the method 800 may involve in the forming position, (i) conforming the structure to a curvature of the polymer layer and (ii) curing the polymer material to form the polymer layer.

Figure 9:
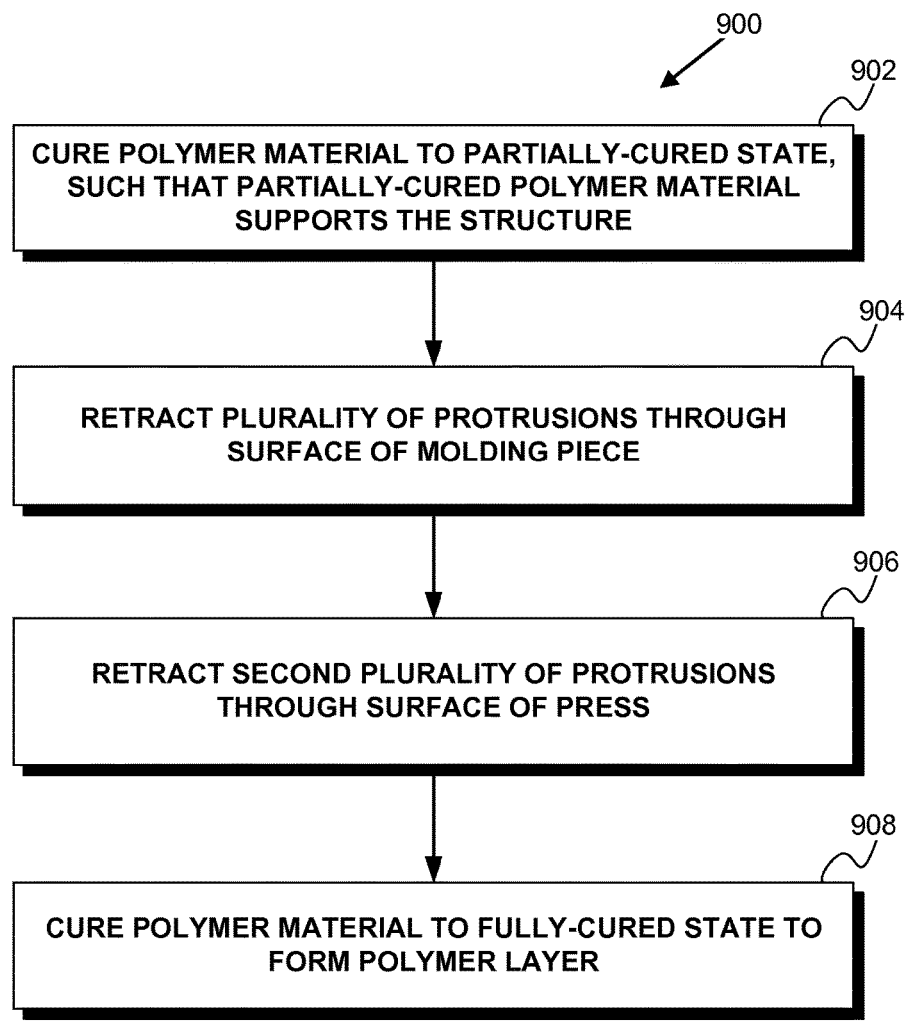
FIG. 9 is a flow chart illustrating a method, according to an example embodiment.

FIG. 9 is a flow chart illustrating yet another method 900, according to an example embodiment. The method 900 may be performed in connection with block 808 of the method 800. More specifically, as shown by block 902, the method 900 may involve curing the polymer material to a partially-cured state, such that the partially-cured polymer material supports the structure as the polymer layer is being formed. Further, as shown by block 904, the method 900 may involve retracting the plurality of protrusions through the surface of the molding piece. Further still, as shown by block 906, the method 900 may involve retracting the second plurality of protrusions through a surface of the press. And, as shown by block 908, the method 900 may involve curing the polymer material to a fully-cured state to form the polymer layer.

For purposes of illustration, the methods 800 and 900 are described as being carried out by a fabrication device that utilizes cast or compression molding. It should be understood, however, the methods 800 and 900 may be carried out by a fabrication device that utilizes other methods and/or processes for forming body-mountable devices.

Moreover, for purposes of illustration, the methods 800 and 900 are described below for an example in which the body-mountable device is an eye-mountable device. It should be understood, however, that the methods 800 and 900 may involve other types of body-mountable devices, such as tooth-mountable devices or skin-mountable devices.

Methods 800 and 900 will now be described in greater detail below with reference to FIGS. 10a-10f. It is noted that relative dimensions in FIGS. 10a-10f are not necessarily to scale, but have been rendered for purposes of explanation only in describing example methods. As shown in FIGS. 10a-10f, a fabrication device 1000 may be used to form an eye-mountable device. The fabrication device 1000 may include the molding piece 420.

1. Orienting a Press Over the Surface of the Molding Piece

Figure 10A:
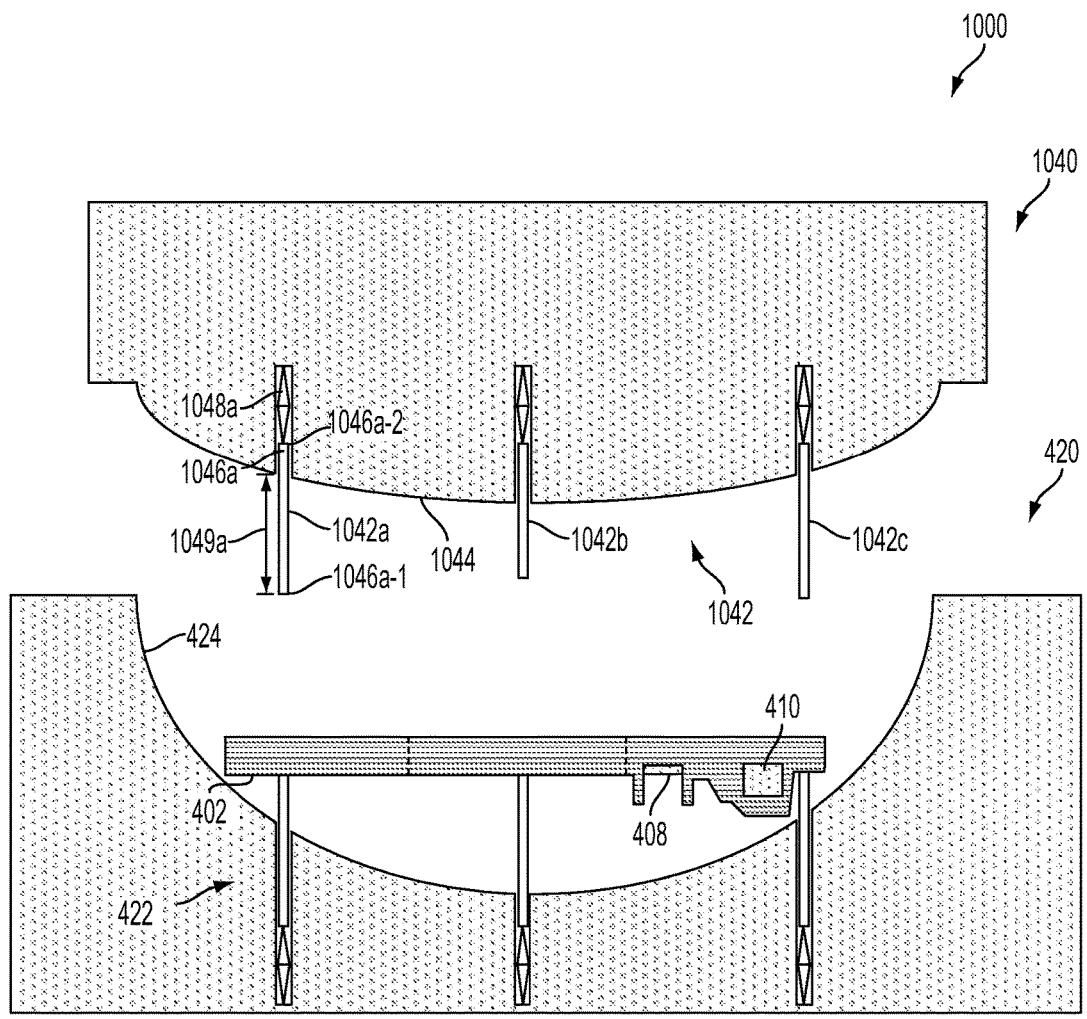
FIG. 10a is an illustration of orienting a press over a surface of a molding piece, wherein the molding piece has a plurality of protrusions and the press has a second plurality of protrusion, according to an example embodiment.

As mentioned above, at block 802, a press may be oriented over the surface of the molding piece. FIG. 10a illustrates an example in which the press is oriented over the surface of the molding piece. In particular, FIG. 10a illustrates the fabrication device 1000 orienting a press 1040 over the surface 424 of the molding piece 420.

As shown in FIG. 10a, the press 1040 may include a second plurality of protrusions 1042 and a surface 1044. The second plurality of protrusions 1042 may extend from the surface 1040. The press 1040 may take the form of or be similar in form to the press 440, the second plurality of protrusions 1042 may take the form of or be similar in form to the plurality of protrusions 422, and the surface 1044 may take the form of or be similar in form to the surface 444.

For instance, in the illustrated example, the second plurality of protrusions 1042 may include three protrusions: a first protrusion 1042a, a second protrusion 1042b, and a third protrusion 1042c. As shown in FIG. 10a, the first protrusion 1042a may include a rod 1046a and a spring 1048a. The rod 1046a may have a first end 1046a-1 and a second end 1046a-2, and the spring 1048a may be connected to the second end 1046a-2 of the rod 1046a. Moreover, the rod 1046a may have a length 1049a that extends from the surface 1044.

The first protrusion 1042a may take the form of or be similar in form to the first protrusion 422a, the second protrusion 1042b may take the form of or be similar in form to the second protrusion 422b, the third protrusion 1042c may take the form of or be similar in form to the third protrusion 422c, the rod 1046a may take the form of or be similar in form to the rod 426a, the spring 1048a may take the form of or be similar in form to the spring 428a, the first end 1046a-1 of the rod 1046a may take the form of or be similar in form to the first end 426a-1 of the rod 426a, and the second end 1046a-2 of the rod 1046a may take the form of or be similar in form to the second end 426a-2 of the rod 426a.

In an example, the fabrication device 1000 may orient the press 1040 over the surface 424 of the molding piece 420 in the same or similar way as the fabrication device 400 orients the press 440 over the polymer material 430 on the surface 424 of the molding 420 as described with reference to FIG. 4d.

2. Bringing the Molding Piece and the Oriented Press into a Forming Position

Figure 10B:
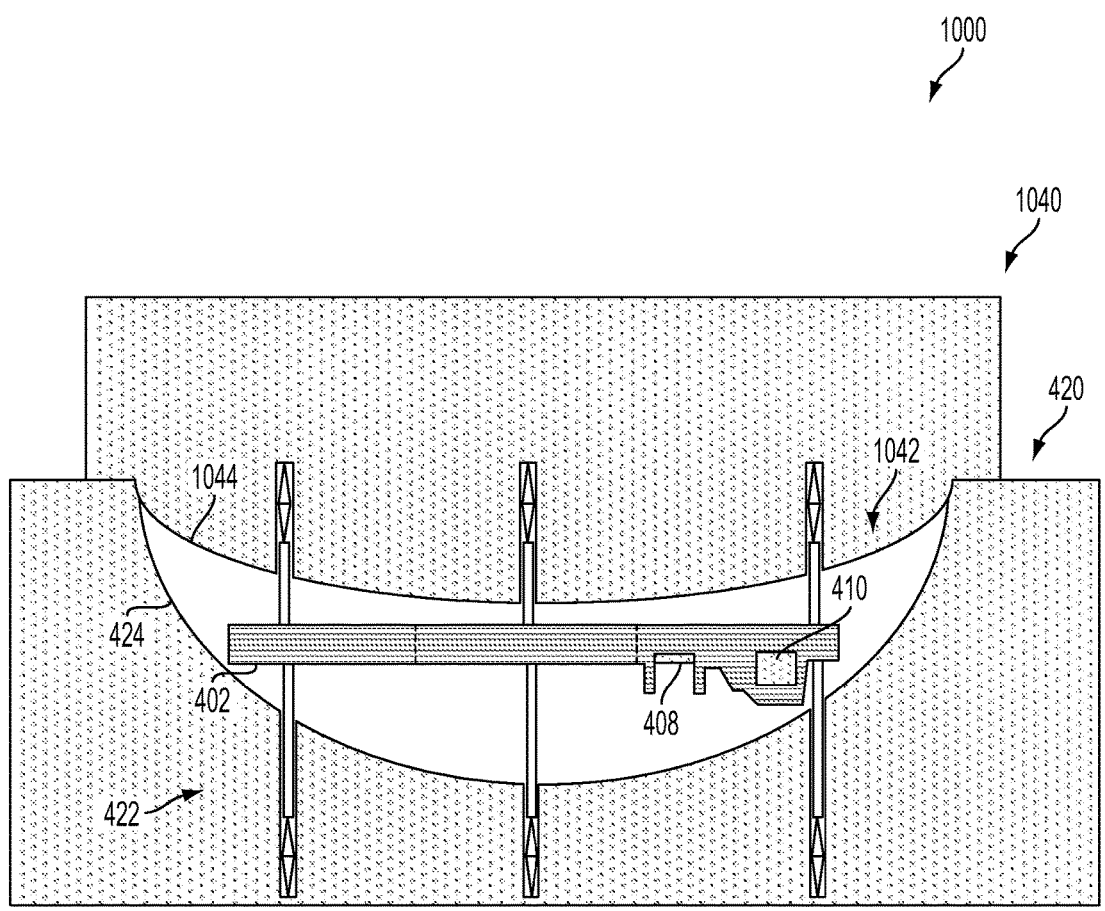
FIG. 10b is an illustration of bringing the molding piece and the oriented press together into a forming position, according to an example embodiment.

As mentioned above, at block 804, the molding piece and oriented press may be brought together into the forming position. FIG. 10b illustrates an example in which the fabrication device 1000 brings the molding piece and the oriented press together into the forming position. In particular, FIG. 10b illustrates the fabrication device 1000 bringing the molding piece 420 and the press 1040 (oriented as shown in FIG. 10a) together into the forming position.

As shown in FIG. 10b, in the forming position, the second plurality of protrusions 1042 may contact the structure 402. Moreover, in the forming position, the second plurality of protrusions 1042 may apply a pressure to the structure 402. In some examples, the plurality of protrusions 1042 may be configured to apply a uniform pressure to the structure 402. Moreover, in some examples, the pressure applied by the second plurality of protrusions 1042 may conform (e.g., bend) the structure 402.

In an example, the structure 402 may have a second plurality of alignment features (not shown) in the first surface 414 of the structure 404 (as shown in FIG. 4a) and bringing the molding piece and the oriented press into a forming position may involve aligning the second plurality of alignment features with the second plurality of protrusions 1042. For instance, the second plurality of alignment features may include a first alignment feature (not shown) and aligning the second plurality of alignment features with the second plurality of protrusions 1042 may involve aligning the first alignment feature with the first end 1046a-1 of the rod 1046a of the first protrusion 1042a. The second plurality of alignment features may take the form of or be similar in form to the plurality of alignment features, and the first alignment feature of the second plurality of alignment features may take the form of or be similar in form to the first alignment feature of the plurality of alignment features.

Moreover, in an example when the structure 402 is positioned on the plurality of protrusions 422, such that the first surface 414 of the structure 402 contacts the plurality of protrusions 422, the second plurality of alignment features may be in the second surface 416 of the structure 402.

3. Providing a Polymer Material on the Surface of the Molding Piece

Figure 10C:
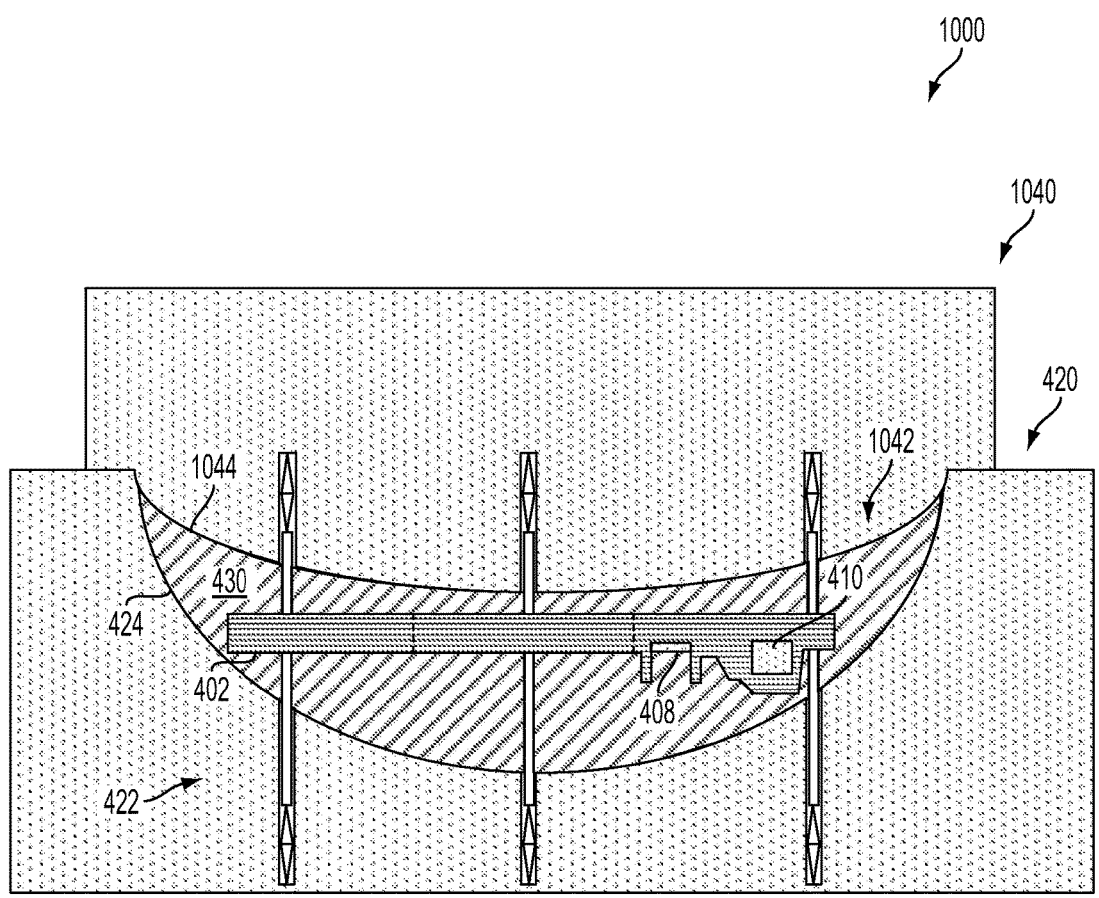
FIG. 10c is an illustration of providing a polymer material on the surface of the molding piece, according to an example embodiment.

As mentioned above, at block 806, a polymer material may be provided on the surface of the molding piece. FIG. 10c illustrates an example in which a polymer material is provided on the surface of the molding piece. In particular, FIG. 10c illustrates the fabrication device 1000 providing the polymer material 430 on the surface 424 of the molding piece 420.

In some examples, when the molding piece 420 and the press 1040 are in the forming position, the molding piece 420 and/or the press 1040 may include an inlet (not shown) that is configured to receive the polymer material 430 on the surface of the molding piece 420.

In an example, the fabrication device 1000 may provide the polymer material 430 on the surface 424 of the molding piece 420 in the same or similar way the fabrication device 400 may provide the polymer material 430 on the surface 424 of the molding piece 420 as described with reference to FIG. 4a.

After the polymer material 430 is provided on the surface of the molding piece 420, the surface 1044 of the press 1040 contacts the polymer material 430. Moreover, in the forming position, the molding piece 420 and the press 1040 may apply press to the polymer material 430. In some examples, the molding piece 420 and/or the press 1040 may be configured to apply uniform pressure to the polymer material 430. Moreover, in some examples, in the forming position, the pressure applied by the press 1040 may deform at least a portion of the polymer material 430.

Figure 10D:
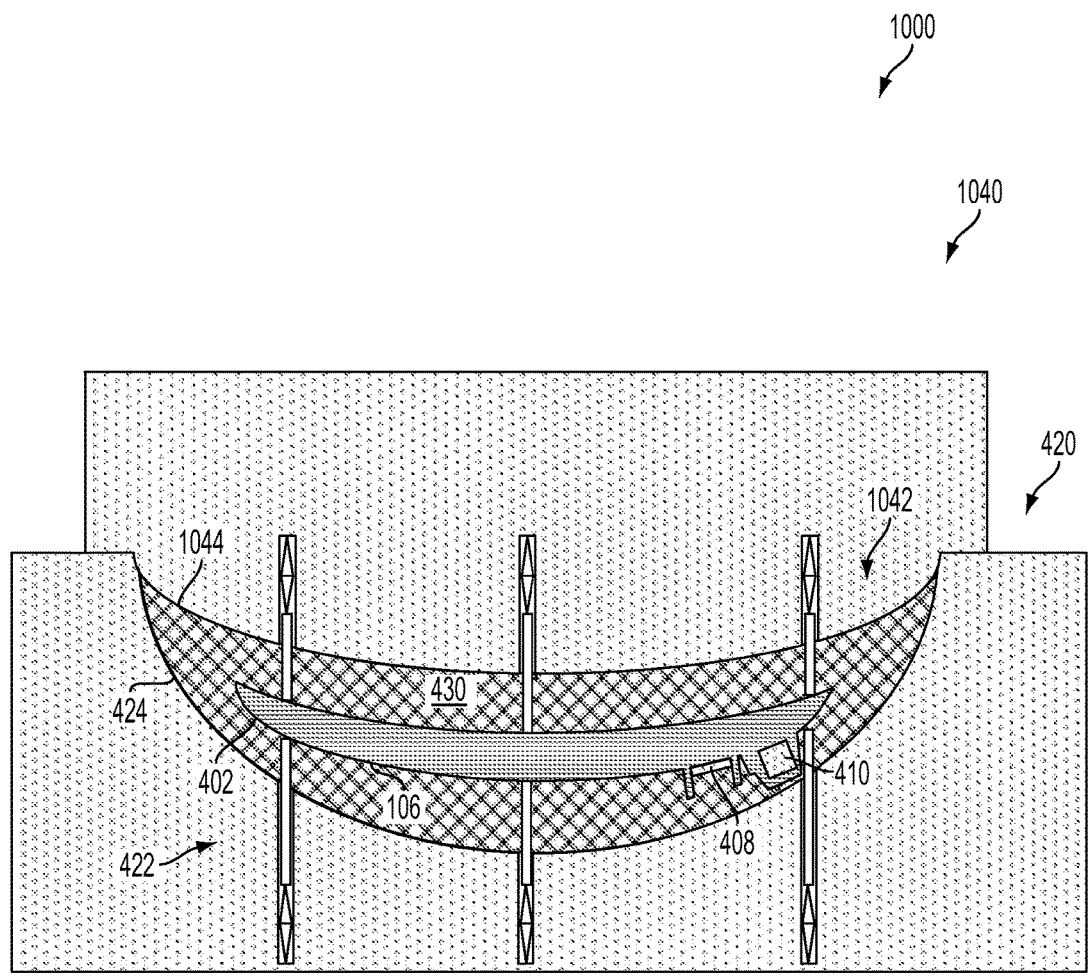
FIG. 10*d* is an illustration of curing the polymer material to a partially-cured state, according to an example embodiment.
Figure 10E:
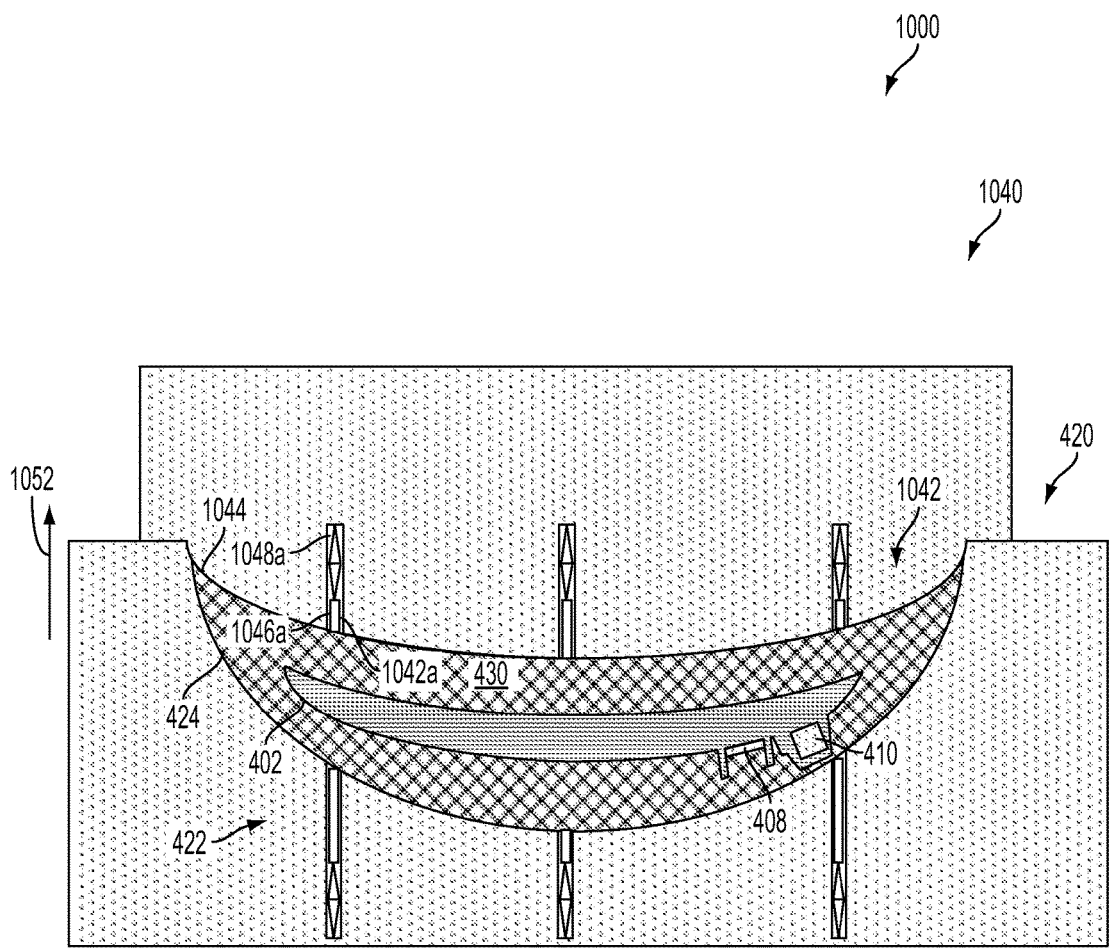
FIG. 10*e* is an illustration of retracting the plurality of protrusions and the second plurality of protrusions, according to an example embodiment.
Figure 10F:
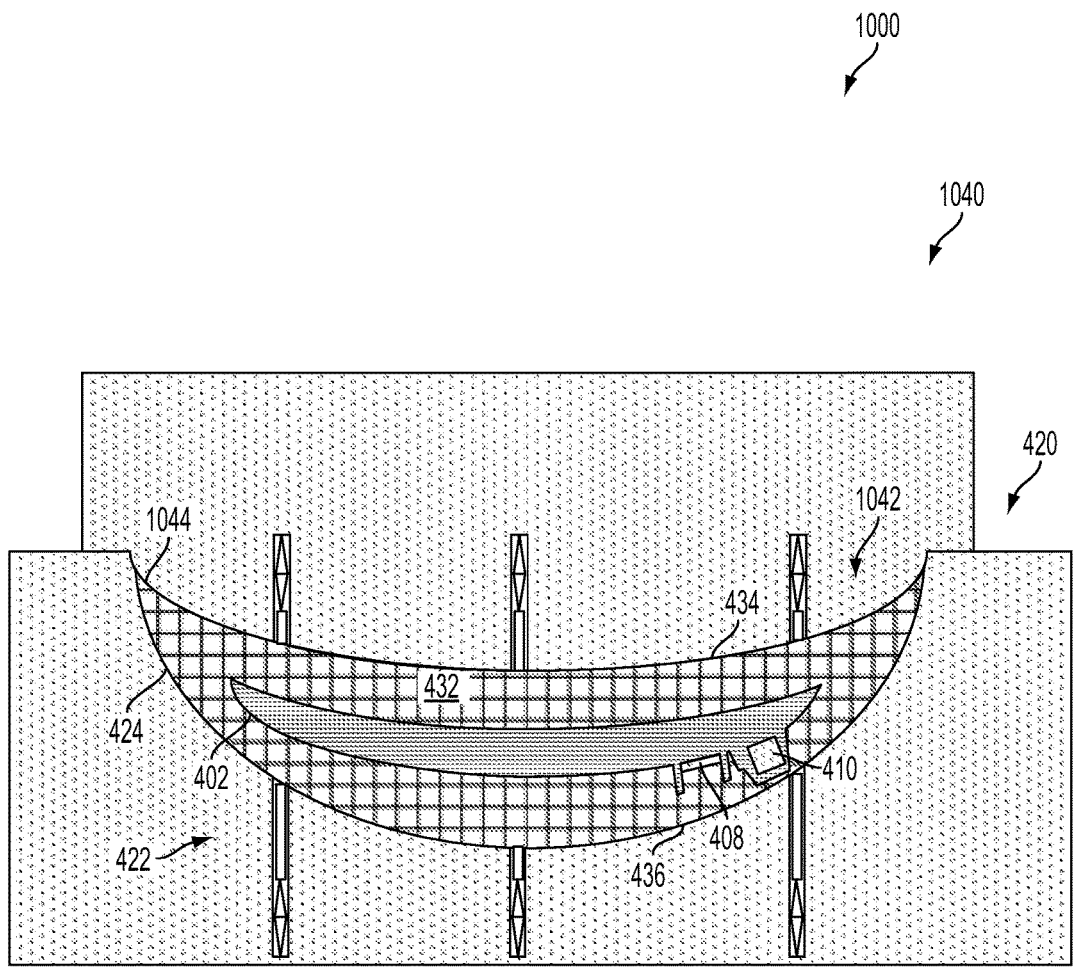
FIG. 10*f* is an illustration of curing the polymer material to a fully-cured state to form a polymer layer, according to an example embodiment.

4. In the Forming Position, Conforming the Structure to a Curvature of the Polymer Layer and Curing the Polymer Material to Form the Polymer Layer As mentioned above, at block 808, in the forming position, the structure may be conformed and the polymer material may be cured to form the polymer layer 432. FIGS. 10d-10f illustrate an example in which the structure is conformed to a curvature of the polymer layer and cures the polymer material to form the polymer layer. In particular, FIGS. 10d-10f illustrate in the forming position, the fabrication device 1000 conforming the structure 402 to a curvature of the polymer layer 432 and curing the polymer material 430 to form the polymer layer 432. With this arrangement, deformation of the polymer layer 432 may be reduced, and/or operability of an eye-mountable device may be improved.

i. Curing the Polymer Material to a Partially-Cured State

As mentioned above, at block 902, the polymer material may be cured to a partially-cured state. FIG. 10d illustrates an example in which the fabrication device 1000 partially-cures the polymer material, such that the partially-cured polymer material supports the structure. In particular, FIG. 10d illustrates the fabrication device 1000 partially-cures the polymer material 430 to a partially-cured state, such that the polymer material 430 supports the structure 402. In an example, the fabrication device 1000 may partially-cure the polymer material 430 to a partially-cured state in the same or similar way as the fabrication device 400 partially-cures the polymer material 430 as described with reference to FIG. 4f.

Moreover, as shown in FIG. 10d, the structure 402 may be conformed to a curvature of the polymer layer 432. In the forming positioning, the pressure applied by the second plurality of protrusions 1042 to the structure 402 may conform the structure 402 to a curvature of the polymer layer 432, such as a curvature of the posterior side 434 or the anterior side 436 of the eye-mountable device 470. In some examples, the pressure applied by the molding piece 420 and/or the press 1040 may assist with conforming the structure 402 to a curvature of the polymer layer 432.

In the illustrated example, the structure 402 is conformed to a curvature of the polymer layer 432 in the forming position after the polymer material 430 is provided on the surface 424 of the molding piece 420. However, in other examples, the structure 402 may be conformed to a curvature of the polymer layer 432 in the forming position before the polymer material 430 is provided on the surface of the molding 420.

ii. Retracting the Plurality of Protrusions Through the Surface of the Molding Piece and Retracting the Second Plurality of Through the Surface of the Press As mentioned above, at block 904, the plurality of protrusions may be retracted. In addition, as mentioned above, at block 906, the second plurality of protrusions may be retracted. FIG. 10e illustrates an example in which the plurality of protrusions is retracted through the surface of the molding piece and the second plurality of protrusions is retracted through the surface of the press. In particular, FIG. 10e illustrates the fabrication device 1000 retracting the plurality of protrusions 422 through the surface 424 of the molding piece 420 and retracting the second plurality protrusions 1042 through the surface 1044 of the press 1040.

In an example, the fabrication device 1000 may retract the plurality of protrusions 422 and the second plurality of protrusions 1042 at substantially the same time. However, in other examples, the fabrication device 1000 may retract the plurality of protrusions 422 before (or after) the second plurality of protrusions 1042 is retracted.

In an example, the fabrication device 1000 may retract the plurality of protrusions 422 in the same or similar way as the fabrication device 400 retracts the plurality of protrusions 422 as described with reference to FIG. 4g. Moreover, in an example, the fabrication device 1000 may retract the second plurality of protrusions 1042 in the same or similar way as the fabrication device 1000 retracts the plurality of protrusions 422.

For instance, retracting the first protrusion 1042a through the surface 1044 of the press 1040 may involve the spring 1048a deforming, such that the rod 1026a retracts through the surface 1044 of the press 1040. With this arrangement, each spring of a respective protrusion of the second plurality of protrusions 1042 may deform, such that the respective protrusion retracts through the surface 1044 of the press 1040.

In another example, each protrusion of the second plurality of protrusions 1042 may be connected to a plate (not shown), and retracting the second plurality of protrusions 1042 through the surface 1044 of the press 1040 may involve translating the plate in a direction substantially parallel to an axis 1052 of the press 1040, such that the second plurality of protrusions 1042 retract through the surface 1044 of the press 1040.

In an example, the retraction of the second plurality of protrusions 1042 may be active. For instance, a control system (not shown) may control certain equipment (e.g., an electric motor or a hydraulic pull coupled to the second plurality of protrusions 1042) to retract the second plurality of protrusions 1042. Moreover, in some examples, each protrusion of the second plurality of protrusions 1042 may be fully refracted. However, in some examples, at least one protrusion of the second plurality of protrusions 1042 may be partially retracted, such that at least a portion of the at least one protrusion extends from the surface 1044 of the press 1040.

As shown in FIG. 10e, when the plurality of protrusions 422 is retracted through the surface 424 of the molding piece 422 and the second plurality of protrusions 1042 is retracted through the surface 1040 of the press 1040, the polymer material 430 may flow into some or all of the space vacated by the protrusions.

In some examples, an eye-mountable device removed from the molding piece 420 may have a plurality of indentations in the polymer layer formed by the retraction of the plurality of protrusions 422 and a second plurality of indentations in the polymer layer formed by the retraction of the second plurality of protrusions 1042. In an example, the indentations of the plurality of indentations and the second plurality of indentations may be sufficiently small so as not to adversely affect comfort of wearing the eye-mountable device.

The plurality of indentations and the second plurality of indentations may take the form of or be similar in form to the plurality of indentations 558. For instance, in some examples, the plurality of indentations may be in the anterior side of the eye-mountable device and the second plurality of indentations may be in the posterior side of the eye-mountable device. However, in other examples, the plurality of indentations may be in the posterior side of the eye-mountable device and the second plurality of indentations may be in the posterior side of the eye-mountable device.

iii. Curing the Polymer Material to a Fully-Cured State to Form the Polymer Layer As mentioned above, at block 908, the polymer material may be cured to a fully-cured state. FIG. 10f illustrates an example in which the fabrication device 1000 cures the polymer material to a fully-cured state to form the polymer layer. In particular, FIG. 10f illustrates an example in which the fabrication device 1000 cures the polymer material 430 to a fully-cured state to form the polymer layer 432. As shown in FIG. 10f, the polymer layer 432 defines the posterior side 434 and the anterior side 436 of the eye-mountable device.

In an example, the fabrication device 1000 may cure the polymer material 430 to a fully-cured state in the same or similar way as the fabrication device 400 cures the polymer material 430 to fully-cured state as described with reference to FIG. 4h.

When the press includes a second plurality of protrusions, the method 100 may further involve applying a non-stick coating to at least one protrusion of the second plurality of protrusions. With this arrangement, the coated protrusion(s) may not stick to the polymer layer 432 and/or the structure 402 during formation of the polymer layer 432. Moreover, in some examples, the coated protrusions may not bond to the polymer layer 432 and/or the structure 402 during formation of the polymer layer 432.

In some examples, the non-stick coating applied to at least one protrusion of the second plurality of protrusions 1042 may be the same or similar material as the non-stick coating applied to at least one protrusion of the plurality of protrusions 422 and/or a portion of the structure 402. However, in other examples, the non-stick coating applied to at least one protrusion of the second plurality of protrusions 1042 may be a different material than the non-stick coating applied to at least one protrusion of the plurality of protrusions 422 and/or a portion of the structure 402. The non-stick coating applied to at least one protrusion of the second plurality of protrusions may include any of the materials that the non-stick coating applied to at least one protrusion of the plurality of protrusions 422 and/or a portion of the structure 402 may include. Moreover, in an example, the fabrication device 1000 may apply a non-stick coating to at least one protrusion of the second plurality of protrusions in the same or similar way as the at least one protrusion of the plurality of protrusions 422 and/or a portion of the structure 402.

J. In the Forming Position, Curing the Polymer Material when the Plurality of Protrusions Extend from the Surface of the Molding Piece and the Second Plurality of Protrusions Extend from the Surface of the Press Although an example in which the plurality of protrusions and the second plurality of protrusions are retracted during the formation of the polymer layer has been described above, in other examples the plurality of protrusions and the second plurality of protrusions may not be retracted during formation of the polymer layer. Instead, in some examples, the fabrication device may cure the polymer material to a fully-cured state when the plurality of protrusions and the second plurality of protrusions extend from the surface of the molding piece. Moreover, in such examples, the body-mountable device removed from the molding piece may have a plurality of channels to the structure in the polymer layer formed by the plurality of protrusions and a second plurality of channels to the structure in the polymer layer formed by the second plurality of protrusions.

Figure 11A:
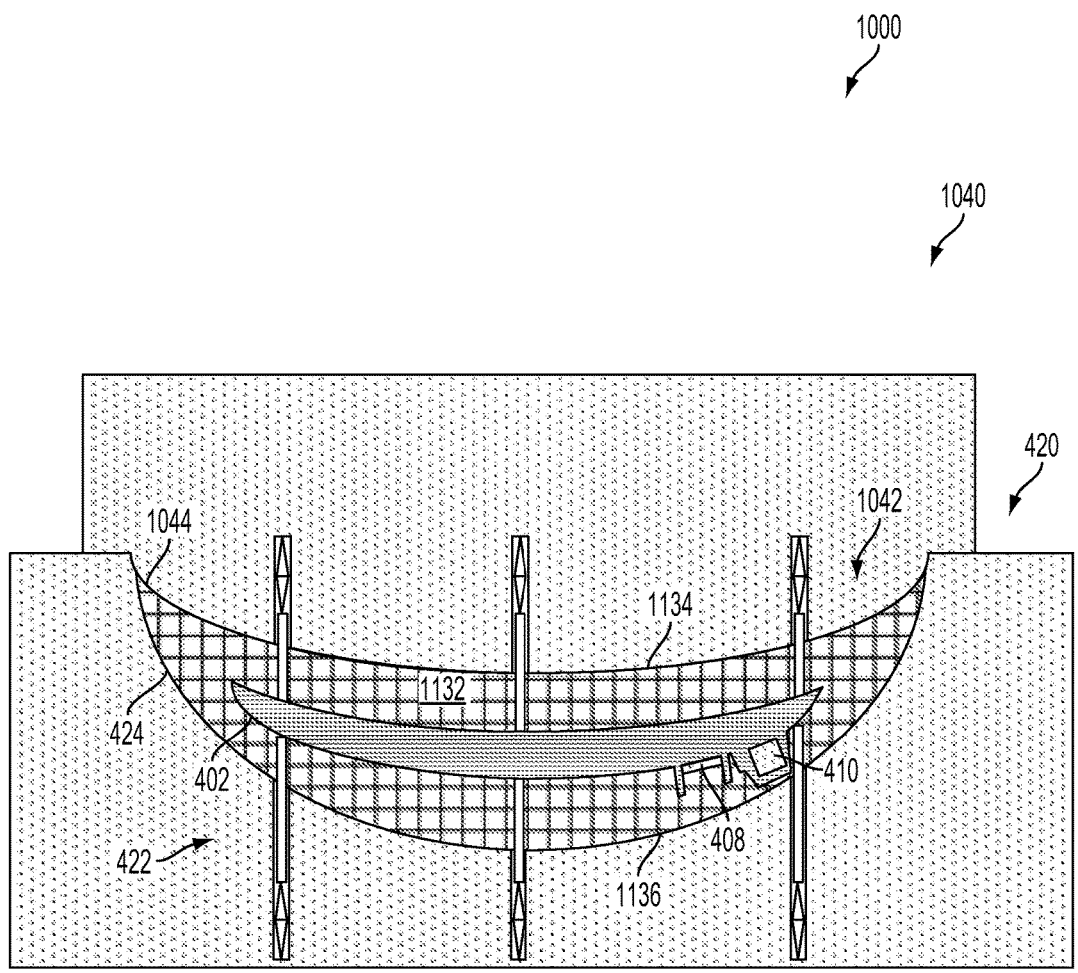
FIG. 11*a* is an illustration of curing a polymer material to a fully-cured state to form a polymer layer, according to an example embodiment.

FIG. 11a illustrates an example in which the polymer material is cured to a fully-cured state to form a polymer layer when the plurality of protrusions extend from the surface of the molding piece and the second plurality of protrusions extend from the surface of the press. In particular, FIG. 11a illustrates a fabrication device 1100 curing the polymer material 430 to a fully-cured state to form a polymer layer 1132 when the plurality of protrusions 422 extend from the surface 424 of the molding piece 420 and the second plurality of protrusions 1042 extend from the surface 1044 of the press 1040. With this arrangement, the plurality of protrusions 422 may at least partially support the structure 402 as the polymer layer 1132 is being formed. The polymer layer 1132 may define a posterior side 1134 and an anterior side 1136 of an eye-mountable device. The polymer layer 1132 may be similar in form to the polymer layer 432 and/or the polymer layer 632, the posterior side 1134 may be similar in form to the posterior side 434 and/or the posterior side 634, and the anterior side 1136 may be similar in form to the anterior side 436 and/or the anterior side 636.

In an example, the fabrication device 1100 may cure the polymer material 430 to a fully-cured state when the plurality of protrusions 422 extend from the surface 424 of the molding piece 420 and when the second plurality of protrusions 1042 extend from the surface 1044 of the press 1040 in the same or similar way as the fabrication device 400 cures the polymer material 430 to a fully-cured state as described with reference to FIG. 4h and/or the fabrication device 600 cures the polymer material 430 to a fully-cured state as described with reference to FIG. 6a.

Figure 11B:
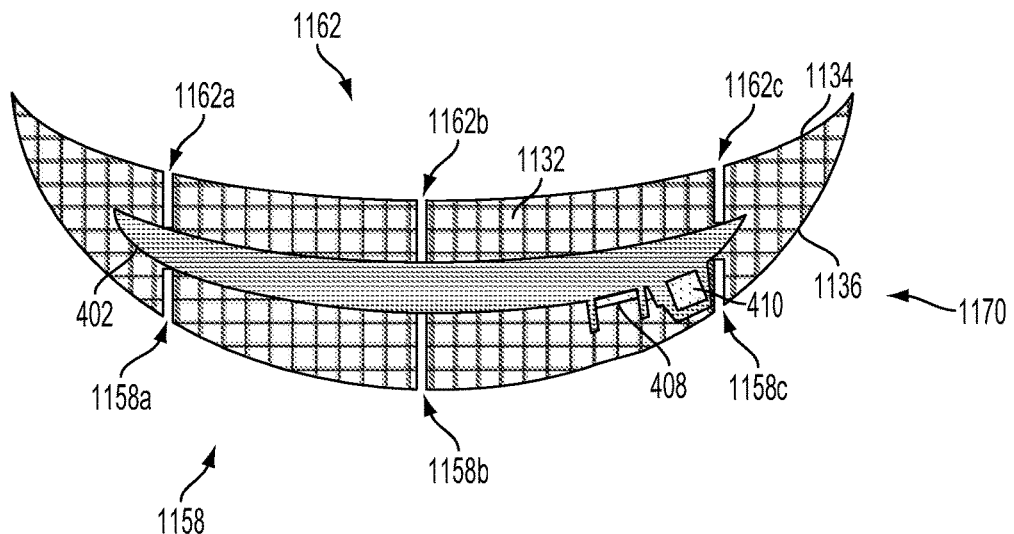
FIG. 11*b* is an illustration of removing an eye-mountable device from a molding piece and a press, according to an example embodiment.

FIG. 11b illustrates an example in which the eye-mountable device is removed from the molding piece. In particular, FIG. 11b illustrates the fabrication device 1100 removing an eye-mountable device 1170 from the molding piece 420 and the press 1040.

The eye-mountable device 1170 includes the polymer layer 1132, the structure 402, the sensor 408, the electronics 410, the posterior side 1134, the anterior side 1136. As shown in FIG. 11, the anterior side 1136 includes a plurality of channels 1158 to the structure 402 and the posterior side 1134 includes a second plurality of channels 1162 to the structure 402.

In an example, the plurality of channels 1158 may be formed by the plurality of protrusions 422. In addition, in such an example, the number of channels in the plurality of channels 1158 may correspond with the number of protrusions of the plurality of protrusions 422. In the illustrated example, the plurality of channels 1158 may include three channels, a first channel 1158a, a second channel 1158b, and a third channel 1158c. However, in other examples, the plurality of channels 1158 may include more than three channels.

Moreover, in an example, the second plurality of channels 1162 may be formed by the second plurality of protrusions 1042. In addition, in such an example, the number of channels in the second plurality of channels 1162 may correspond with the number of protrusions of the second plurality of protrusions 1042. In the illustrated example, the second plurality of channels 1162 may include three channels, a first channel 1162a, a second channel 1162b, and a third channel 1162c. However, in other examples, the second plurality of channels 1162 may include more than three channels.

Further, in an example, the fabrication device 1100 may remove the eye-mountable device 1170 from the molding piece 420 and the press 1040 in the same or similar way as the fabrication device 400 removes the eye-mountable device 470 as described with reference to FIG. 4h.

When the polymer layer includes a plurality of channels to the structure and a second plurality of channels to the structure, the method 100 may further involve providing a polymer material over a respective portion of each channel of the plurality of channels and providing a polymer material over a respective portion of each channel of the second plurality of channels. For instance, in some examples, the polymer material may be provided over a respective opening of each channel of the plurality of channels and each channel of the second plurality of channels. With this arrangement, moisture ingress to the electronics may be reduced.

Figure 12:
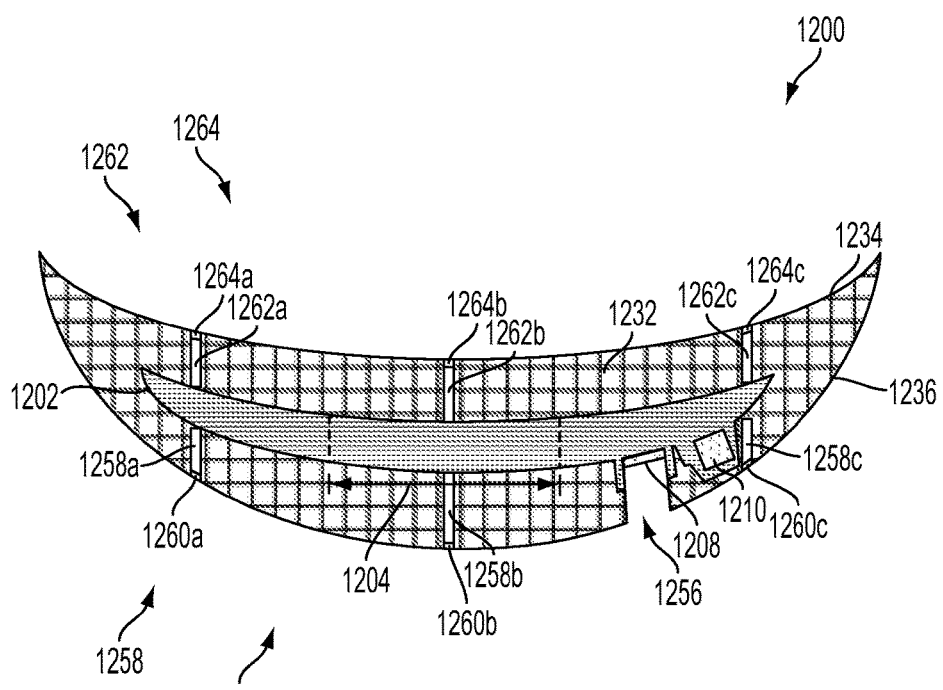
FIG. 12 is an illustration of an eye-mountable device formed according to an example embodiment.

FIG. 12 illustrates an eye-mountable device 1200 formed according to an example embodiment. In particular, FIG. 12 illustrates a plurality of polymer caps 1260 formed over a plurality of channels 1258 to a structure 1202 that includes a sensor 1208 and electronics 1210 and a second plurality of polymer caps 1264 formed over a second plurality of channels 1262 to the structure 1202. With this arrangement, the plurality of polymer caps 1260 and the second plurality of polymer caps 1264 may reduce moisture ingress to the electronics 1210.

In the eye-mountable device 1200, the structure 1202 is embedded in a polymer layer 1232. The structure 1202 has an outer diameter and a hole 1204 that defines an inner diameter, the sensor 1208 configured to detect an analyte, and electronics 1210. The eye-mountable device 1200 includes a posterior side 1234 and the anterior side 1236. The anterior side 1236 includes the plurality of channels 1258 and a channel 1256 to the sensor 1208, and the posterior side 1234 includes the second plurality of channels 1262. The plurality of channels 1258 includes three channels: a first channel 1258a, a second channel 1258b, and a third channel 1258c, and the second plurality of channels 1262 includes three channels: a first channel 1262a, a second channel 1262b, and a third channel 1262c The structure 1202 may take the form of or be similar in form to the structure 402 the structure 502, and/or the structure 702, the sensor 1208 may take the form of or be similar in form to the sensor 408, the sensor 508, and/or the sensor 708, the electronics 1210 may take the form of or be similar in form to the electronics 410, the electronics 510, and/or the electronics 710, the polymer layer 1232 may take the form of or be similar in form to the polymer layer 1132, and the channel 1256 may take the form of or be similar in form to the channel 556 and/or the channel 756.

As shown in FIG. 12, each polymer cap of the plurality of polymer caps 1260 may be formed over a respective opening of each channel of the plurality of channels 1258 in the anterior side 1236, and each polymer cap of the second plurality of polymer caps 1264 may be formed over a respective opening of each channel in the second plurality of channels 1262.

In an example, the number of polymer caps in the plurality of polymer caps 1260 may correspond with the number of channels in the plurality of channels 1258, and the number of polymer caps in the second plurality of polymer caps 1264 may correspond with the number of channels in the second plurality of channels 1262. In the illustrated example, the plurality of polymer caps 1260 may include three polymer caps, a first polymer cap 1260a formed over the first channel 1258a, a second polymer cap 1260b formed over the second channel 1258b, and a third polymer cap 1260c formed over the third channel 1258c. However, in other examples, the plurality of polymer caps 1258 may include more than three polymer caps. In addition, in the illustrated example, the second plurality of polymer caps 1264 may include three polymer caps, a first polymer cap 1264a formed over the first channel 1262a, a second polymer cap 1264b formed over the second channel 1262b, and a third polymer cap 1264c formed over the third channel 1262c.

The plurality of polymer caps 1260 may take the form of or be similar in form to the plurality of polymer caps 760, and the second plurality of polymer caps 1264 may take the form of or be similar in form to the plurality of polymer caps 760.

Although an example in which the polymer material is cured to a fully-cured state to form the polymer layer when the plurality of protrusions extend from the surface of the molding piece and the second plurality of protrusions extend from the surface of the press has been described above, in other examples the polymer material may be cured to a fully-cured state to form the polymer layer when at least one protrusion of the plurality of protrusions extends from the surface of the molding piece and at least one protrusion of the second plurality of protrusions extends from the surface of the press. With this arrangement, at least one channel to the structure may be formed by the at least one protrusion that extends from the surface of the molding piece and at least one channel to the structure may be formed by the at least one protrusion that extends from the surface of the press.

While the body-mountable device has been described as comprising the eye-mountable devices 470, 500, 670, 700, 1170, and 1200, the body-mountable device could comprise other mountable devices that are mounted on or in other portions of the human body.

For example, in some embodiments, the body-mountable device may comprise a tooth-mountable device. In some embodiments, the tooth-mountable device may take the form of or be similar in form to the eye-mountable devices 470, 500, 670, 700, 1170, or 1200. For instance, the tooth-mountable device may include a polymer layer that is the same or similar to any of the polymer layer described herein and a structure that is the same or similar to any of the structures described herein. With this arrangement, the tooth-mountable device may be configured to detect at least one analyte in a fluid (e.g., saliva) of a user wearing the tooth-mountable device. In addition, in some examples, the tooth-mountable device may include a structure that might not include an outer diameter and a hole that defines an inner diameter. Instead, in such examples, the structure may be a disc-shaped substrate.

Moreover, in some embodiments, the body-mountable device may comprise a skin-mountable device. In some embodiments, the skin-mountable device may take the form of or be similar in form to the eye-mountable devices 470, 500, 670, 1170, or 1200. For instance, the skin-mountable device may include a polymer layer that is the same or similar to any of the polymer layers described herein and a structure that is the same or similar to any of the structures described herein. With this arrangement, the skin-mountable device may be configured to detect at least one analyte in a fluid (e.g., perspiration, blood, etc.) of a user wearing the skin-mountable device. In addition, in some examples, the skin-mountable device may include a structure that might not include an outer diameter and a hole that defines an inner diameter. Instead, in such examples, the structure may be a disc-shaped substrate.

Further, some embodiments may include privacy controls which may be automatically implemented or controlled by the wearer of a body-mountable device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a body-mountable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

III. Example Apparatus, Systems, and Devices

A. Example Apparatus

As mentioned above, a body-mountable device may be formed using example methods described above. Apparatus for forming a body-mountable device is described in greater detail below.

The body-mountable device formed by the apparatus described herein may include a structure comprising a sensor or an electronic component, and a polymer layer around the structure, such that the structure is at least partially enclosed by the polymer layer, wherein the polymer layer defines a first side of the body-mountable device and a second side of the body-mountable opposite the first side.

The structure could take the form of or be similar in form to the structure 402, the structure 702, and/or the structure 1202; the sensor could take the form of or be similar in form to the sensor 408, the sensor 708, and/or the sensor 1208; the polymer layer could take the form of or be similar in form to the polymer layer 432, the polymer layer 632, the polymer layer 732, the polymer layer 1132, and/or the polymer layer 1232; the first side of the body-mountable device could take the form of or be similar in form to the posterior side 434, the posterior side 634, the posterior side 734, the posterior side 1134, and/or the posterior side 1234; and the second side of the body-mountable device could take the form of or be similar in form to the anterior side 436, the anterior side 636, the anterior side 736, the anterior side 1136, and/or the anterior side 1236.

Figure 13:
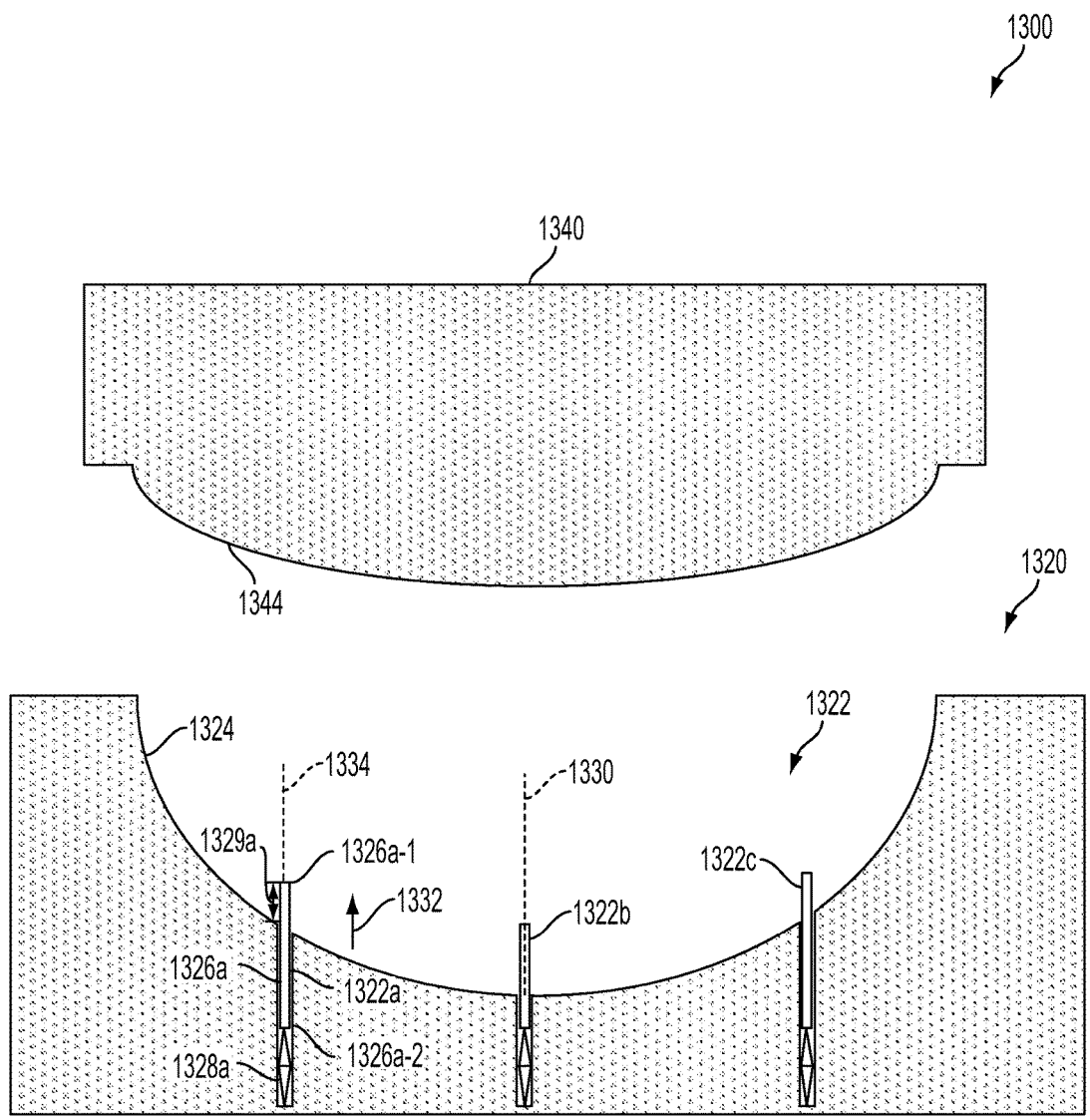
FIG. 13 is an illustration of an apparatus for forming a body-mountable device, according to an example embodiment.

FIG. 13 illustrates an apparatus 1300 for forming a body-mountable device, according to an example embodiment. As shown in FIG. 13, the apparatus includes a molding piece 1320 and a press 1340.

The molding piece 1320 includes a surface 1324 configured to support the polymer layer as the polymer layer is being formed and a plurality of protrusions 1322 that extend from the surface 1324 that is configured to receive the structure. The molding piece 1320 may take the form of or be similar in form to the molding piece 420 and the surface 1324 may take the form of or be similar in form to the surface 424.

In the illustrated example, the plurality of protrusions 1322 may include three protrusions, a first protrusion 1322a, a second protrusion 1322b, and a third protrusion 1322c. However, in other examples, the plurality of protrusions 1322 may include more than three protrusions. As shown in FIG. 13, the first protrusion 1322a may include a rod 1326a and a spring 1328a. The rod 1326a may have a first end 1326a-1 and a second end 1326a-2, and the spring 1328a may be connected to the second end 1326a-2 of the rod 1326a. The rod 1326a-1 may have a length 1329a that extends from the surface 1324.

In an example, the second protrusion 1322b and the third protrusion 1322c may take the form of or be similar in form to the first protrusion 1322a. With this arrangement, the second protrusion 1322b and third protrusion 1322c may include a respective rod and a respective spring that may take the same or similar form and connections as the rod 1326a and the spring 1328a.

The plurality of protrusions 1322 may take the form of or be similar in form to the plurality of protrusions 422, the first protrusion 1322a may take the form of or be similar in form to the first protrusion 422a, the rod 1326a may take the form of or be similar in form to the rod 426a, the spring 1328a may take the form of or be similar in form to the spring 428a, the first end 1326a-1 of the rod 1326a may take the form of or be similar in form to the first end 426a-1 of the rod 426a, the second end 1326a-2 of the rod 1326a may take the form of or be similar in form to the second end 426a-2 of the rod 426a, and the length 1329a may take the form of or be similar in form to the length 429a.

In another aspect, the surface 1324 of the molding piece 1320 may be substantially symmetric about an axis 1330. With this arrangement, at least one protrusion of the plurality of protrusions 1322 may extend from the surface 1324 in a direction 1332 that is substantially parallel to the axis 1330. In the illustrated example, each protrusion of the plurality of protrusions 1322 extends from the surface 1324 in a respective direction that is substantially parallel to the axis 1330. The term "substantially symmetric," as used in this disclosure, refers to exactly symmetric or one or more deviations from exactly symmetric that do not significantly impact forming a polymer layer around a structure as described herein.

Moreover, in some examples, a first protrusion of the plurality of protrusions 1322 (e.g., first protrusion 1322a) may extend from the surface 1324 in a first direction that is located in a two-dimensional plane and a second protrusion of the plurality of protrusions 1322 (e.g., second protrusion 1322b) may extend from the surface 1324 in a second direction that is located in the two-dimensional plane. However, in other examples, the first protrusion of the plurality of protrusions 1322 may extend from the surface 1324 in a first direction that is located in a first two-dimensional plane and the second protrusion of the plurality of protrusions 1322 may extend from the surface 1324 in a second direction that is located in a second two-dimensional plane that is substantially parallel to the first two-dimensional plane.

In a further aspect, a rod of at least one protrusion of the plurality of protrusions 1322 may include an axis and a surface of a first end of the rod that is oriented with that axis. For instance, in the illustrated example, the rod 1326a may include an axis 1334 and a surface of the first end 1326a-1 of the rod 1326a may be substantially perpendicular to the axis 1334. However, in other examples, a surface of the first end 1326a-1 of the rod 1326a may be at a non-perpendicular angle from the axis 1334. The term "substantially perpendicular," as used in this disclosure, may refer to exactly perpendicular or one or more deviations from exactly perpendicular that do not significantly impact forming a polymer layer around a structure as described herein.

The press 1340 may include a surface 1344. In a forming position, the molding piece 1320 and the press 1340 may be configured to apply pressure to the polymer layer as the polymer layer is being formed. In some examples, in the forming position, the molding piece 1320 and/or the press 1340 may be configured to apply uniform pressure to the polymer layer. Moreover, in some examples, in the forming position, the surface 1344 may contact the polymer layer as the polymer layer is being formed.

The press 1340 may take the form of or be similar in form to the press 440 and the surface 1344 may take the form of or be similar in form to the surface 444.

Figure 14:
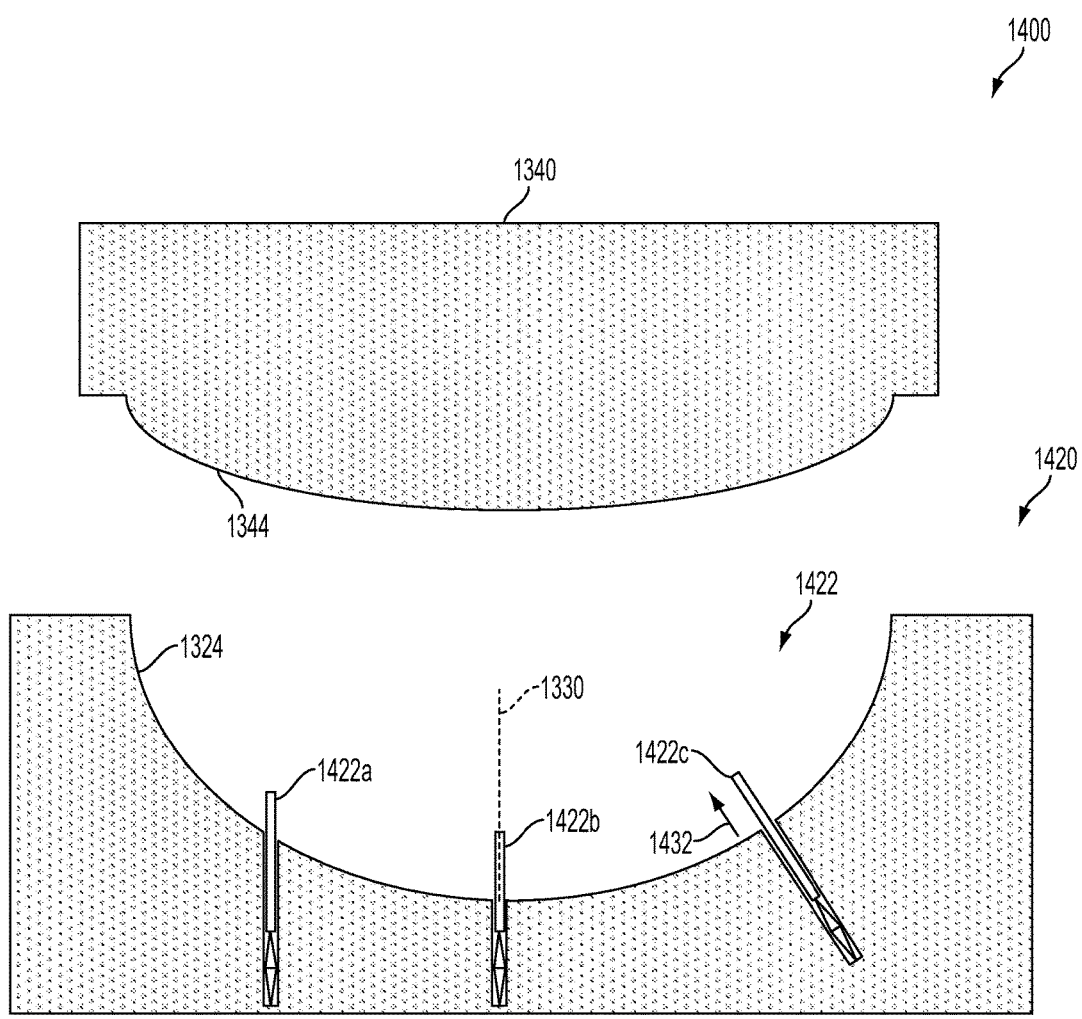
FIG. 14 is an illustration of an apparatus for forming a body-mountable device, according to an example embodiment.

FIG. 14 illustrates another apparatus 1400 for forming a body-mountable device, according to an example embodiment. As shown in FIG. 14, the apparatus 1400 includes at least one protrusion of a plurality of protrusions 1422 that extends from the surface 1324 of a molding piece 1420 in a direction 1432 that is non-parallel to the axis 1330 of the molding piece 1420.

The apparatus 1400 includes the molding piece 1420 and the press 1340. The molding piece 1420 includes the surface 1324 configured to support the polymer layer as the polymer layer is being formed and the plurality of protrusions 1422 that extend from the surface 1324 that is configured to receive the structure. The molding piece 1420 may take the form of or be similar in form to the molding piece 420 and/or the molding piece 1320, and the surface 1424 may take the form of or be similar in form to the surface 424 and/or the surface 1324.

In the illustrated example, the plurality of protrusions 1422 may include three protrusions, a first protrusion 1422a, a second protrusion 1422b, and a third protrusion 1422c. The plurality of protrusions 1422 may take the form of or be similar in form to the plurality of protrusions 422 and/or the plurality of protrusions 1322, the first protrusion 1422a may take the form of or be similar in form to the first protrusion 422a and/or the first protrusion 1322a, the second protrusion 1422b may take the form of or be similar in form to the second protrusion 422b and/or the second protrusion 1322b, and the third protrusion 1422c may take the form of or be similar in form to the third protrusion 422c and/or the third protrusion 1322c.

In another aspect, the surface 1324 of the molding piece 1420 may be substantially symmetric about the axis 1330. As noted, at least one protrusion of the plurality of protrusions 1422 may extend from the surface 1324 in the direction 1432 that is non-parallel to the axis 1330. In the illustrated example, the third protrusion 1422c extends from the surface 1324 in the direction 1432. However, in other examples, each protrusion of the plurality of protrusions 1422 may extend from the surface 1324 in respective directions that are non-parallel to the axis 1330.

The press 1340 may include the surface 1344. In a forming position, the molding piece 1420 and the press 1340 may be configured to apply pressure to the polymer layer as the polymer layer is being formed. In some examples, in the forming position, the molding piece 1420 and/or the press 1340 may be configured to apply uniform pressure to the polymer layer. Moreover, in some examples, in the forming position, the surface 1344 may contact the polymer layer as the polymer layer is being formed.

Figure 15:
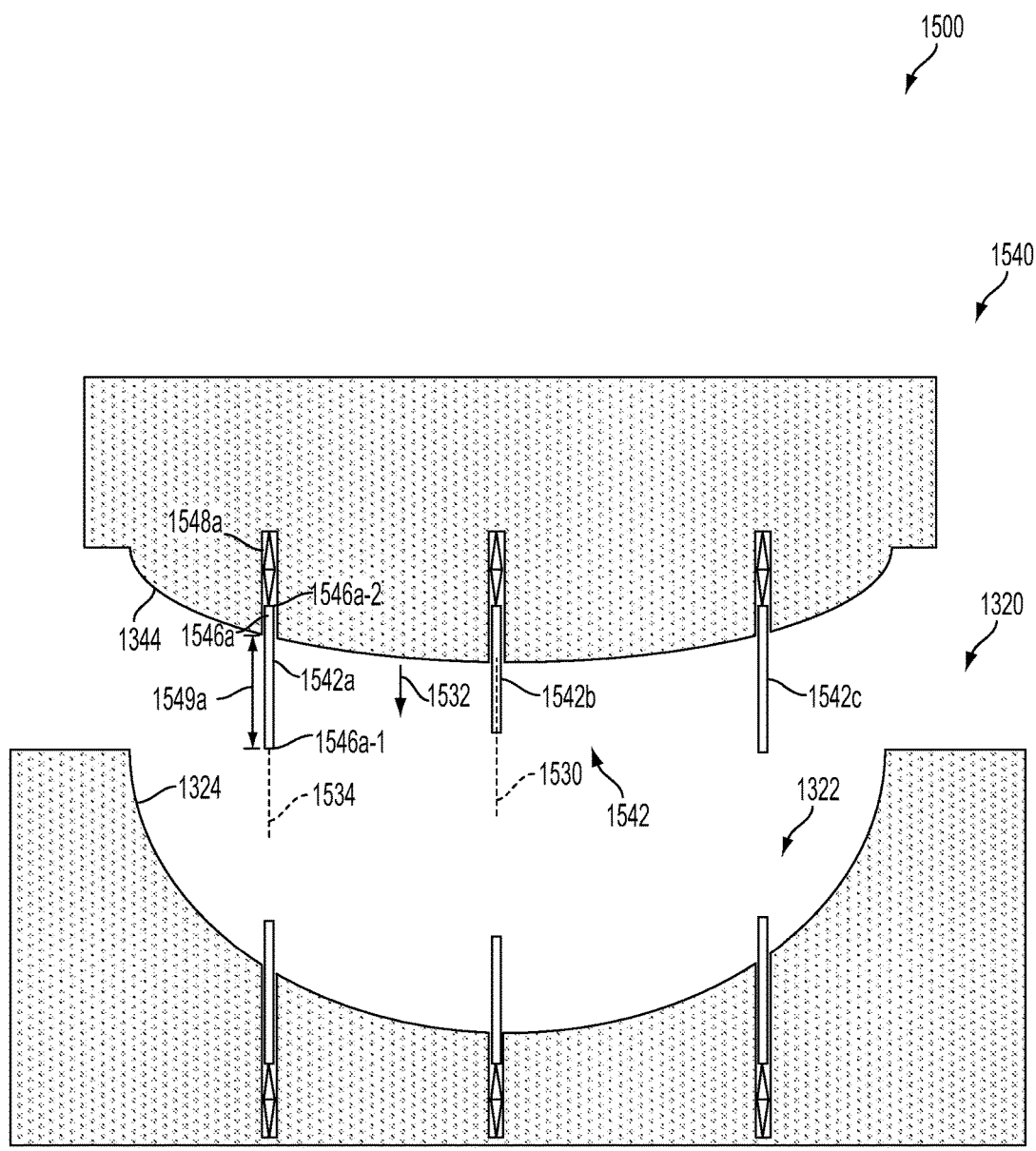
FIG. 15 is an illustration of another apparatus for forming a body-mountable device, according to an example embodiment.

FIG. 15 illustrates another apparatus 1500 for forming a body-mountable device, according to an example embodiment. As shown in FIG. 15, the apparatus 1500 includes a second plurality of protrusions 1542 that extend from the surface 1344 of a press 1540.

The molding piece 1320 includes the surface 1324 configured to support the polymer layer as the polymer layer is being formed and the plurality of protrusions 1322 that extend from the surface 1324 that is configured to receive the structure.

The press 1540 may include the surface 1344 and the second plurality of protrusions 1542 that extend from the surface 1344 of the press 1540. In a forming position, the molding piece 1320 and the press 1540 may be configured to apply pressure to the polymer layer as the polymer layer is being formed. In some examples, in the forming position, the molding piece 1320 and/or the press 1540 may be configured to apply uniform pressure to the polymer layer. Moreover, in some examples, in the forming position, the surface 1344 may contact the polymer layer as the polymer layer is being formed.

In addition, in the forming position, the second plurality of protrusions 1542 may be configured to contact the structure. Moreover, in the forming position, the second plurality of protrusions 1542 may be configured to conform the structure to a curvature of the polymer layer as the polymer layer is being formed.

In the illustrated example, the second plurality of protrusions 1542 may include three protrusions, a first protrusion 1542a, a second protrusion 1542b, and a third protrusion 1542c. However, in other examples, the second plurality of protrusions 1542 may include more than three protrusions. As shown in FIG. 15, the first protrusion 1542a may include a rod 1546a and a spring 1548a. The rod 1546a may have a first end 1546a-1 and a second end 1546a-2, and the spring 1548a may be connected to the second end 1546a-2 of the rod 1546a. The rod 1546a-1 may have a length 1549a that extends from the surface 1344.

In an example, the second protrusion 1542b and the third protrusion 1542c may take the form of or be similar in form to the first protrusion 1542a. With this arrangement, the second protrusion 1542b and third protrusion 1542c may include a respective rod and a respective spring that may take the same or similar form and connections as the rod 1546a and the spring 1548a.

The second plurality of protrusions 1542 may take the form of or be similar in form to the second plurality of protrusions 1042, the first protrusion 1542a may take the form of or be similar in form to the first protrusion 1042a, the rod 1546a may take the form of or be similar in form to the rod 1026a, the spring 1548a may take the form of or be similar in form to the spring 1048a, the first end 1546a-1 of the rod 1546a may take the form of or be similar in form to the first end 1046a-1 of the rod 1046a, the second end 1546a-2 of the rod 1546a may take the form of or be similar in form to the second end 1046a-2 of the rod 1046a, and the length 1529a may take the form of or be similar in form to the length 1049a.

In another aspect, the surface 1344 of the press 1540 may be substantially symmetric about an axis 1530. With this arrangement, at least one protrusion of the second plurality of protrusions 1542 may extend from the surface 1344 in a direction 1532 that is substantially parallel to the axis 1530. In the illustrated example, each protrusion of the second plurality of protrusions 1542 extends from the surface 1344 in a respective direction that is substantially parallel to the axis 1530.

Moreover, in some examples, a first protrusion of the second plurality of protrusions 1542 (e.g., first protrusion 1542a) may extend from the surface 1344 in a first direction that is located in a two-dimensional plane and a second protrusion of the second plurality of protrusions 1542 (e.g., second protrusion 1542b) may extend from the surface 1344 in a second direction that is located in the two-dimensional plane. However, in other examples, the first protrusion of the second plurality of protrusions 1542 may extend from the surface 1344 in a first direction that is located in a first two-dimensional plane and the second protrusion of the plurality of protrusions 1542 may extend from the surface 1544 in a second direction that is located in a second two-dimensional plane that is substantially parallel to the first two-dimensional plane.

In a further aspect, a rod of at least one protrusion of the plurality of protrusions 1542 may include an axis and a surface of a first end of the rod that is oriented with that axis. For instance, in the illustrated example, the rod 1546a may include an axis 1534 and a surface of the first end 1546a-1 of the rod 1546a may be substantially perpendicular to the axis 1534. However, in other examples, a surface of the first end 1546a-1 of the rod 1546a may be at a non-perpendicular angle from the axis 1534.

Figure 16:
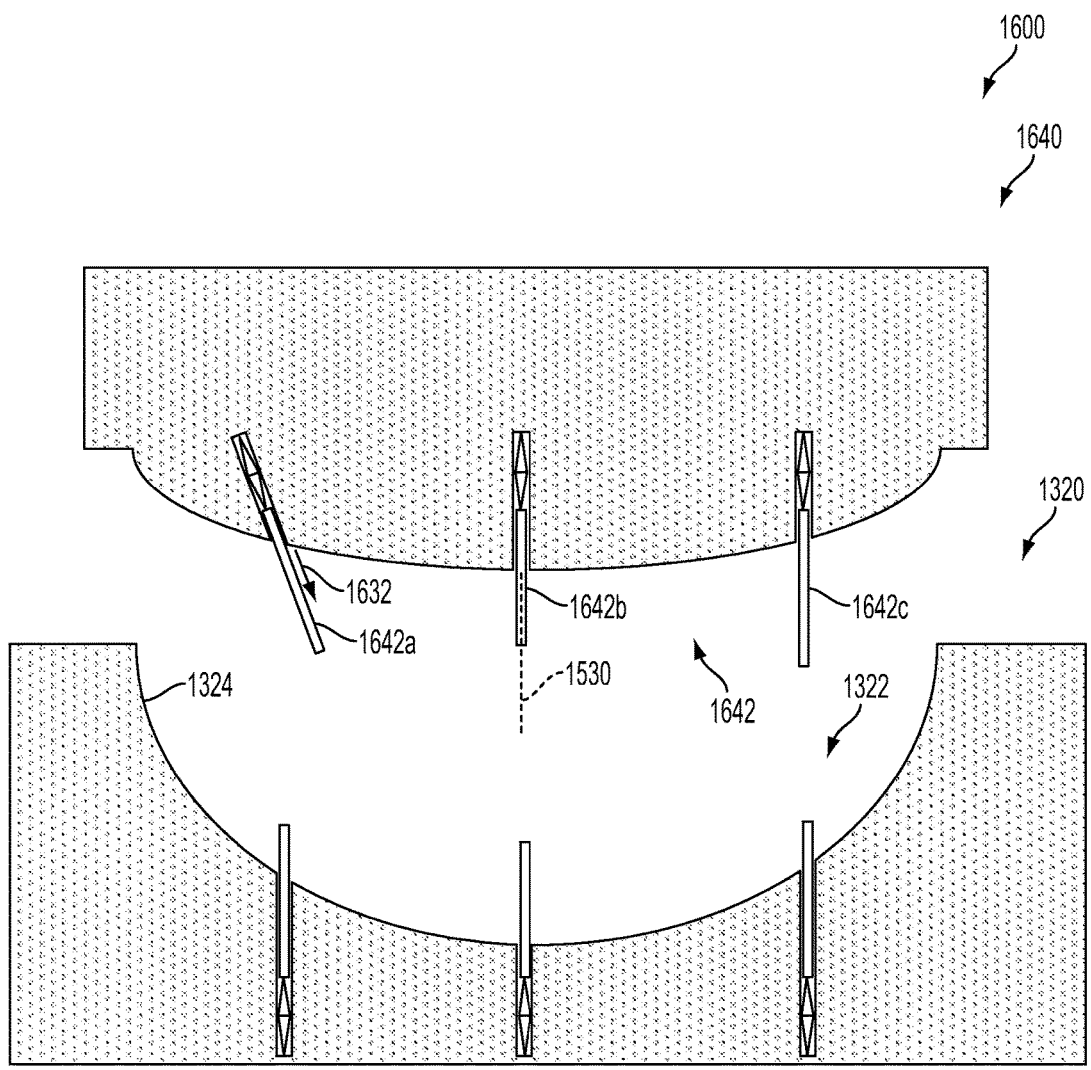
FIG. 16 is an illustration of an apparatus for forming a body-mountable device, according to an example embodiment.

FIG. 16 illustrates yet another apparatus 1600 for forming a body-mountable device. As shown in FIG. 16, the apparatus 1600 includes at least one protrusion of a second plurality of protrusions 1642 that extends from the surface 1344 of a press 1640 in a direction 1632 that is non-parallel to the axis 1530 of the press 1640.

The apparatus 1600 includes the molding piece 1320 and the press 1640. The molding piece 1320 includes the surface 1324 configured to support the polymer layer as the polymer layer is being formed and the plurality of protrusions 1322 that extend from the surface 1324 that is configured to receive the structure.

The press 1640 may include the surface 1344. In a forming position, the molding piece 1320 and the press 1640 may be configured to apply pressure to the polymer layer as the polymer layer is being formed. In some examples, in the forming position, the molding piece 1320 and/or the press 1640 may be configured to apply uniform pressure to the polymer layer. Moreover, in some examples, in the forming position, the surface 1344 may contact the polymer layer as the polymer layer is being formed.

In the illustrated example, the second plurality of protrusions 1642 may include three protrusions, a first protrusion 1642a, a second protrusion 1642b, and a third protrusion 1642c. The second plurality of protrusions 1642 may take the form of or be similar in form to the second plurality of protrusions 1042 and/or the second plurality of protrusions 1542, the first protrusion 1642a may take the form of or be similar in form to the first protrusion 1042a and/or the first protrusion 1542a, the second protrusion 1642b may take the form of or be similar in form to the second protrusion 1042b and/or the second protrusion 1542b, and the third protrusions 1642c may take the form of or be similar in form to the third protrusion 1042c and/or the third protrusion 1542c.

In another aspect, the surface 1344 of the press 1640 may be substantially symmetric about the axis 1530. As noted, at least one protrusion of the second plurality of protrusions 1642 may extend from the surface 1344 in the direction 1632 that is non-parallel to the axis 1530. In the illustrated example, the first protrusion 1642a extends from the surface 1344 in the direction 1632. However, in other examples, each protrusion of the second plurality of protrusions 1632 may extend from the surface 1344 in respective directions that are non-parallel to the axis 1530.

Although example apparatus have been described above, other apparatus for forming a body-mountable device are possible as well. For instance, in an example, an apparatus may include the molding piece 1420 and the press 1540. In another example, an apparatus may include the molding 1420 and the press 1640.

Moreover, in an example, any of the molding pieces described above may further include a second protrusion that extends from the surface of the molding piece to the sensor through the polymer layer as the polymer layer is being formed. With this arrangement, the body-mountable device removed from the molding piece may have a channel to the sensor formed by the second protrusion.

The second protrusion may be similar in form to at least one protrusion of the plurality of protrusions 1322, at least one protrusion of the plurality of protrusions 1422, at least one protrusion of the second plurality of protrusions 1542, and/or at least one protrusion of the second plurality of protrusions 1642. For instance, the second protrusion may include a rod and a spring, and the second protrusion may include any of the materials that the plurality of protrusions 1322, the plurality of protrusions 1422, the second plurality of protrusions 1542, and/or the second plurality of protrusions 1642 may include. Moreover, in some examples, the second protrusion may have a length that extends from the surface of the molding piece between 5 to 15 millimeters. Further, in some examples, the second protrusion may have a diameter between 500 micrometers to 1.5 millimeters, such as 1 millimeter.

B. Example System and Devices

As mentioned above, a body-mountable device may be formed using the example methods described above. Further, the body-mountable device may be configured to monitor health-related information based on at least one analyte detected in a fluid of a user wearing the body-mountable device. An eye-mountable device configured to monitor health-related information based on at least one analyte detected from an eye of a user is described in greater detail below with reference to FIGS. 17 and 18*a*-18*d*.

A structure in accordance with an example embodiment may include a sensor, electronics, and an antenna all situated on a substrate. The electronics may operate the sensor to perform readings and operate the antenna to wirelessly communicate the readings from the sensor to an external reader via the antenna. The sensor can be arranged on the substrate to face outward, away from the corneal surface of the user, so as to generate clinically relevant readings from tear fluid of the user that the sensor receives via a channel in the anterior side of the eye-mountable device. For example, the sensor can be suspended in the lens material and situated such that the sensor is less than 10 micrometers from the anterior edge of the eye-mountable device. The sensor can generate an output signal indicative of a concentration of an analyte that the sensor receives via the channel.

Figure 17:
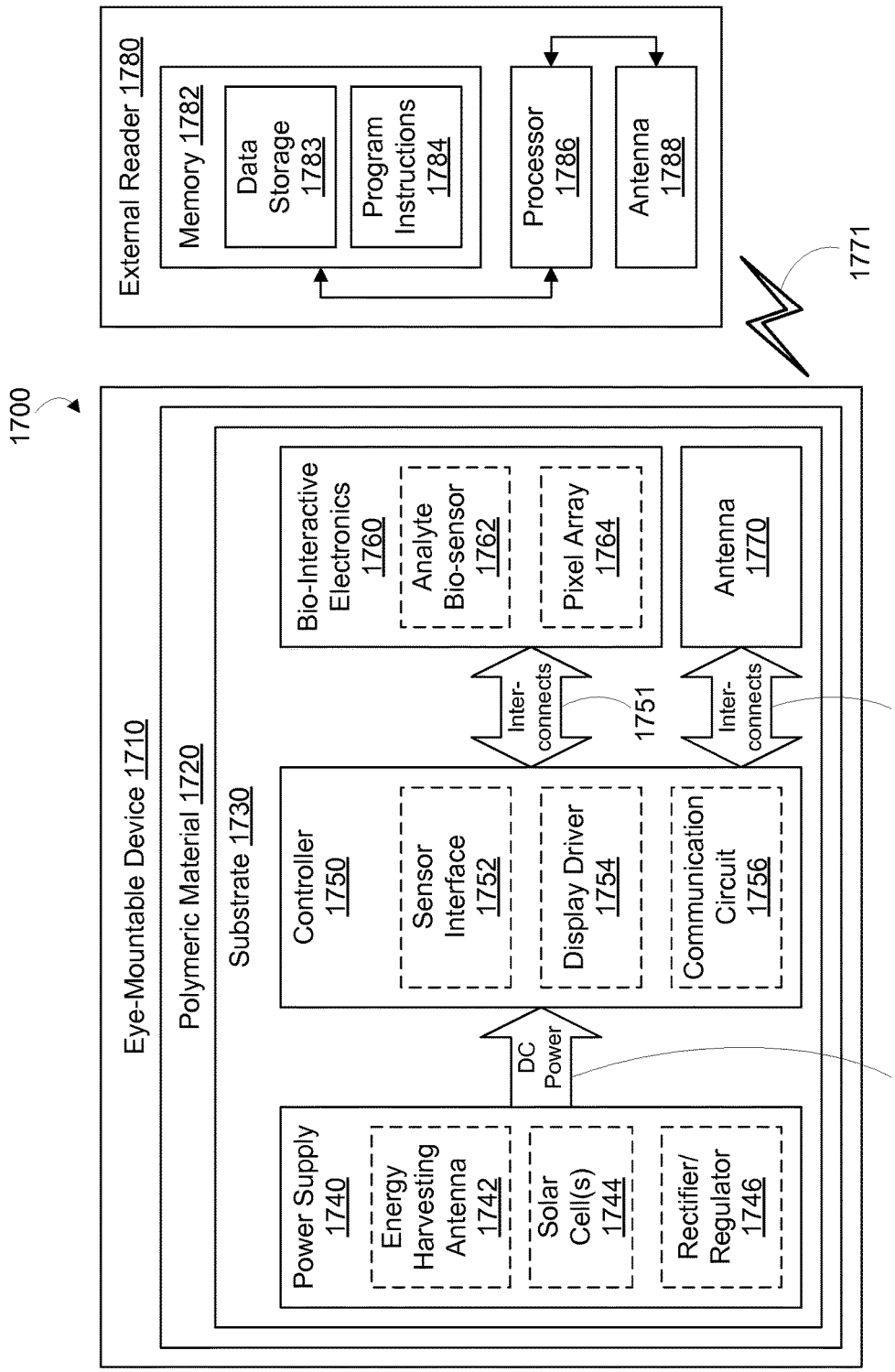
FIG. 17 is a block diagram of a system with an eye-mountable device in wireless communication with an external reader, according to an example embodiment.

FIG. 17 is a block diagram of a system 1700 with an eye-mountable device 1710 in wireless communication with an external reader 1780. The exposed regions of the eye-mountable device 1710 are made of a polymeric material 1720 formed to be contact-mounted to a corneal surface of an eye. In accordance with the exemplary methods, polymeric material 1720 may comprise a polymer layer.

Substrate 1730 is embedded in the polymeric material 1720 to provide a mounting surface for a power supply 1740, a controller 1750, bio-interactive electronics 1760, and an antenna 1770. The bio-interactive electronics 1760 are operated by the controller 1750. The power supply 1740 supplies operating voltages to the controller 1750 and/or the bio-interactive electronics 1760. The antenna 1770 is operated by the controller 1750 to communicate information to and/or from the eye-mountable device 1710. The antenna 1770, the controller 1750, the power supply 1740, and the bio-interactive electronics 1760 can all be situated on the embedded substrate 1730. Because the eye-mountable device 1710 includes electronics and is configured to be contact-mounted to an eye, it may also be referred to as an ophthalmic electronics platform.

To facilitate contact-mounting, the polymeric material 1720 can have a concave surface configured to adhere ("mount") to a moistened corneal surface (e.g., by capillary forces with a tear film coating the corneal surface). Additionally or alternatively, the eye-mountable device 1710 can be adhered by a vacuum force between the corneal surface and the polymeric material due to the concave curvature. While mounted with the concave surface against the eye, the anterior or outward-facing surface of the polymeric material 1720 can have a convex curvature that is formed to not interfere with eye-lid motion while the eye-mountable device 1710 is mounted to the eye. For example, the polymeric material 1720 can be a substantially transparent curved polymeric disk shaped similarly to a contact lens.

The polymeric material 1720 can include one or more biocompatible materials, such as those employed for use in contact lenses or other ophthalmic applications involving direct contact with the corneal surface. The polymeric material 1720 can optionally be formed in part from such biocompatible materials or can include an outer coating with such biocompatible materials. The polymeric material 1720 can include materials configured to moisturize the corneal surface, such as hydrogels and the like. In some instances, the polymeric material 1720 can be a deformable ("non-rigid") material to enhance wearer comfort. In some instances, the polymeric material 1720 can be shaped to provide a predetermined, vision-correcting optical power, such as can be provided by a contact lens.

The substrate 1730 includes one or more surfaces suitable for mounting the bio-interactive electronics 1760, the controller 1750, the power supply 1740, and the antenna 1770. The substrate 1730 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) can be patterned on the substrate 1730 to form circuitry, electrodes, etc. For example, the antenna 1770 can be formed by depositing a pattern of gold or another conductive material on the substrate 1730. Similarly, interconnects 1751, 1757 between the controller 1750 and the bio-interactive electronics 1760, and between the controller 1750 and the antenna 1770, respectively, can be formed by depositing suitable patterns of conductive materials on the substrate 1730. A combination of resists, masks, and deposition techniques can be employed to pattern materials on the substrate 1730.

The substrate 1730 can be a relatively rigid polymeric material, such as polyethylene terephthalate ("PET"), paralyene or another material sufficient to structurally support the circuitry and/or electronics within the polymeric material 1720. The eye-mountable device 1710 can alternatively be arranged with a group of unconnected substrates rather than a single substrate. For example, the controller 1750 and a bio-sensor or other bio-interactive electronic component can be mounted to one substrate, while the antenna 1770 is mounted to another substrate and the two can be electrically connected via the interconnects 1757.

In some embodiments, the bio-interactive electronics 1760 (and the substrate 1730) can be positioned away from the center of the eye-mountable device 1710 and thereby avoid interference with light transmission to the eye through the center of the eye-mountable device 1710. For example, where the eye-mountable device 1710 is shaped as a concave-curved disk, the substrate 1730 can be embedded around the periphery (e.g., near the outer circumference) of the disk. In some embodiments, the bio-interactive electronics 1760 (and the substrate 1730) can be positioned in the center region of the eye-mountable device 1710. The bio-interactive electronics 1760 and/or the substrate 1730 can be substantially transparent to incoming visible light to mitigate interference with light transmission to the eye. Moreover, in some embodiments, the bio-interactive electronics 1760 can include a pixel array 1764 that emits and/or transmits light to be perceived by the eye according to display driver instructions. Thus, the bio-interactive electronics 1760 can optionally be positioned in the center of the eye-mountable device so as to generate perceivable visual cues to a wearer of the eye-mountable device 1710, such as by displaying information via the pixel array 1764.

The substrate 1730 can be shaped as a flattened ring with a radial width dimension sufficient to provide a mounting platform for the embedded electronics components. The substrate 1730 can have a thickness sufficiently small to allow the substrate 1730 to be embedded in the polymeric material 1720 without influencing the profile of the eye-mountable device 1710. The substrate 1730 can have a thickness sufficiently large to provide structural stability suitable for supporting the electronics mounted thereon. For example, the substrate 1730 can be shaped as a ring with a diameter of about 10 millimeters, a radial width of about 1 millimeter (e.g., an outer radius 1 millimeter larger than an inner radius), and a thickness of about 50 micrometers. The substrate 1730 can optionally be aligned with the curvature of the anterior side of the eye-mountable device.

The power supply 1740 is configured to harvest ambient energy to power the controller 1750 and bio-interactive electronics 1760. For example, a radio-frequency energy harvesting antenna 1742 can capture energy from incident radio radiation. Additionally or alternatively, solar cell(s) 1744 ("photovoltaic cells") can capture energy from incoming ultraviolet, visible, and/or infrared radiation. Furthermore, an inertial power scavenging system can be included to capture energy from ambient vibrations. The energy harvesting antenna 1742 can optionally be a dual-purpose antenna that is also used to communicate information to the external reader 1780. That is, the functions of the antenna 1770 and the energy harvesting antenna 1742 can be accomplished with the same physical antenna.

A rectifier/regulator 1746 can be used to condition the captured energy to a stable DC supply voltage 1741 that is supplied to the controller 1750. For example, the energy harvesting antenna 1742 can receive incident radio frequency radiation. Varying electrical signals on the leads of the antenna 1742 are output to the rectifier/regulator 1746. The rectifier/regulator 1746 rectifies the varying electrical signals to a DC voltage and regulates the rectified DC voltage to a level suitable for operating the controller 1750. Additionally or alternatively, output voltage from the solar cell(s) 1744 can be regulated to a level suitable for operating the controller 1750. The rectifier/regulator 1746 can include one or more energy storage devices arranged to mitigate high frequency variations in the ambient energy harvesting antenna 1742 and/or solar cell(s) 1744. For example, an energy storage device (e.g., capacitor, inductor, etc.) can be connected to the output of the rectifier/regulator 1746 so as to function as a low-pass filter.

The controller 1750 is turned on when the DC supply voltage 1741 is provided to the controller 1750, and the logic in the controller 1750 operates the bio-interactive electronics 1760 and the antenna 1770. The controller 1750 can include logic circuitry configured to operate the bio-interactive electronics 1760 so as to interact with a biological environment of the eye-mountable device 1710. The interaction could involve the use of one or more components, such as an analyte bio-sensor 1762, in bio-interactive electronics 1760 to obtain input from the biological environment. Alternatively or additionally, the interaction could involve the use of one or more components, such as the pixel array 1764, to provide an output to the biological environment.

In one example, a sensor interface module 1752 can be included for operating the analyte bio-sensor 1762. The analyte bio-sensor 1762 can be, for example, an amperometric electrochemical sensor that includes a working electrode and a reference electrode. Application of an appropriate voltage between the working and reference electrodes can cause an analyte to undergo electrochemical reactions (e.g., reduction and/or oxidation reactions) at the working electrode to generate an amperometric current. The amperometric current can be dependent on the analyte concentration, and thus the amount of amperometric current can provide an indication of analyte concentration. In some embodiments, the sensor interface module 1752 can be a potentiostat configured to apply a voltage difference between the working and reference electrodes while measuring a current through the working electrode.

In some instances, a reagent can also be included to sensitize the electrochemical sensor to desired analytes. For example, a layer of glucose oxidase ("GOX") can be situated around the working electrode to catalyze glucose into hydrogen peroxide ($H_2O_2$). The hydrogen peroxide can then be oxidized at the working electrode, which releases electrons to the working electrode, which generates a current.

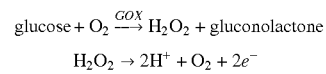

$$glucose + O_2 \xrightarrow{GOX} H_2O_2 + gluconolactone$$
$$H_2O_2 \rightarrow 2H^+ + O_2 + 2e^-$$

The current generated by either reduction or oxidation reactions can be approximately proportionate to the reaction rate. Further, the reaction rate can be dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate can be approximately proportionate to the concentration of the analyte molecules. The current can thus provide an indication of the analyte concentration.

The controller 1750 can optionally include a display driver module 1754 for operating the pixel array 1764. The pixel array 1764 can be an array of separately programmable light transmitting, light reflecting, and/or light emitting pixels arranged in rows and columns. The individual pixel circuits can optionally include liquid crystal technologies, microelectromechanical technologies, emissive diode technologies, etc. to selectively transmit, reflect, and/or emit light according to information from the display driver module 1754. Such a pixel array 1764 can also optionally include more than one color of pixels (e.g., red, green, and blue pixels) to render visual content in color. The display driver module 1754 can include, for example, one or more data lines providing programming information to the separately programmed pixels in the pixel array 1764 and one or more addressing lines for setting groups of pixels to receive such programming information. Such a pixel array 1764 situated on the eye can also include one or more lenses to direct light from the pixel array to a focal plane perceivable by the eye.

The controller 1750 can also include a communication circuit 1756 for sending and/or receiving information via the antenna 1770. The communication circuit 1756 can optionally include one or more oscillators, mixers, frequency injectors, etc. to modulate and/or demodulate information on a carrier frequency to be transmitted and/or received by the antenna 1770. In some examples, the eye-mountable device 1710 is configured to indicate an output from a bio-sensor by modulating an impedance of the antenna 1770 in a manner that is perceivable by the external reader 1780. For example, the communication circuit 1756 can cause variations in the amplitude, phase, and/or frequency of backscatter radiation from the antenna 1770, and such variations can be detected by the external reader 1780.

The controller 1750 is connected to the bio-interactive electronics 1760 via interconnects 1751. For example, where the controller 1750 includes logic elements implemented in an integrated circuit to form the sensor interface module 1752 and/or display driver module 1754, a patterned conductive material (e.g., gold, platinum, palladium, titanium, copper, aluminum, silver, metals, combinations of these, etc.) can connect a terminal on the chip to the bio-interactive electronics 1760. Similarly, the controller 1750 is connected to the antenna 1770 via interconnects 1757.

It is noted that the block diagram shown in FIG. 17 is described in connection with functional modules for convenience in description. However, embodiments of the eye-mountable device 1710 can be arranged with one or more of the functional modules ("sub-systems") implemented in a single chip, integrated circuit, and/or physical feature. For example, while the rectifier/regulator 1746 is illustrated in the power supply block 1740, the rectifier/regulator 1746 can be implemented in a chip that also includes the logic elements of the controller 1750 and/or other features of the embedded electronics in the eye-mountable device 1710. Thus, the DC supply voltage 1741 that is provided to the controller 1750 from the power supply 1740 can be a supply voltage that is provided on a chip by rectifier and/or regulator components of the same chip. That is, the functional blocks in FIG. 17 shown as the power supply block 1740 and controller block 1750 need not be implemented as separated modules. Moreover, one or more of the functional modules described in FIG. 17 can be implemented by separately packaged chips electrically connected to one another.

Additionally or alternatively, the energy harvesting antenna 1742 and the antenna 1770 can be implemented with the same physical antenna. For example, a loop antenna can both harvest incident radiation for power generation and communicate information via backscatter radiation.

The external reader 1780 includes an antenna 1788 (or group of more than one antennae) to send and receive wireless signals 1771 to and from the eye-mountable device 1710. The external reader 1780 also includes a computing system with a processor 1786 in communication with a memory 1782. The memory 1782 is a non-transitory computer-readable medium that can include, without limitation, magnetic disks, optical disks, organic memory, and/or any other volatile (e.g., RAM) or non-volatile (e.g., ROM) storage system readable by the processor 1786. The memory 1782 can include a data storage 1783 to store indications of data structures, such as sensor readings (e.g., from the analyte bio-sensor 1762), program settings (e.g., to adjust behavior of the eye-mountable device 1710 and/or external reader 1780), etc. The memory can also include program instructions 1784 for execution by the processor 1786 to cause the external reader to perform processes specified by the program instructions 1784. For example, the program instructions 1784 can cause external reader 1780 to provide a user interface that allows for retrieving information communicated from the eye-mountable device 1710 (e.g., sensor outputs from the analyte bio-sensor 1762). The external reader 1780 can also include one or more hardware components for operating the antenna 1788 to send and receive the wireless signals 1771 to and from the eye-mountable device 1710. For example, oscillators, frequency injectors, encoders, decoders, amplifiers, filters, etc. can drive the antenna 1788 according to instructions from the processor 1786.

The external reader 1780 can be a smart phone, digital assistant, or other portable computing device with wireless connectivity sufficient to provide the wireless communication link 1771. The external reader 1780 can also be implemented as an antenna module that can be plugged in to a portable computing device, such as in an example where the communication link 1771 operates at carrier frequencies not commonly employed in portable computing devices. In some instances, the external reader 1780 is a special-purpose device configured to be worn relatively near a wearer's eye to allow the wireless communication link 1771 to operate with a low power budget. For example, the external reader 1780 can be integrated in eyeglasses, integrated in a piece of jewelry such as a necklace, earing, etc., or integrated in an article of clothing worn near the head, such as a hat, headband, etc.

In an example where the eye-mountable device 1710 includes an analyte bio-sensor 1762, the system 1700 can be operated to monitor the analyte concentration in tear film on the surface of the eye. Thus, the eye-mountable device 1710 can be configured as a platform for an ophthalmic analyte bio-sensor. The tear film is an aqueous layer secreted from the lacrimal gland to coat the eye. The tear film is in contact with the blood supply through capillaries in the structure of the eye and includes many biomarkers found in blood that are analyzed to characterize a person's health condition(s). For example, the tear film includes glucose, calcium, sodium, cholesterol, potassium, other biomarkers, etc. The biomarker concentrations in the tear film can be systematically different than the corresponding concentrations of the biomarkers in the blood, but a relationship between the two concentration levels can be established to map tear film biomarker concentration values to blood concentration levels. For example, the tear film concentration of glucose can be established (e.g., empirically determined) to be approximately one tenth the corresponding blood glucose concentration. Thus, measuring tear film analyte concentration levels provides a non-invasive technique for monitoring biomarker levels in comparison to blood sampling techniques performed by lancing a volume of blood to be analyzed outside a person's body. Moreover, the ophthalmic analyte bio-sensor platform disclosed here can be operated substantially continuously to enable real time monitoring of analyte concentrations.

To perform a reading with the system 1700 configured as a tear film analyte monitor, the external reader 1780 can emit radio frequency radiation 1771 that is harvested to power the eye-mountable device 1710 via the power supply 1740. Radio frequency electrical signals captured by the energy harvesting antenna 1742 (and/or the antenna 1770) are rectified and/or regulated in the rectifier/regulator 1746 and a regulated DC supply voltage 1741 is provided to the controller 1750. The radio frequency radiation 1771 thus turns on the electronic components within the eye-mountable device 1710. Once turned on, the controller 1750 operates the analyte bio-sensor 1762 to measure an analyte concentration level. For example, the sensor interface module 1752 can apply a voltage between a working electrode and a reference electrode in the analyte bio-sensor 1762 sufficient to cause the analyte to undergo an electrochemical reaction at the working electrode. The current through the working electrode can be measured to provide the sensor output indicative of the analyte concentration. The controller 1750 can operate the antenna 1770 to communicate the sensor results back to the external reader 1780 (e.g., via the communication circuit 1756). The sensor result can be communicated by, for example, modulating an impedance of the antenna 1770 such that the modulation in impedance is detected by the external reader 1780. The modulation in antenna impedance can be detected by, for example, backscatter radiation from the antenna 1770.

In some embodiments, the system 1700 can operate to non-continuously ("intermittently") supply energy to the eye-mountable device 1710 to power the on-board controller 1750 and electronics 1760. For example, radio frequency radiation 1771 can be supplied to power the eye-mountable device 1710 long enough to carry out a tear film analyte concentration measurement and communicate the results. For example, the supplied radio frequency radiation can provide sufficient power to charge two electrodes to a potential sufficient to induce electrochemical reactions, measure the resulting amperometric current, and modulate the antenna impedance to adjust the backscatter radiation in a manner indicative of the measured current. In such an example, the supplied radio frequency radiation 1771 can be considered an interrogation signal from the external reader 1780 to the eye-mountable device 1710 to request a measurement. By periodically interrogating the eye-mountable device 1710 (e.g., by supplying radio frequency radiation 1771 to temporarily turn the device on) and storing the sensor results (e.g., via the data storage 1783), the external reader 1780 can accumulate a set of analyte concentration measurements over time without continuously powering the eye-mountable device 1710.

Figure 18A:
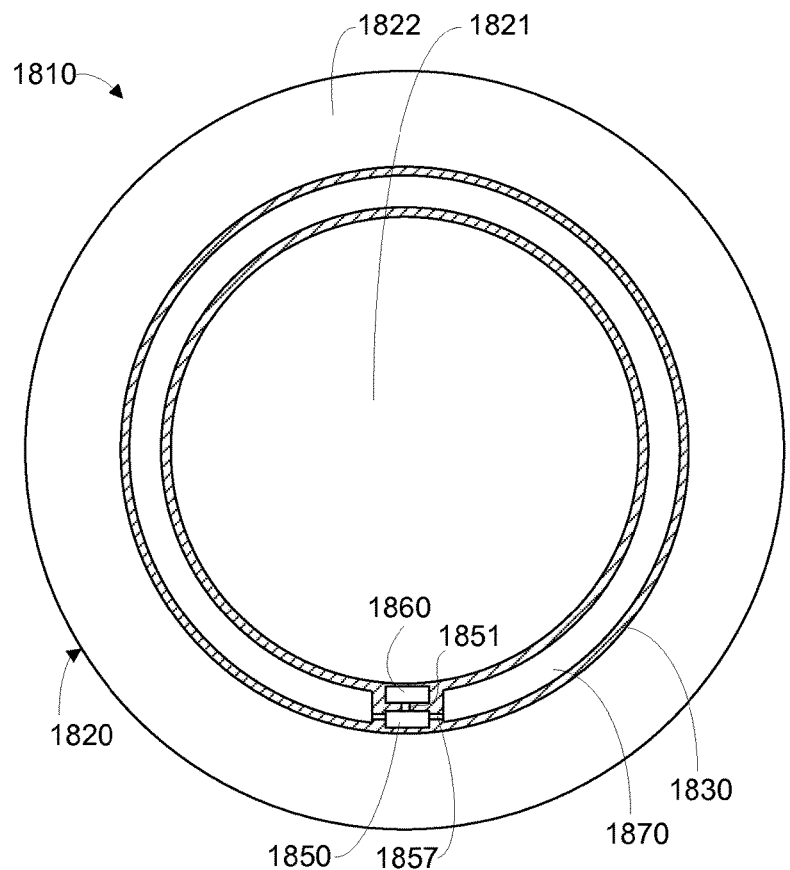
FIG. 18*a* is a top view of an eye-mountable device, according to an example embodiment.
Figure 18B:
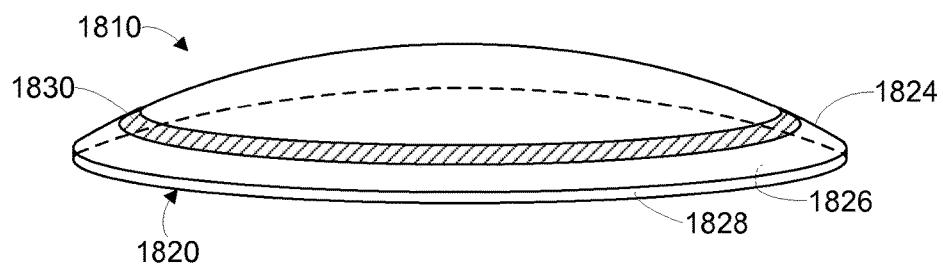
FIG. 18*b* is a side view of an eye-mountable device, according to an example embodiment.

FIG. 18a is a top view of an eye-mountable electronic device 1810. FIG. 18b is a side view of the eye-mountable electronic device shown in FIG. 18a. It is noted that relative dimensions in FIGS. 18a and 18b are not necessarily to scale, but have been rendered for purposes of explanation only in describing the arrangement of the eye-mountable electronic device 1810. The eye-mountable device 1810 is formed of a polymeric material 1820 shaped as a curved disk. The polymeric material 1820 can be a substantially transparent material to allow incident light to be transmitted to the eye while the eye-mountable device 1810 is mounted to the eye. The polymeric material 1820 can be a biocompatible material similar to those employed to form vision correction and/or cosmetic contact lenses in optometry, such as PET, polymethyl methacrylate ("PMMA"), silicone hydrogels, combinations of these, etc. The polymeric material 1820 can be formed with one side having a concave surface 1826 suitable to fit over a corneal surface of an eye. The opposing side of the disk can have a convex surface 1824 that does not interfere with eyelid motion while the eye-mountable device 1810 is mounted to the eye. A circular outer side edge 1828 connects the concave surface 1824 and convex surface 1826.

The eye-mountable device 1810 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 1810 can be selected according to the size and/or shape of the corneal surface and/or the scleral surface of the wearer's eye.

While the eye-mountable device 1810 is mounted in an eye, the convex surface 1824 (i.e., the anterior surface) faces outward to the ambient environment while the concave surface 1826 (i.e., the posterior surface) faces inward, toward the corneal surface. The convex surface 1824 can therefore be considered an outer, top surface of the eye-mountable device 1810 whereas the concave surface 1826 can be considered an inner, bottom surface. The "top" view shown in FIG. 18a is facing the convex surface 1824.

A substrate 1830 is embedded in the polymeric material 1820. The substrate 1830 can be embedded to be situated along an outer periphery 1822 of the polymeric material 1820, away from a center region 1821. The substrate 1830 does not interfere with vision because it is too close to the eye to be in focus and is positioned away from the center region 1821 where incident light is transmitted to the light-sensing portions of the eye. Moreover, the substrate 1830 can be formed of a transparent material to further mitigate any effects on visual perception.

The substrate 1830 can be shaped as a flat, circular ring (e.g., a disk with a central hole). The flat surface of the substrate 1830 (e.g., along the radial width) is a platform for mounting electronics such as chips (e.g., via flip-chip mounting) and for patterning conductive materials (e.g., via deposition techniques) to form electrodes, antenna(e), and/or connections. The substrate 1830 and the polymeric material 1820 can be approximately cylindrically symmetric about a common central axis. The substrate 1830 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only. The substrate 1830 can be implemented in a variety of different form factors.

A loop antenna 1870, a controller 1850, and bio-interactive electronics 1860 are disposed on the embedded substrate 1830. The controller 1850 can be a chip including logic elements configured to operate the bio-interactive electronics 1860 and the loop antenna 1870. The controller 1850 is electrically connected to the loop antenna 1870 by interconnects 1857 also situated on the substrate 1830. Similarly, the controller 1850 is electrically connected to the bio-interactive electronics 1860 by interconnects 1851. The interconnects 1851, 1857, the loop antenna 1870, and any conductive electrodes (e.g., for an electrochemical analyte bio-sensor, etc.) can be formed from conductive materials patterned on the substrate 1830 by a process for precisely patterning such materials, such as deposition or lithography. The conductive materials patterned on the substrate 1830 can be, for example, gold, platinum, palladium, titanium, carbon, aluminum, copper, silver, silver-chloride, and/or other materials.

Figure 18D:
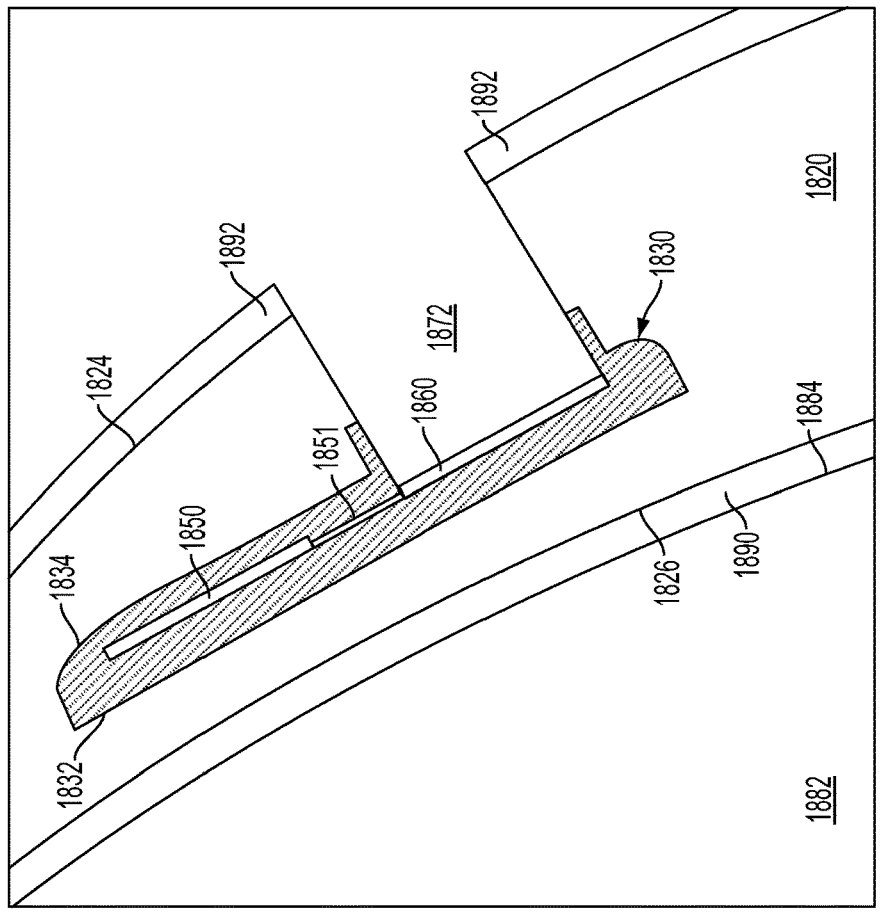
FIG. 18*d* is a side cross-section view showing the tear film layers surrounding the surfaces of the eye-mountable device mounted as shown in FIG. 18*c*, according to an example embodiment.
Figure 18C:
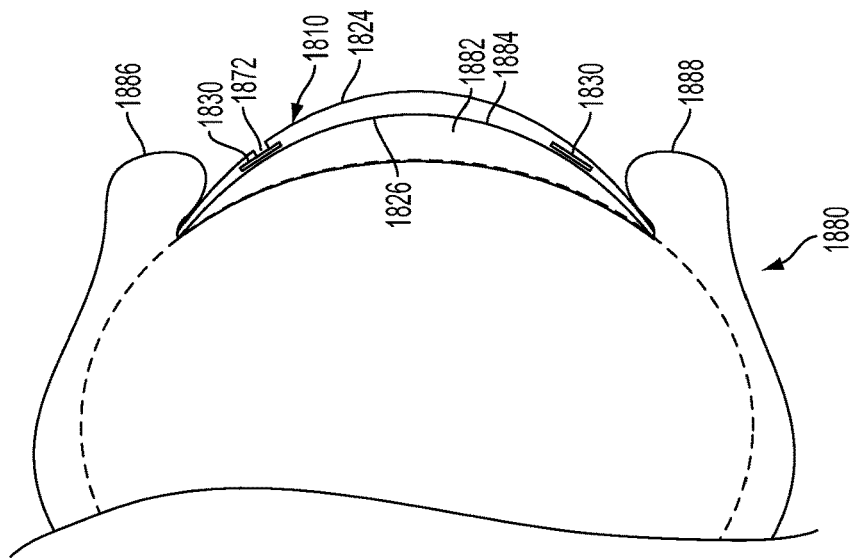
FIG. 18*c* is a side cross-section view of the eye-mountable device of FIGS. 18*a* and 18*b* while mounted to a corneal surface of an eye, according to an example embodiment.

With reference to FIG. 18a, which is a view facing the convex surface 1824 of the eye-mountable device 1810, the bio-interactive electronics 1860 is mounted to a side of the substrate 1830 facing the convex surface 1824. Where the bio-interactive electronics 1860 includes an analyte bio-sensor, for example, mounting such a bio-sensor on the substrate 1830 facing the convex surface 1824 allows the bio-sensor to receive analyte concentrations in tear film through a channel 1872 in the polymeric material 1820 to the convex surface 1824 (as illustrated in FIGS. 18c and 18d). In some embodiments, some electronic components can be mounted on one side of the substrate 1830, while other electronic components are mounted to the opposing side, and connections between the two can be made through conductive materials passing through the substrate 1830.

The loop antenna 1870 is a layer of conductive material patterned along the flat surface of the substrate to form a flat conductive ring. In some instances, the loop antenna 1870 can be formed without making a complete loop. For instance, the loop antenna 1870 can have a cutout to allow room for the controller 1850 and the bio-interactive electronics 1860, as illustrated in FIG. 18a. However, the loop antenna 1870 can also be arranged as a continuous strip of conductive material that wraps entirely around the flat surface of the substrate 1830 one or more times. For example, a strip of conductive material with multiple windings can be patterned on the side of the substrate 1830 opposite the controller 1850 and bio-interactive electronics 1860. Interconnects between the ends of such a wound antenna (e.g., the antenna leads) can be passed through the substrate 1830 to the controller 1850. In some embodiments, the loop antenna can include a plurality of conductive loops spaced apart from each other, such as three conductive loops, five conductive loops, nine conductive loops, etc. With such an arrangement, the polymeric material 1820 may extend between adjacent conductive loops in the plurality of conductive loops.

FIG. 18c is a side cross-section view of the eye-mountable electronic device 1810 while mounted to a corneal surface 1884 of an eye 1880. FIG. 18d is a close-in side cross-section view enhanced to show tear film layers 1890, 1892 surrounding the exposed surfaces 1824, 1826 of the eye-mountable device 1810. It is noted that relative dimensions in FIGS. 18c and 18d are not necessarily to scale, but have been rendered for purposes of explanation only in describing the arrangement of the eye-mountable electronic device 1810. For example, the total thickness of the eye-mountable device 1810 can be about 200 micrometers, while the thickness of the tear film layers 1890, 1892 can each be about 10 micrometers, although this ratio may not be reflected in the drawings. Some aspects are exaggerated to allow for illustration and facilitate explanation.

The eye 1880 includes a cornea 1882 that is covered by bringing the upper eyelid 1886 and lower eyelid 1888 together over the top of the eye 1880. Incident light is received by the eye 1880 through the cornea 1882, where light is optically directed to light sensing elements of the eye 1880 (e.g., rods and cones, etc.) to stimulate visual perception. The motion of the eyelids 1886, 1888 distributes a tear film across the exposed corneal surface 1884 of the eye 1880. The tear film is an aqueous solution secreted by the lacrimal gland to protect and lubricate the eye 1880. When the eye-mountable device 1810 is mounted in the eye 1880, the tear film coats both the convex and concave surfaces 1824, 1826 with an inner layer 1890 (along the concave surface 1826) and an outer layer 1892 (along the convex layer 1824). The tear film layers 1890, 1892 can be about 10 micrometers in thickness and together account for about 10 microliters.

The tear film layers 1890, 1892 are distributed across the corneal surface 1884 and/or the convex surface 1824 by motion of the eyelids 1886, 1888. For example, the eyelids 1886, 1888 raise and lower, respectively, to spread a small volume of tear film across the corneal surface 1884 and/or the convex surface 1824 of the eye-mountable device 1810. The tear film layer 1890 on the corneal surface 1884 also facilitates mounting the eye-mountable device 1810 by capillary forces between the concave surface 1826 and the corneal surface 1884. In some embodiments, the eye-mountable device 1810 can also be held over the eye in part by vacuum forces against the corneal surface 1884 due to the concave curvature of the eye-facing concave surface 1826.

As shown in the cross-sectional views in FIGS. 18c and 18d, the substrate 1830 can be inclined such that the flat mounting surfaces of the substrate 1830 are approximately parallel to the adjacent portion of the convex surface 1824. As described above, the substrate 1830 is a flattened ring with an inward-facing surface 1832 (facing the concave surface 1826 of the polymeric material 1820) and an outward-facing surface 1834 (facing the convex surface 1824). The substrate 1830 can have electronic components and/or patterned conductive materials mounted to either or both mounting surfaces 1832, 1834.

As shown in FIG. 18d, the bio-interactive electronics 1860, the controller 1850, and the conductive interconnect 1851 are located between the outward-facing surface 1834 and the inward-facing surface 1832 such that the bio-interactive electronics 1860 are facing the convex surface 1824. As described above, the polymer layer defining the anterior side may be greater than 50 micrometers thick, whereas the polymer layer defining the posterior side may be less than 150 micrometers. Thus, the bio-interactive electronics 1860 may be at least 50 micrometers away from the convex surface 1824 and may be a greater distance away from the concave surface 1826. However, in other examples, the bio-interactive electronics 1860 may be mounted on the inward-facing surface 1832 of the substrate 1830 such that the bio-interactive electronics 1860 are facing the concave surface 1826. The bio-interactive electronics 1860 could also be positioned closer to the concave surface 1826 than the convex surface 1824. With this arrangement, the bio-interactive electronics 1860 can receive analyte concentrations in the tear film 1892 through the channel 1872.

While the body-mountable device has been described as comprising the eye-mountable device 1710 and/or the eye-mountable device 1810, the body-mountable device could be other types of mountable devices that are mounted on or in other portions of the body.

As noted, in some embodiments, the body-mountable device may be a tooth-mountable device. In some embodiments, the tooth-mountable device may take the form of or be similar in form to the eye-mountable device 1710 and/or the eye-mountable device 1810. For instance, the tooth-mountable device may include a polymeric material that is the same or similar to any of the polymeric materials described herein and a substrate that is the same or similar to any of the substrates described herein.

As noted, in some embodiments, the body-mountable may be a skin-mountable device. In some embodiments, the skin-mountable device may take the form of or be similar in form to the eye-mountable device 1710 and/or the eye-mountable device 1810. For instance, the skin-mountable device may include a polymeric material that is the same or similar to any of the polymeric materials described herein and a substrate that is the same or similar to any of the substrates described herein.

IV. Conclusion

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method comprising:
    positioning a structure on a plurality of protrusions that extend from a surface of a molding piece, wherein the structure comprises a sensor or an electronic component;
    forming, using the molding piece, a body-mountable device by forming a polymer layer around the structure positioned on the plurality of protrusions, such that the structure is at least partially enclosed by the polymer layer, wherein the polymer layer defines a first side of the body-mountable device and a second side of the body-mountable device opposite the first side, wherein the surface of the molding piece supports the polymer layer as the polymer layer is being formed, and wherein forming the polymer layer comprises:
        providing a polymer material on the surface of the molding piece,
        bringing the molding piece and a press together into a forming position, wherein the press comprises a second plurality of protrusions that extend from a surface of the press, and wherein in the forming position the molding piece and press apply pressure to the polymer material, and
        in the forming position, (i) conforming, using the second plurality of protrusions, the structure to a curvature of the polymer layer and (ii) curing the polymer material to form the polymer layer, wherein curing the polymer material comprises:
            after providing the polymer material, curing the polymer material to a uniform partially-cured state, such that the partially-cured polymer material supports the structure as the polymer layer is being formed, wherein curing the polymer material to the uniform partially-cured state comprises curing the polymer material to the uniform partially-cured state using light,
            after curing the polymer material to the uniform partially-cured state, retracting the plurality of protrusions through the surface of the molding piece, and
            after retracting the plurality of protrusions, curing the polymer material to a fully-cured state to form the polymer layer, wherein curing the polymer material to the fully-cured state comprises curing the polymer material to the fully-cured state using light; and
    removing the body-mountable device from the molding piece.

2. The method of claim 1, wherein the body-mountable device removed from the molding piece has a plurality of indentations in the polymer layer formed by the retraction of the plurality of protrusions.

3. The method of claim 1, wherein the plurality of protrusions comprises at least three protrusions.

4. The method of claim 1, wherein each protrusion of the plurality of protrusions has a diameter between 50 micrometers to 2 millimeters.

5. The method of claim 1, wherein each protrusion of the plurality of protrusions comprises one or more of a metal, a non-stick material, or a plastic.

6. The method of claim 1, wherein the structure has a plurality of alignment features, and wherein positioning the structure on the plurality of protrusions comprises aligning the plurality of alignment features with the plurality of protrusions.

7. The method of claim 1, wherein the surface of the molding piece is substantially symmetric about an axis, and wherein each protrusion of the plurality of the protrusions extends from the surface in a respective direction that is substantially parallel to the axis.

8. The method of claim 1, wherein the surface of the molding piece is substantially symmetric about an axis, and wherein at least one protrusion of the plurality of the protrusions extends from the surface in a respective direction that is non-parallel to the axis.

9. The method of claim 1, further comprising applying a non-stick coating to at least one protrusion of the plurality of protrusions.

10. The method of claim 1, wherein forming the polymer layer further comprises:
retracting the second plurality of protrusions through the surface of the press.

11. The method of claim 1, wherein the structure comprises the sensor, wherein the molding piece further comprises a third protrusion that extends from the surface to the sensor through the polymer layer as the polymer layer is being formed, and wherein the body-mountable device removed from the molding piece has a channel to the sensor formed by the third protrusion.

12. The method of claim 1, wherein the structure comprises the sensor, and wherein the method further comprises:
forming a protective layer over the sensor, such that the sensor is enclosed by the protective layer; and
removing the protective layer to form a channel to the sensor through the polymer layer,
wherein forming the polymer layer around the structure comprises forming the polymer layer around the structure, such that the structure is enclosed by the polymer layer and the protective layer.

13. A method comprising:
positioning a structure on a plurality of protrusions that extend from a surface of a molding piece, wherein the structure comprises a sensor or an electronic component;
forming, using the molding piece, a body-mountable device by forming a polymer layer around the structure positioned on the plurality of protrusions, such that the structure is at least partially enclosed by the polymer layer, wherein the polymer layer defines a first side of the body-mountable device and a second side of the body-mountable device opposite the first side, wherein the surface of the molding piece supports the polymer layer as the polymer layer is being formed, and wherein forming the polymer layer comprises:
providing a polymer material on the surface of the molding piece,
after providing the polymer material, conforming, using a second plurality of protrusions opposite the plurality of protrusions, the structure to a curvature of the polymer layer,
after providing the polymer material, curing the polymer material to a uniform partially-cured state, such that the partially-cured polymer material supports the structure as the polymer layer is being formed, wherein curing the polymer material to the uniform partially-cured state comprises curing the polymer material to the uniform partially-cured state using light,
after curing the polymer material to the uniform partially-cured state, retracting the plurality of protrusions through the surface of the molding piece, and
after retracting the plurality of protrusions, curing the polymer material to a fully-cured state to form the polymer layer, wherein curing the polymer material to the fully-cured state comprises curing the polymer material to the fully-cured state using light; and
removing the body-mountable device from the molding piece.

* * * * *